US012335686B2

(12) United States Patent
Kho et al.

(10) Patent No.: US 12,335,686 B2
(45) **Date of Patent: *Jun. 17, 2025**

(54) APPARATUS AND VEHICULAR APPARATUS INCLUDING THE SAME

(71) Applicant: LG Display Co., Ltd., Seoul (KR)

(72) Inventors: YuSeon Kho, Paju-si (KR); Sooyoun Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,092

(22) Filed: Nov. 8, 2023

(65) Prior Publication Data

US 2024/0073623 A1 Feb. 29, 2024

Related U.S. Application Data

(63) Continuation of application No. 17/982,025, filed on Nov. 7, 2022, now Pat. No. 11,849,267.

(30) Foreign Application Priority Data

Dec. 31, 2021 (KR) ........................ 10-2021-0194808

(51) Int. Cl.
*H04R 17/00* (2006.01)

(52) U.S. Cl.
CPC ......... *H04R 17/00* (2013.01); *H04R 2499/13* (2013.01); *H04R 2499/15* (2013.01)

(58) Field of Classification Search
CPC ...................................................... H04R 17/00
See application file for complete search history.

(56) References Cited

U.S. PATENT DOCUMENTS

| | | | | |
|---|---|---|---|---|
| 9,460,575 | B2 * | 10/2016 | Park | G06F 21/32 |
| 10,217,958 | B2 | 2/2019 | Choi et al. | |
| 10,500,958 | B2 | 12/2019 | Cho et al. | |
| 10,582,612 | B2 | 3/2020 | Kwon et al. | |
| 10,904,651 | B2 * | 1/2021 | Kim | H04R 1/288 |
| 11,190,882 | B2 * | 11/2021 | Zhu | H04R 1/028 |
| 11,194,413 | B2 * | 12/2021 | Hong | B60K 35/60 |
| 2002/0018578 | A1 | 2/2002 | Burton | |

(Continued)

FOREIGN PATENT DOCUMENTS

| | | | |
|---|---|---|---|
| EP | 3890351 | A1 | 6/2021 |
| JP | 2007-158658 | A | 6/2007 |

(Continued)

OTHER PUBLICATIONS

Combined Search and Examination Report dated Apr. 6, 2023, issued in corresponding UK Patent Application No. GB2216379.4.

(Continued)

*Primary Examiner* — Olisa Anwah
(74) *Attorney, Agent, or Firm* — Morgan, Lewis & Bockius LLP

(57) ABSTRACT

An apparatus includes a vibration member, a housing at a rear surface of the vibration member, a vibration apparatus configured to vibrate the vibration member, and a curvature variable layer between the vibration member and the vibration apparatus, wherein the vibration member includes at least one flat portion and at least one flexural portion adjacent to the at least one flat portion.

28 Claims, 25 Drawing Sheets

30

(56) References Cited

U.S. PATENT DOCUMENTS

| | | | | |
|---|---|---|---|---|
| 2013/0167881 | A1* | 7/2013 | Korbler | H10N 30/092 29/25.35 |
| 2014/0055394 | A1 | 2/2014 | Park et al. | |
| 2018/0097199 | A1 | 4/2018 | Jo et al. | |
| 2019/0045286 | A1* | 2/2019 | Kim | H04R 17/00 |
| 2020/0059733 | A1 | 2/2020 | Shin et al. | |
| 2020/0154185 | A1 | 5/2020 | Kim et al. | |
| 2020/0213768 | A1* | 7/2020 | Lee | H04R 17/00 |
| 2020/0389734 | A1* | 12/2020 | Won | H04R 5/02 |
| 2021/0183966 | A1 | 6/2021 | Kho et al. | |
| 2021/0306741 | A1 | 9/2021 | Kim et al. | |
| 2021/0352390 | A1 | 11/2021 | Lee et al. | |
| 2022/0187871 | A1 | 6/2022 | Yamazaki et al. | |
| 2022/0238787 | A1* | 7/2022 | Kagawa | H10N 30/02 |

FOREIGN PATENT DOCUMENTS

| | | | |
|---|---|---|---|
| JP | 2015-535421 | A | 12/2015 |
| JP | 2021-164165 | A | 10/2021 |
| JP | 2021-180486 | A | 11/2021 |
| KR | 10-2017-0126149 | A | 11/2017 |
| KR | 10-2020-0021392 | A | 2/2020 |
| KR | 10-2021-0050181 | A | 5/2021 |
| KR | 10-2021-0086027 | A | 7/2021 |

OTHER PUBLICATIONS

Office Action issued Jan. 9, 2024, in corresponding Japanese Patent Application No. 2022-180824.

* cited by examiner

D-D'

530L: 530L1, 530L2 540: 540A, 540B1, 540B2 : WS 550-4: 550Q

APPARATUS AND VEHICULAR APPARATUS INCLUDING THE SAME

CROSS-REFERENCE TO RELATED APPLICATIONS

This application is a continuation of co-pending U.S. patent application Ser. No. 17/982,025, filed on Nov. 7, 2022, which claims the benefit of and priority to Korean Patent Application No. 10-2021-0194808, filed on Dec. 31, 2021. Each of the above prior U.S. and Korean patent applications is hereby incorporated by reference as if fully set forth herein for all purposes.

TECHNICAL FIELD

The present disclosure relates to an apparatus and a vehicular apparatus including the same.

DISCUSSION OF THE RELATED ART

An apparatus includes a separate speaker or a sound apparatus providing a sound. When a speaker is disposed in an apparatus, the speaker occupies a space, due to this, the design and spatial disposition of the apparatus are limited.

A speaker applied to the apparatus may be, for example, an actuator including a magnet and a coil. However, when an actuator is applied to the apparatus, a thickness thereof is thickened. Therefore, piezoelectric elements for realizing a thin thickness are attracting much attention.

Because piezoelectric elements have a fragile characteristic, the piezoelectric elements are easily damaged due to an external impact, and due to this, have a problem where reliability is low in sound reproduction. And, when a speaker such as a piezoelectric element or the like is applied to a flexible apparatus, there is a problem where damage occurs due to a fragile characteristic.

The description provided in the discussion of the related art section should not be assumed to be prior art merely because it is mentioned in or associated with that section. The discussion of the related art section may include information that describes one or more aspects of the subject technology, and the description in this section does not limit the invention.

SUMMARY

The inventors of the present disclosure have recognized the problems described above disadvantages of the related art, and have performed extensive research and experiments for implementing a vibration apparatus which may enhance the quality of a sound and a sound pressure level characteristic. Through the extensive research and experiments, the inventors have thus invented a new apparatus and a vehicular apparatus including the same, which may enhance the quality of a sound.

Accordingly, embodiments of the present disclosure are directed to providing an apparatus and a vehicular apparatus including the same that substantially obviate one or more problems due to limitations and disadvantages of the related art.

An aspect of the present disclosure is to provide an apparatus and a vehicular apparatus including the same, which may vibrate a vibration member or a vibration object to generate a vibration or a sound and may enhance a sound characteristic and/or a sound pressure level characteristic.

Another aspect of the present disclosure is to provide a vibration apparatus having a simplified structure, an apparatus including the vibration apparatus, and a vehicular apparatus including the apparatus.

Additional features, advantages, and aspects are set forth in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and claims hereof as well as the appended drawings.

To achieve these and other advantages and aspects of the present disclosure, as embodied and broadly described herein, an apparatus may comprise a vibration member, a housing at a rear surface of the vibration member, a connection member between the vibration member and the housing, and a vibration apparatus configured to vibrate the vibration member. The vibration member may include at least one flat portion and at least one flexural portion adjacent to the at least one flat portion.

In another aspect, an apparatus may comprise a vibration member, a housing at a rear surface of the vibration member, a connection member between the vibration member and the housing, and a vibration apparatus configured to vibrate the vibration member. The vibration member may comprise at least one flat portion, and at least one concave curved portion or at least one convex curved portion provided adjacent to the at least one flat portion. The vibration member comprises first to fourth regions which do not overlap one another. The second region may comprise the at least one flat portion, the first region and the fourth region may comprise the at least one convex curved portion, and the third region may comprise the at least one concave curved portion.

In another aspect, an apparatus may comprise a vibration member, a housing at a rear surface of the vibration member, a connection member between the vibration member and the housing, and a vibration apparatus configured to vibrate the vibration member. The vibration member may comprise at least one flat portion, and at least one concave curved portion or at least one convex curved portion provided adjacent to the at least one flat portion. The vibration member may comprise first to fourth regions which do not overlap one another. The second region may comprise the at least one flat portion, the third region may comprise the at least one convex curved portion, and the first region and the fourth region may comprise the at least one concave curved portion.

In another aspect, a vehicular apparatus may comprise an exterior material, an interior material covering the exterior material, and one or more vibration generating apparatuses at one or more among the exterior material, the interior material, and a region between the exterior material and the interior material. The one or more vibration generating apparatuses may comprise the apparatus according to embodiments of the present disclosure, and one or more of the interior material and the exterior material output sound based on vibrations of the one or more vibration generating apparatuses.

An apparatus according to an embodiment of the present disclosure may include a vibration apparatus which vibrates a display panel or a vibration member and may generate a sound so that a sound of the apparatus travels toward a front surface of the display panel or the vibration member.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are exemplary and explanatory, and are intended to provide further explanation of the disclosures as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure and together with the description serve to explain principles of the disclosure.

Figure 1:
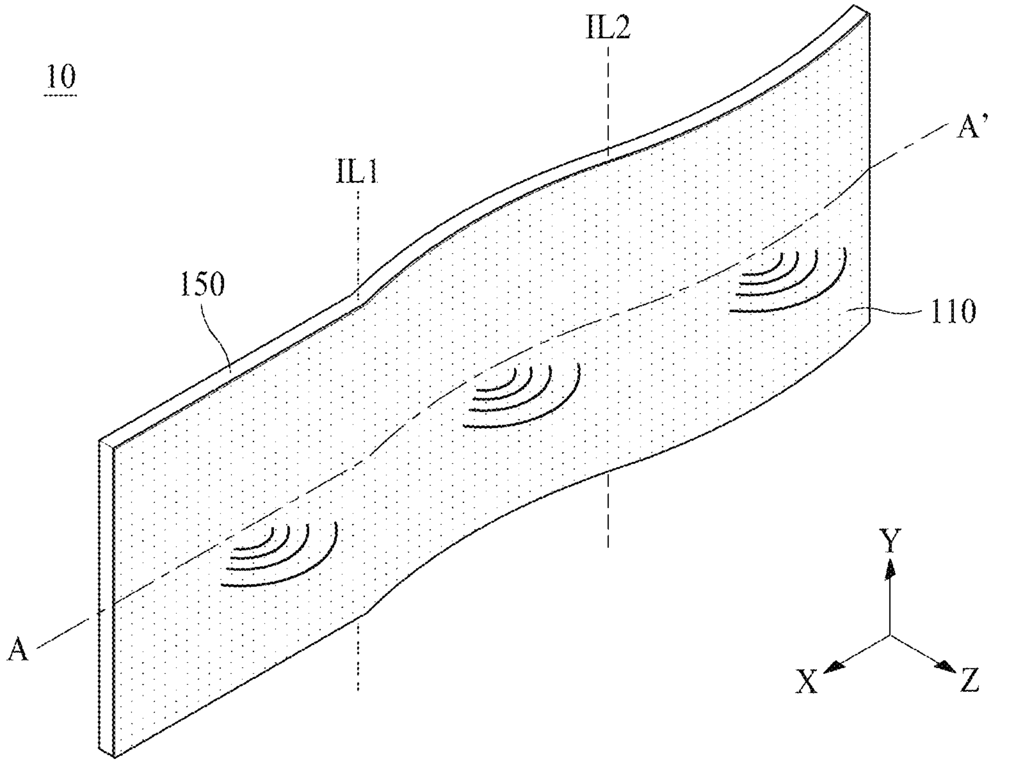
FIG. 1 is a perspective view illustrating an apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION OF THE DISCLOSURE

Reference is now made in detail to embodiments of the present disclosure, examples of which may be illustrated in the accompanying drawings. In the following description, when a detailed description of well-known functions or configurations may unnecessarily obscure aspects of the present disclosure, the detailed description thereof will be omitted. The progression of processing steps and/or operations described is an example; however, the sequence of steps and/or operations is not limited to that set forth herein and may be changed, with the exception of steps and/or operations necessarily occurring in a particular order.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are provided so that this disclosure is thorough and complete, and fully conveys the scope of the present disclosure to those skilled in the art. Furthermore, the present disclosure is only defined by claims and their equivalents.

The shapes, sizes, areas, ratios, angles, numbers, and the like disclosed in the drawings for describing embodiments of the present disclosure are merely an example, and thus, the present disclosure is not limited to the illustrated details.

When the term “comprise,” “have,” “include,” “contain,” “constitute,” “make up of,” “formed of,” or the like is used, one or more other elements may be added unless a term such as “only” or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. Any implementation described herein as an "example" is not necessarily to be construed as preferred or advantageous over other implementations.

In one or more aspects, an element, feature, or corresponding information (e.g., a level, range, dimension, size, or the like) is construed as including an error or tolerance range although there is no explicit description of such an error or tolerance range is provided. An error or tolerance range may be caused by various factors (e.g., process factors, internal or external impact, noise, or the like). Further, the term "may" encompasses all the meanings of the term "can."

In describing a positional relationship, where the positional relationship between two parts is described, for example, using "on," "over," "under," "above," "below," "beneath," "near," "close to," or "adjacent to," "beside," "next to," or the like, one or more other parts may be located between the two parts unless a more limiting term, such as "immediate(ly)," "direct(ly)," or "close(ly)," is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which one or more additional structures are disposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

In describing a temporal relationship, when the temporal order is described as, for example, "after," "subsequent," "next," "before," "preceding," "prior to," or the like a case that is not consecutive or not sequential may be included unless a more limiting term, such as "just," "immediate(ly)," or "direct(ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. The terms "first," "second," and the like may be used to distinguish components from each other, but the functions or structures of the components are not limited by ordinal numbers or component names in front of the components.

In describing elements of the present disclosure, the terms "first," "second," "A," "B," "(a)," "(b)," or the like may be used. These terms are intended to identify the corresponding element(s) from the other elements(s), and these are not used to define the essence, basis, order, or number of the corresponding element.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The term "at least one" should be understood as including any and all combinations of one or more of the associated listed items. For example, the meaning of "at least one of a first item, a second item, and a third item" denotes the combination of items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

Features of various embodiments of the present disclosure may be partially or wholly coupled to or combined with each other, and may be variously inter-operated, linked or driven together. The embodiments of the present disclosure may be carried out independently from each other, or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

Hereinafter, embodiments of the present disclosure will be described in detail with reference to the accompanying drawings. Also, for convenience of description, a scale, dimension, size, and thickness of each of the elements illustrated in the accompanying drawings may differ from an actual scale, dimension, size, and thickness, and thus, embodiments of the present disclosure are not limited to a scale, dimension, size, and thickness illustrated in the drawings.

Figure 2:
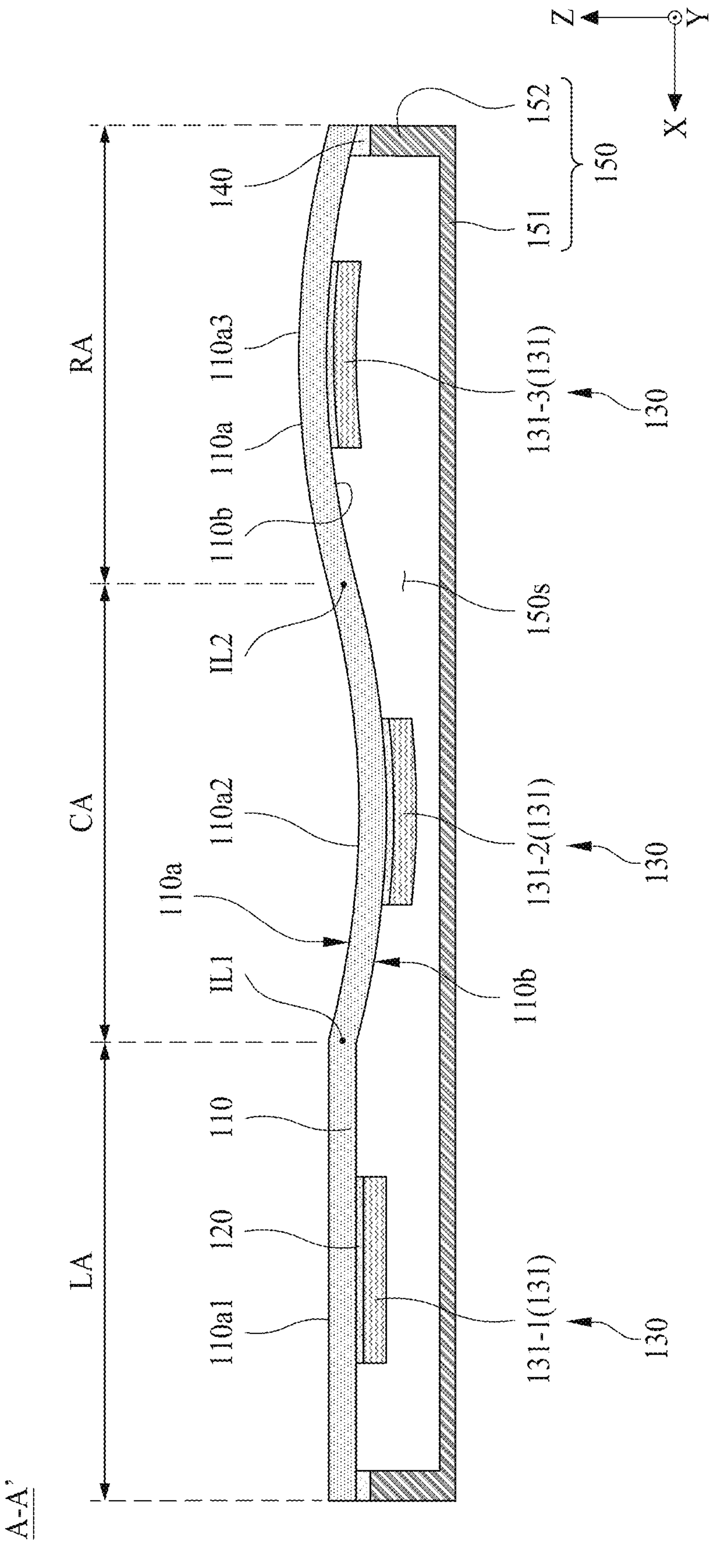
FIG. 2 is a cross-sectional view taken along line A-A' illustrated in FIG. 1.

FIG. 1 is a perspective view illustrating an apparatus according to an embodiment of the present disclosure. FIG. 2 is a cross-sectional view taken along line A-A' illustrated in FIG. 1.

With reference to FIGS. 1-2, an apparatus 10 according to an embodiment of the present disclosure may be may include a vibration member 110 and a vibration apparatus 130.

The vibration member 110 may output a sound according to a vibration of the vibration apparatus 130. Accordingly, the vibration member 110 may be referred to as a vibration object, a vibration plate, a vibration panel, a sound plate, a sound output member, or a sound output panel, or the like, but embodiments of the present disclosure are not limited thereto.

The vibration member 110 may be configured to be transparent, translucent, or opaque. The vibration member 110 according to an embodiment of the present disclosure may include a metal material and/or a nonmetal material (or a composite nonmetal material) having a material characteristic suitable for outputting a sound based on a vibration. The metal material of the vibration member 110 according to an embodiment of the present disclosure may include any one or more materials of stainless steel, aluminum (Al), an Al alloy, magnesium (Mg), a Mg alloy, and a magnesium-lithium (Mg—Li) alloy, but embodiments of the present disclosure are not limited thereto. The nonmetal material (or the composite nonmetal material) of the vibration member 110 may include one or more of glass, plastic, fiber, leather, wood, cloth, rubber, carbon, a mirror, and paper, but embodiments of the present disclosure are not limited thereto.

The vibration member 110 according to an embodiment of the present disclosure may implement a signage panel such as an analog signage or the like such as an advertising signboard, a poster, or a noticeboard, or the like. For example, in a case where the vibration member 110 implements the signage panel, the analog signage may include signage content such as a sentence, a picture, and a sign, or the like. The signage content may be disposed at the vibration member 110 to be visible. For example, the signage content may be directly attached on one or more of a first surface (or a front surface) 110*a* of the vibration member 110 and a second surface (or a rear surface) 110*b* different from (or opposite to) the first surface 110*a*. For example, the signage content may be printed on a medium such as paper or the like, and the medium with the signage content printed thereon may be directly attached on one or more of the first surface 110*a* and the second surface 110*b* of the vibration member 110. For example, when the signage content is attached on the second surface 110*b* of the vibration member 110, the vibration member 110 may be configured to be a transparent material.

The vibration member 110 according to an embodiment of the present disclosure may include a first region, a second region adjacent to the first region, and a third region adjacent to the second region. The first to third regions may have different bending states.

The vibration member 110 according to an embodiment of the present disclosure may include at least one flat portion and at least one flexural portion.

The flat portion of the vibration member 110 may include a portion where the vibration member 110 is implemented to be flat, and the at least one flexural portion may include a portion where at least a portion of the vibration member 110 is flexed in a concave or convex shape. For example, the at least one flexural portion may include one or more of at least one concave curved portion and at least one convex curved portion. For example, the at least one flexural portion may be referred to as an uneven portion, a curved portion, a bumpy pattern portion, or a bending portion.

A flat portion 110*a*1 may be configured at a left region LA (or a first region) of the apparatus 10, a concave curved portion 110*a*2 may be configured at a center region CA (or a second region) of the apparatus 10, and a convex curved portion 110*a*3 may be configured at a right region RA (or a third region) of the apparatus 10. For example, the flat portion 110*a*1 may be configured the left region LA, the convex curved portion 110*a*3 may be configured at the center region CA, and the concave curved portion 110*a*2 may be configured at the right region RA. A combination of a flat portion and a curved portion of the vibration member 110 according to an embodiment of the present disclosure is not limited thereto, and an arrangement relationship between the flat portion 110*a*1, the concave curved portion 110*a*2, and the convex curved portion 110*a*3 may be variously combined.

For example, the flat portion 110*a*1 may be configured at the left region LA and the center region CA of the apparatus 10, and the concave curved portion 110*a*2 or the convex curved portion 110*a*3 of the curved portion may be configured at the right region RA. As described above, when two adjacent regions are implemented as a flat portion or have the same bending state or slope of the vibration member 110, the apparatus 10 according to an embodiment of the present disclosure may be configured as a two or more-way apparatus having two vibration characteristics or two sound generating characteristics. For example, the apparatus 10 may be configured as a three-way or four-way apparatus.

In the apparatus 10 of FIG. 2, the left region LA and the center region CA may be implemented as a flat portion, and the right region RA may be configured to include the concave curved portion 110*a*2 or the convex curved portion 110*a*3. In such a configuration, an apparatus may include one flat portion and one curved portion and may have two sound characteristics, and thus, may be referred to as a two-way sound reproduction apparatus.

The vibration member 110 may further include a first inflection line IL1 between the flat portion 110*a*1 and the concave curved portion 110*a*2 and a second inflection line IL2 between the concave curved portion 110*a*2 and the convex curved portion 110*a*3. The first inflection line IL1 and the second inflection line IL2 may be at a position at which a bending state of the vibration member 110 or a slope of the vibration member 110 is inflected.

The vibration member 110 according to an embodiment of the present disclosure may include a first surface 110*a* and a second surface 110*b*, and the first surface 110*a* and the second surface 110*b* may include a planar structure or a non-planar structure.

The vibration member 110 according to an embodiment of the present disclosure may be configured to have a plurality of natural vibration frequencies (or a natural frequency). The vibration member 110 may include a non-planar structure, and thus, may have a plurality of natural vibration frequencies. The vibration member 110 may have a plurality of natural vibration frequencies which differ for each region (or area). For example, the vibration member 110 may have a plurality of natural vibration frequencies which differ based on a thickness of each region.

The vibration apparatus 130 may be configured to autonomously vibrate (or displace or drive) based on an electrical signal (or a voice signal) applied thereto, or may be configured to vibrate (or displace or drive) a vibration member (or a vibration plate or a vibration object) 110. For example, the vibration apparatus 130 may be referred to as a vibration structure, a vibrator, a vibration generating apparatus, a vibration generating device, a vibration generator, a sounder, a sound device, a sound generating device, or a sound generator, or the like, but embodiments of the present disclosure are not limited thereto.

The vibration apparatus 130 according to an embodiment of the present disclosure may include a piezoelectric material (or an electroactive material) having a piezoelectric characteristic. The vibration apparatus 130 may vibrate (or displace or drive) the vibration member 110 based on a vibration (or a displacement or driving) of a piezoelectric material generated by an electrical signal (or a voice signal) applied thereto. For example, the vibration apparatus 130 may vibrate (or displace or drive) as contraction and expansion are alternately repeated by a piezoelectric effect (or a piezoelectric characteristic). For example, the vibration apparatus 130 may vibrate (or displace or drive) in a vertical direction (or a thickness direction) Z as contraction and expansion are alternately repeated by an inverse piezoelectric effect.

The vibration apparatus 130 according to an embodiment of the present disclosure may include one or more vibration devices 131 having a piezoelectric type.

The one or more vibration devices 131 according to an embodiment of the present disclosure may be configured to have flexibility. For example, the one or more vibration devices 131 may be configured to be bent in a non-planar shape including a curved surface. For example, the one or more vibration devices 131 according to an embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible exciter, or a flexible transducer, or the like, but embodiments of the present disclosure are not limited thereto.

The one or more vibration devices 131 according to an embodiment of the present disclosure may include a tetragonal shape which has a first length parallel to a first direction X and a second length parallel to a second direction Y intersecting with the first direction X. For example, the one or more vibration devices 131 may include a square shape where the first length is the same as the second length. However, embodiments of the present disclosure are not limited thereto, and the one or more vibration devices 131 may include a rectangular shape where one of the first length and the second length is greater than the other length, a non-tetragonal shape, a circular shape, or an oval shape.

The vibration apparatus 130 or the one or more vibration devices 131 according to an embodiment of the present disclosure may include first to third vibration devices 131-1, 131-2, and 131-3.

According to an embodiment of the present disclosure, the first vibration device 131-1 may be disposed at the flat portion **110*a*1, the second vibration device 131-2 may be disposed at the concave curved portion 110*a*2, and the third vibration device 131-3 may be disposed at the convex curved portion 110*a*3**.

According to an embodiment of the present disclosure, each of the first vibration device 131-1, the second vibration device 131-2, and the third vibration device 131-3 may include a vibration portion **131*a* (see FIGS. 5 to 10). A detailed description of each of the vibration portions 131*a* of the first vibration device 131-1, the second vibration device 131-2, and the third vibration device 131-3, and the vibration portion 131*a* will be described below with reference to FIGS. 5 to 10**.

According to an embodiment of the present disclosure, the vibration portions **131*a* of each of the first vibration device 131-1, the second vibration device 131-2, and the third vibration device 131-3** may have different sound reproduction characteristics and/or sound pressure level characteristics.

For example, the first vibration device 131-1 may have a sound reproduction characteristic of a full pitched sound band. Here, the full pitched sound band may be a frequency range of 200 Hz to 20 kHz, but a frequency range of the full pitched sound band according to an embodiment of the present disclosure is not limited thereto.

The second vibration device 131-2 may have a sound reproduction characteristic of a high-pitched sound band. Here, the high-pitched sound band may be a frequency range of 2 kHz to 40 kHz, but a frequency range of the high-pitched sound band according to an embodiment of the present disclosure is not limited thereto.

The third vibration device 131-3 may have a sound reproduction characteristic of a middle-pitched sound band. Here, the middle-pitched sound band may be a frequency range of 500 Hz to 2 kHz, but a frequency range of the middle-pitched sound band according to an embodiment of the present disclosure is not limited thereto.

According to an embodiment of the present disclosure, the first vibration device 131-1, the second vibration device 131-2, and the third vibration device 131-3 may have different physical properties of the vibration portions **131*a*. Here, physical properties may denote a mechanical quality factor Qm, and the physical properties of the vibration portion 131*a* may have a mechanical quality factor Qm within a range where the first vibration device 131-1, the second vibration device 131-2, and the third vibration device 131-3** do not overlap one another.

The first vibration device 131-1 may have a mechanical quality factor Qm of less than 100, the second vibration device 131-2 may have a mechanical quality factor Qm of more than 400, and the third vibration device 131-3 may have a mechanical quality factor Qm of 100 to 400. For example, the vibration portion **131*a* of the first vibration device 131-1 may have a mechanical quality factor Qm of less than 100, the vibration portion 131*a* of the second vibration device 131-2 may have a mechanical quality factor Qm of more than 400, and the vibration portion 131*a* of the third vibration device 131-3** may have a mechanical quality factor Qm of 100 to 400.

The first vibration device 131-1 may be disposed at a second surface **110*b* of the vibration member 110 to overlap the flat portion 110*a*1 of the vibration member 110 and may have a sound reproduction characteristic of the full pitched sound band. The vibration portion 131*a* of the first vibration device 131-1 may have a mechanical quality factor Qm of less than 100 so as to realize a sound reproduction characteristic of the full pitched sound band and may be suitable for the sound reproduction of the full pitched sound band because a resonance characteristic is low when the vibration portion 131_a_ of the first vibration device 131-1** has a mechanical quality factor Qm of less than 100.

The second vibration device 131-2 may be disposed at the second surface 110_b_ of the vibration member 110 to overlap the concave curved portion 110_a_2 of the vibration member 110 and may have a sound reproduction characteristic of a middle-pitched sound band. The vibration portion 131_a_ of the second vibration device 131-2 may have a mechanical quality factor Qm of 100 to 400 so as to realize a sound reproduction characteristic of the middle-pitched sound band and a sound reproduction characteristic of covering a frequency range of the middle-pitched sound band and may have a medium resonance characteristic when the vibration portion 131_a_ of the second vibration device 131-2 has a mechanical quality factor Qm of 100 to 400.

The third vibration device 131-3 may be disposed at the second surface 110_b_ of the vibration member 110 to overlap the convex curved portion 110_a_3 of the vibration member 110 and may have a sound reproduction characteristic of the high-pitched sound band. The vibration portion 131_a_ of the third vibration device 131-3 may have a mechanical quality factor Qm of more than 400 suitable for the use of resonance of the high-pitched sound band so as to realize a sound reproduction characteristic of the high-pitched sound band. The vibration portion 131_a_ of the third vibration device 131-3 having a sound reproduction characteristic of the high-pitched sound band may have a mechanical quality factor Qm of more than 400, and thus, a variation of mechanical loss may decrease in converting electrical energy into mechanical energy and the amount of heat may be reduced, thereby preventing the occurrence of heat caused by the sound reproduction of the high-pitched sound band.

The vibration apparatus 130 according to an embodiment of the present disclosure may be connected or coupled to a second surface 110_b_ of the vibration member 110 by an adhesive member 120.

The adhesive member 120 may be disposed between the vibration member 110 and the vibration apparatus 130. For example, the adhesive member 120 may be disposed between the vibration member 110 and the first, second, and third vibration devices 131-1, 131-2, and 131-3. For example, the adhesive member 120 may connect or couple the first, second, and third vibration devices 131-1, 131-2, and 131-3 to the second surface 110_b_ of the vibration member 110.

The adhesive member 120 according to an embodiment of the present disclosure may include an adhesive layer (or a tacky layer) which is good in adhesive force or attaching force. For example, the adhesive member 120 may include a double-sided adhesive tape, a double-sided foam pad, or a tacky sheet. For example, when the adhesive member 120 includes a tacky sheet (or a tacky layer), the adhesive member 120 may include only an adhesive layer or a tacky layer without a base member such as a plastic material or the like.

The adhesive layer (or a tacky layer) of the adhesive member 120 according to an embodiment of the present disclosure may include epoxy, acrylic, silicone, or urethane, but embodiments of the present disclosure are limited thereto.

The adhesive layer (or a tacky layer) of the adhesive member 120 according to another embodiment of the present disclosure may include a pressure sensitive adhesive (PSA), an optically clear adhesive (OCA), or an optically clear resin (OCR), but embodiments of the present disclosure are limited thereto.

The sound apparatus 10 according to an embodiment of the present disclosure may further include a housing 150 and a connection member 140.

The housing 150 may be disposed at a rear surface of the vibration member 110 to cover the second surface 110_b_ of the vibration member 110 and the one or more vibration devices 131. The housing 150 may include an accommodation space 150_s_ for accommodating the vibration apparatus 130 and may have a box shape where one side is opened. In addition, an opening of one side of the accommodation space 150_s_ is covered by the vibration member 110, and a predetermined air gap may be formed between the accommodation space 150_s_ and the vibration member 110.

The housing 150 according to an embodiment of the present disclosure may include one or more of a metal material and a nonmetal material (or a composite nonmetal material), but embodiments of the present disclosure are not limited thereto. For example, the housing 150 may include one or more materials of a metal material, plastic, and wood, but embodiments of the present disclosure are not limited thereto. For example, the housing 150 may be referred to as a term such as a case, an outer case, a case member, a housing member, a cabinet, an enclosure, a sealing member, a sealing cap, a sealing box, or a sound box, or the like, but embodiments of the present disclosure are not limited thereto. For example, the accommodation space 150_s_ of the housing 150 may be referred to as a term such as a gap space, an air gap, a vibration space, a sound space, a sound box, or a sealing space, but embodiments of the present disclosure are not limited thereto.

The housing 150 according to an embodiment of the present disclosure may maintain an impedance component based on air which acts on the vibration member 110 when the vibration member 110 vibrates. For example, air near the vibration member 110 may resist a vibration of the vibration member 110 and may act as an impedance component having a reactance component and a different resistance based on a frequency. Therefore, the housing 150 may configure the closed space, which surrounds the vibration apparatus 130, and thus, may maintain an impedance component (or an air impedance or an acoustic impedance) which acts on the vibration member 110 due to air, thereby enhancing a sound characteristic and/or a sound pressure level characteristic of a low-pitched sound band generated based on the vibration of the vibration member 110 and enhancing the quality of a sound of a high-pitched sound band generated based on the vibration of the vibration member 110.

The housing 150 according to an embodiment of the present disclosure may include a bottom portion 151 and a lateral portion 152.

The bottom portion 151 may be disposed at the rear surface of the vibration member 110 to cover the second surface 110_b_ of the vibration member 110 and the vibration apparatus 130. For example, the bottom portion 151 may be disposed to be spaced apart from the second surface 110_b_ of the vibration member 110 and the vibration apparatus 130. For example, the bottom portion 151 may be referred to as a term such as a housing plate or a housing bottom portion, or the like, but embodiments of the present disclosure are not limited thereto.

The lateral portion 152 may be connected to a periphery portion of the bottom portion 151. For example, the lateral portion 152 may be bent from the periphery portion of the bottom portion 151 along a third direction Z parallel to a thickness direction of the vibration member 110. For example, the lateral portion 152 may include first to fourth lateral portions. For example, the lateral portion 152 may be referred to as a housing lateral surface or a housing sidewall, or the like, but embodiments of the present disclosure are not limited thereto.

The lateral portion 152 may be integrated into the bottom portion 151. For example, the bottom portion 151 and the lateral portion 152 may be integrated as one body, and thus, the accommodation space 150*s* surrounded by the lateral portion 152 may be provided on the bottom portion 151. Accordingly, the bottom portion 151 and the lateral portion 152 may have a box shape where one side is opened.

The lateral portion 152 may be connected or coupled to the second surface 110*b* of the vibration member 110 by the connection member 140. For example, the lateral portion 152 may be connected or coupled to a periphery portion of the second surface 110*b* of the vibration member 110 by the connection member 140.

According to an embodiment of the present disclosure, the connection member 140 which is disposed between the housing 150 and the vibration member 110 may be configured to minimize or prevent the transfer of a vibration of the vibration member 110 to the housing 150. The connection member 140 may include a material characteristic suitable for blocking a vibration. For example, the connection member 140 may include a material having elasticity. For example, the connection member 140 may include a material having elasticity for vibration absorption (or impact absorption). The connection member 140 according to an embodiment of the present disclosure may be configured as polyurethane materials or polyolefin materials, but embodiments of the present disclosure are not limited thereto. For example, the connection member 140 according to an embodiment of the present disclosure may include one or more of a double-sided polyurethane tape, a double-sided polyurethane foam tape, or a double-sided sponge tape, or the like, but embodiments of the present disclosure are not limited thereto.

The connection member 140 according to an embodiment of the present disclosure may have a thickness for minimizing or preventing the transfer of a vibration of the vibration member 110 to the housing 150. The connection member 140 may absorb a vibration of the vibration member 110 based on a thickness and elasticity, thereby minimizing or preventing the transfer of a vibration of the vibration member 110 to the housing 150. The connection member 140 may prevent a physical contact (or friction) between the vibration member 110 and the housing 150, and thus, may prevent the occurrence of noise (or a noise sound) caused by the physical contact (or friction) between the vibration member 110 and the housing 150. For example, the connection member 140 may be referred to as a buffer member, an elastic member, a damping member, a vibration absorption member, or a vibration blocking member, or the like, but embodiments of the present disclosure are not limited thereto.

The connection member 140 may include a certain elastic force and a certain adhesive force, and thus, may be deformed to correspond to a shape of the vibration member 110, between the vibration member 110 and the housing 150. For example, in FIG. 2, a cross-sectional surface of the connection member 140 disposed between the housing 150 and the vibration member 110 of the right region RA may not have a rectangular shape, and a first surface of the connection member 140 may be deformed to be adaptive to the degree of bending of the vibration member 110 of the right region RA. In addition, as described below with reference to FIGS. 13 to 16, in a case where the vibration member 110 is not fixed to one bending state by the curvature variable layer 160 or the curvature variation device 170 and a bending state of the vibration member 110 varies, the first surface of the connection member 140 coupled to the second surface 110*b* of the vibration member 110 may be fixed to the vibration member 110 regardless of a variable bending state of the connection member 110, and a shape of the first surface of the connection member 140 may also vary to be adaptive to a bending state of the second surface 110*b* of the vibration member 110.

The one or more vibration devices 131 according to an embodiment of the present disclosure may vibrate based on a vibration driving signal (or a sound signal or a voice signal) provided from a sound processing circuit to vibrate the vibration member 110, thereby generating or outputting a sound. In a sound generated based on a vibration of the vibration member 110, a sound pressure level characteristic may increase based on a vibration, having various natural vibration frequencies, of the vibration member 110, and a reproduction pitched sound band may be extended. For example, when the vibration member 110 having a non-planar structure vibrates, a sound of a high-pitched sound band may be generated or output in a relatively thick region, and a sound of a low-pitched sound band may be generated or output in a relatively thin region.

Figure 3A:
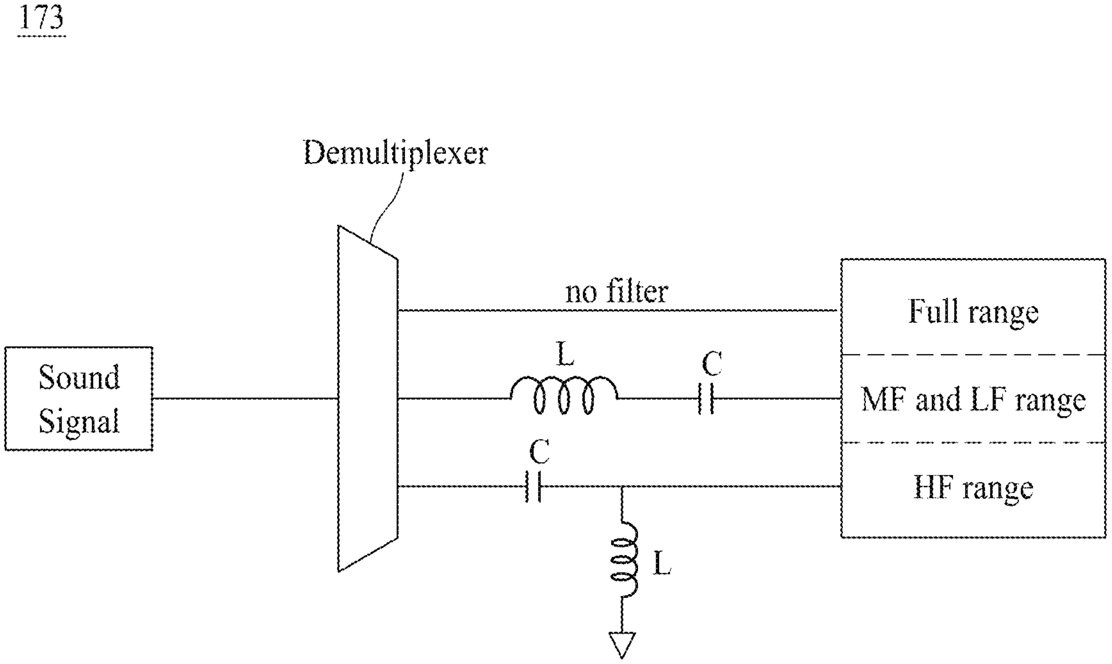
FIG. 3A illustrates a structure of a demultiplexer according to an embodiment of the present disclosure.
Figure 3B:
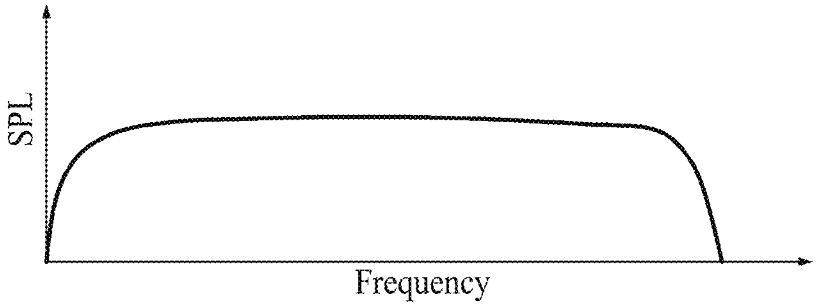
FIGS. 3B to 3D illustrate a sound reproduction characteristic of a vibration apparatus based on a demultiplexer.
Figure 3C:
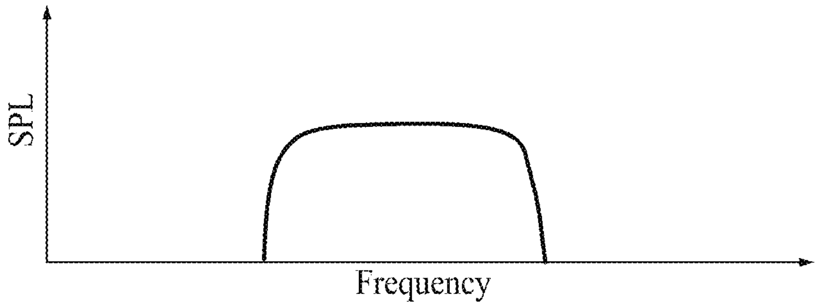
Figure 3D:
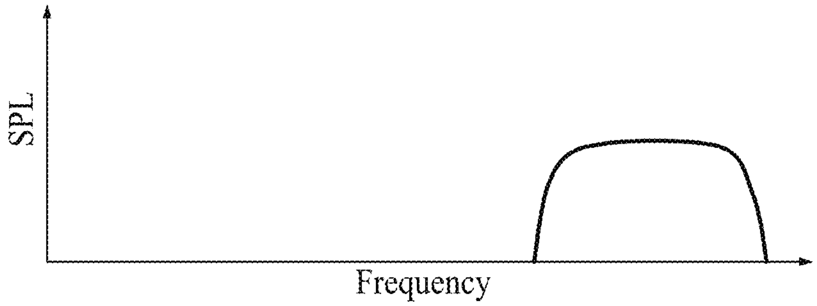

FIG. 3A illustrates a structure of a demultiplexer according to an embodiment of the present disclosure, and FIGS. 3B to 3D illustrate a sound reproduction characteristic of a vibration apparatus based on a demultiplexer. In FIGS. 3B to 3D, the abscissa axis represents a frequency in hertz (Hz), and the ordinate axis represents a sound pressure level SPL in decibels (dB). A frequency may be a frequency of a high-pitched sound band toward the abscissa axis.

With reference to FIG. 3A, an external sound signal may be input as an input signal to a demultiplexer 173. The demultiplexer 173 may be an element of the sound processing circuit 170 and may be an element which is integrated into the sound processing circuit 170. The demultiplexer 173 may select a filter which is to be applied to the input sound signal or whether a filter is to be applied or not and may provide a driving signal (or a sound signal or a voice signal) to the vibration apparatus 130.

With reference to FIG. 3B, when the sound processing circuit 170 including the demultiplexer 173 is connected to the first vibration device 131-1, the demultiplexer 173 may supply the first vibration device 131-1 with a driving signal to which a filter is not applied, and thus, the first vibration device 131-1 may have a sound reproduction characteristic of a full pitched sound band.

With reference to FIG. 3C, when the sound processing circuit 170 including the demultiplexer 173 is connected to the third vibration device 131-3, the demultiplexer 173 may supply the third vibration device 131-3 with a driving signal to which a band-pass filter is applied, and thus, the third vibration device 131-3 may have a sound reproduction characteristic of a middle-pitched sound band and a low-pitched sound band. For example, the band-pass filter may include an inductor L and a capacitor C connected in series between the demultiplexer 173 and the third vibration device 131-3, but embodiments of the present disclosure are not limited thereto.

With reference to FIG. 3D, when the sound processing circuit 170 including the demultiplexer 173 is connected to the second vibration device 131-2, the demultiplexer 173 may supply the second vibration device 131-2 with a driving signal to which a high-pass filter is applied, and thus, the second vibration device 131-2 may have a sound reproduction characteristic of a high-pitched sound band. For example, the high-pass filter may include an inductor L and a capacitor C connected in parallel between the demultiplexer 173 and the second vibration device—131-2, but embodiments of the present disclosure are not limited thereto.

Figure 4:
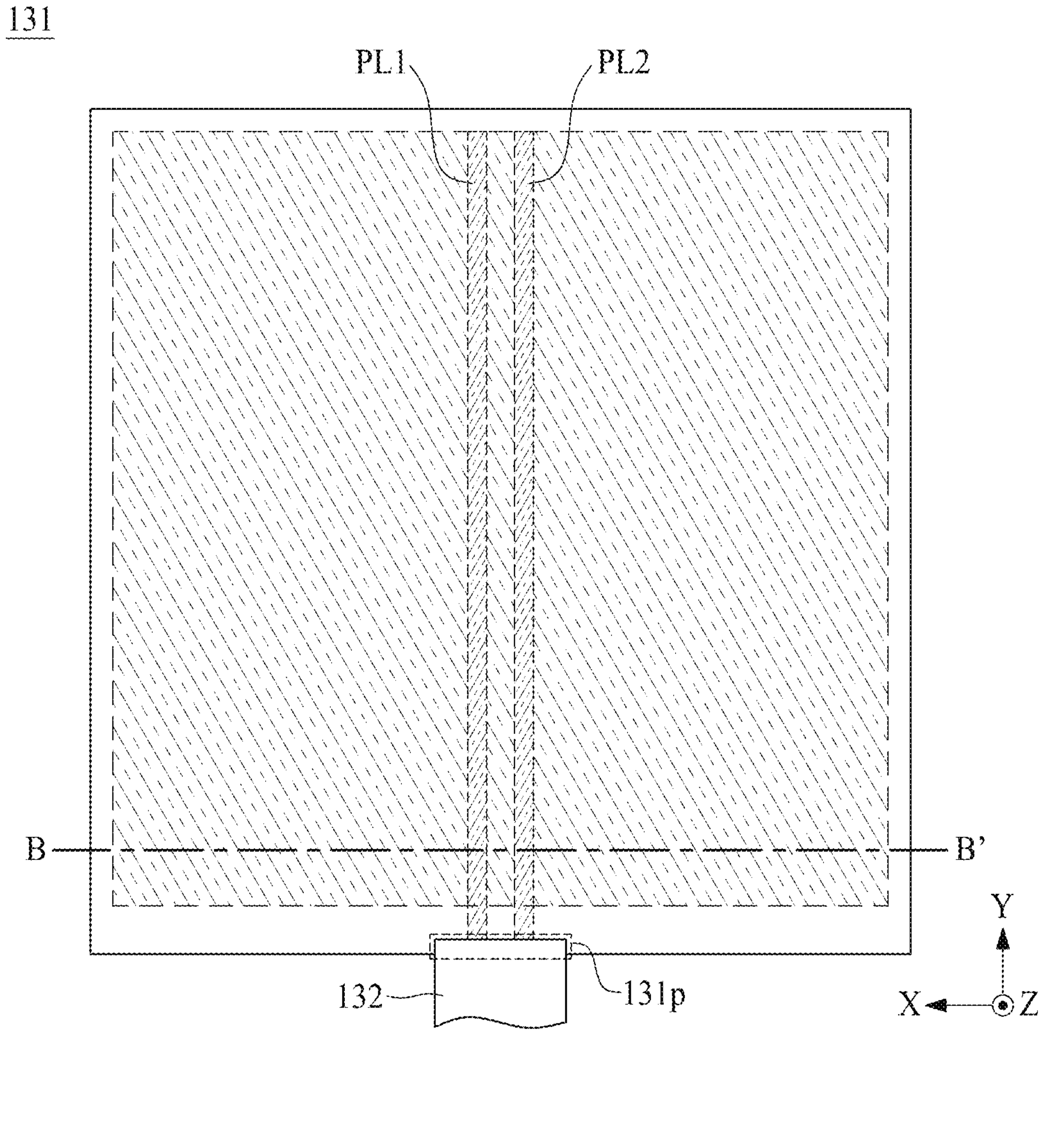
FIG. 4 illustrates a vibration device according to an embodiment of the present disclosure.
Figure 5:
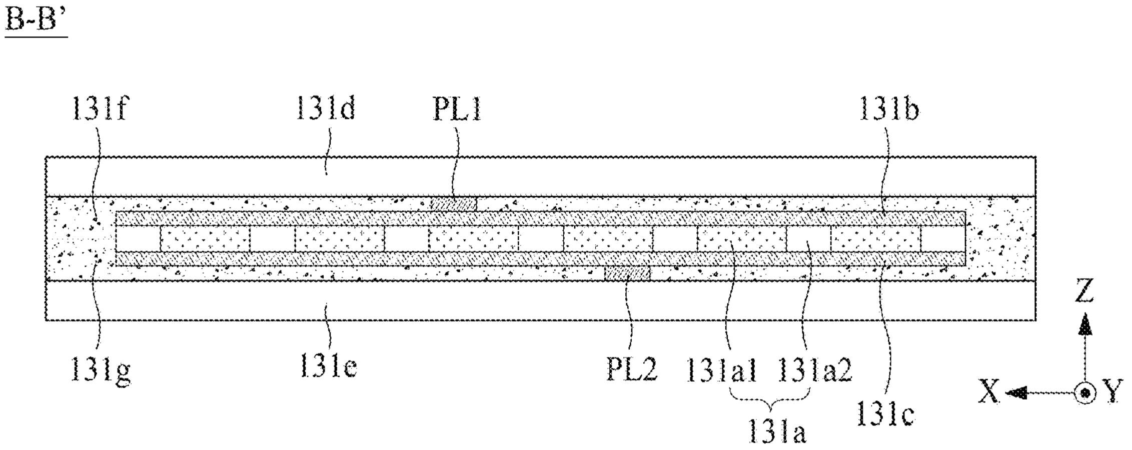
FIG. 5 is a cross-sectional view taken along line B-B' illustrated in FIG. 4.
Figure 6:
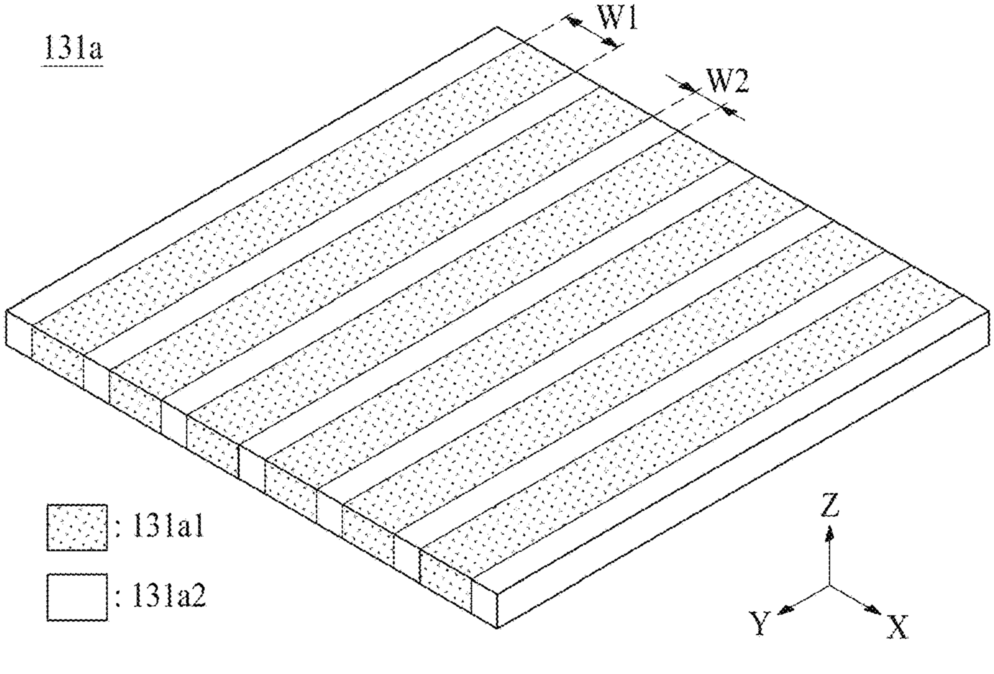
FIG. 6 is a perspective view illustrating a vibration portion illustrated in FIG. 5.

FIG. 4 illustrates a vibration device according to an embodiment of the present disclosure. FIG. 5 is a cross-sectional view taken along line B-B' illustrated in FIG. 4. FIG. 6 is a perspective view illustrating a vibration portion illustrated in FIG. 5. FIGS. 4 to 6 illustrate another embodiment of the vibration device illustrated in one or more of FIGS. 1 and 2.

With reference to FIGS. 4 to 6, a vibration device 131 according to an embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film-type piezoelectric composite actuator, a film speaker, a film-type piezoelectric speaker, or a film-type piezoelectric composite speaker, or the like, but embodiments of the present disclosure are not limited thereto.

The vibration device 131 according to an embodiment of the present disclosure may include a vibration generating portion which has a vibration portion 131*a*, a first electrode portion 131*b*, and a second electrode portion 131*c*.

The vibration portion 131*a* may include a piezoelectric material (or an electroactive material) which has a piezoelectric effect. For example, the piezoelectric material may have a characteristic in which, when pressure or twisting (or bending) is applied to a crystalline structure by an external force, a potential difference occurs due to dielectric polarization (or poling) caused by a relative position change of a positive (+) ion and a negative (−) ion, and a vibration is generated by an electric field based on a reverse voltage applied thereto. The vibration portion 131*a* may be referred to as a vibration layer, a piezoelectric layer, a piezoelectric material layer, an electroactive layer, a piezoelectric vibration portion, a piezoelectric material portion, an electroactive portion, a piezoelectric structure, a piezoelectric composite layer, a piezoelectric composite, or a piezoelectric ceramic composite, or the like, but embodiments of the present disclosure are not limited thereto. The vibration portion 131*a* may be formed of a transparent, semitransparent, or opaque piezoelectric material and may be transparent, semitransparent, or opaque.

The vibration portion 131*a* according to an embodiment of the present disclosure may include a plurality of first portions 131*a*1 and a plurality of second portions 131*a*2. For example, the plurality of first portions 131*a*1 and the plurality of second portions 131*a*2 may be alternately and repeatedly arranged along a first direction X (or a second direction Y). For example, the first direction X may be a widthwise direction of the vibration portion 131*a*, the second direction Y may be a lengthwise direction of the vibration portion 131*a*, but embodiments of the present disclosure are not limited thereto. For example, the first direction X may be the lengthwise direction of the vibration portion 131*a*, and the second direction Y may be the widthwise direction of the vibration portion 131*a*.

Each of the plurality of first portions 131*a*1 may be configured as an inorganic material portion. The inorganic material portion may include a piezoelectric material, a composite piezoelectric material, or an electroactive material which has a piezoelectric effect.

Each of the plurality of first portions 131*a*1 may be configured as a ceramic-based material for generating a relatively high vibration, or may be configured as a piezoelectric ceramic having a perovskite-based crystalline structure. The perovskite crystalline structure may have a piezoelectric effect and an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. As an embodiment of the present disclosure, in the chemical formula "$ABO_3$", "A", and "B" may be cations, and "O" may be anions. For example, each of the plurality of first portions 131*a*1 may include one of lead (II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

The first portions 131*a*1 of the vibration portion 131*a* according to an embodiment of the present disclosure may include a lead zirconate titanate (PZT)-based material including lead (Pb), zirconium (Zr), and titanium (Ti); or may include a lead zirconate nickel niobate (PZNN)-based material including lead (Pb), zirconium (Zr), nickel (Ni), and niobium (Nb), but embodiments of the present disclosure are not limited thereto. In addition, the first portions 131*a*1 of the vibration portion 131*a* may include at least one or more of calcium titanate ($CaTiO_3$), $BaTiO_3$, and $SrTiO_3$, without lead (Pb), but embodiments of the present disclosure are not limited thereto.

Each of the plurality of first portions 131*a*1 according to an embodiment of the present disclosure may be disposed between the plurality of second portions 131*a*2 and may have a first width W1 parallel to the first direction X (or the second direction Y) and a length parallel to the second direction Y (or the first direction X). Each of the plurality of second portions 131*a*2 may have a second width W2 parallel to the first direction X (or the second direction Y) and may have a length parallel to the second direction Y (or the first direction X). The first width W1 may be the same as or different from the second width W2. For example, the first width W1 may be greater than the second width W2. For example, the first portion 131*a*1 and the second portion 131*a*2 may include a line shape or a stripe shape which has the same size or different sizes. Therefore, the vibration portion 131*a* may include a 2-2 composite structure having a piezoelectric characteristic of a 2-2 vibration mode, and thus, may have a resonance frequency of 20 kHz or less, but embodiments of the present disclosure are not limited thereto. For example, a resonance frequency of the vibration portion 131*a* may vary based on at least one or more of a shape, a length, and a thickness, or the like.

In the vibration portion 131*a*, each of the plurality of first portions 131*a*1 and the plurality of second portions 131*a*2 may be disposed (or arranged) at the same plane (or the same layer) in parallel. Each of the plurality of second portions 131*a*2 may be configured to fill a gap between two adjacent first portions of the plurality of first portions 131*a*1 and may be connected or adhered to a second portion 131*a*2 adjacent thereto. Therefore, the vibration portion 131*a* may extend by a desired size or length based on the side coupling (or connection) of the first portion 131_a_1 and the second portion 131_a_2.

In the vibration portion 131_a_, a width (or a size) W2 of each of the plurality of second portions 131_a_2 may progressively decrease in a direction from a center portion to both peripheries (or both ends) of the vibration portion 131_a_ or the vibration device 131.

According to an embodiment of the present disclosure, a second portion 131_a_2 having a largest width W2 among the plurality of second portions 131_a_2 may be located at a portion at which a highest stress may concentrate when the vibration portion 131_a_ or the vibration device 131 vibrates (or is vibrating) in a vertical direction Z (or a thickness direction). A second portion 131_a_2 having a smallest width W2 among the plurality of second portions 131_a_2 may be located at a portion where a relatively low stress may occur when the vibration portion 131_a_ or the vibration device 131 vibrates in the vertical direction Z. For example, the second portion 131_a_2 having the largest width W2 among the plurality of second portions 131_a_2 may be disposed at the center portion of the vibration portion 131_a_, and the second portion 131_a_2 having the smallest width W2 among the plurality of second portions 131_a_2 may be disposed at each of the both peripheries of the vibration portion 131_a_. Therefore, when the vibration portion 131_a_ or the vibration device 131 vibrates in the vertical direction Z, interference of a sound wave or overlapping of a resonance frequency, each occurring in the portion on which the highest stress concentrates, may be reduced or minimized. Thus, dip phenomenon of a sound pressure level occurring in the low-pitched sound band may be reduced, thereby improving flatness of a sound characteristic in the low-pitched sound band.

In the vibration portion 131_a_, each of the plurality of first portions 131_a_1 may have different sizes (or widths). For example, a size (or a width) of each of the plurality of first portions 131_a_1 may progressively decrease or increase in a direction from the center portion to the both peripheries (or both ends) of the vibration portion 131_a_ or the vibration device 131. For example, in the vibration portion 131_a_, a sound pressure level characteristic of a sound may be enhanced and a sound reproduction band may increase, based on various natural vibration frequencies according to a vibration of each of the plurality of first portions 131_a_1 having different sizes.

The plurality of second portions 131_a_2 may be disposed between the plurality of first portions 131_a_1. Therefore, in the vibration portion 131_a_ or the vibration device 131, vibration energy by a link in a unit lattice of each first portion 131_a_1 may increase by a corresponding second portion 131_a_2, and thus, a vibration characteristic may increase, and a piezoelectric characteristic and flexibility may be secured. For example, the second portion 131_a_2 may include one or more of an epoxy-based polymer, an acrylic-based polymer, and a silicone-based polymer, but embodiments of the present disclosure are not limited thereto.

The plurality of second portions 131_a_2 according to an embodiment of the present disclosure may be configured as an organic material portion. For example, the organic material portion may be disposed between the inorganic material portions, and thus, may absorb an impact applied to the inorganic material portion (or the first portion), may release a stress concentrating on the inorganic material portion to enhance the total durability of the vibration portion 131_a_ or the vibration device 131, and may provide flexibility to the vibration portion 131_a_ or the vibration device 131.

The plurality of second portions 131_a_2 according to an embodiment of the present disclosure may have a modulus (or Young's modulus) and viscoelasticity that are lower than those of each first portion 131_a_1, and thus, the second portion 131_a_2 may enhance the reliability of each first portion 131_a_1 vulnerable to an impact due to a fragile characteristic. For example, the second portion 131_a_2 may be configured as a material having a loss coefficient of about 0.01 to about 1 and modulus of about 0.1 GPa (Giga Pascal) to about 10 GPa (Giga Pascal).

The organic material portion configured at the second portion 131_a_2 may include one or more of an organic material, an organic polymer, an organic piezoelectric material, or an organic non-piezoelectric material that has a flexible characteristic in comparison with the inorganic material portion of the first portions 131_a_1. For example, the second portion 131_a_2 may be referred to as an adhesive portion, an elastic portion, a bending portion, a damping portion, or a flexible portion each having flexibility, but embodiments of the present disclosure are not limited thereto.

The plurality of first portions 131_a_1 and the second portion 131_a_2 may be disposed on (or connected to) the same plane, and thus, the vibration portion 131_a_ according to an embodiment of the present disclosure may have a single thin film-type. For example, the vibration portion 131_a_ may have a structure in which a plurality of first portions 131_a_1 are connected to one side. For example, the plurality of first portions 131_a_1 may have a structure connected to a whole the vibration portion 131_a_. For example, the vibration portion 131_a_ may be vibrated in a vertical direction by the first portion 131_a_1 having a vibration characteristic and may be bent in a curved shape by the second portion 131_a_2 having flexibility. In addition, in the vibration portion 131_a_ according to an embodiment of the present disclosure, a size of the first portion 131_a_1 and a size of the second portion 131_a_2 may be adjusted based on a piezoelectric characteristic and flexibility needed for the vibration portion 131_a_ or the vibration device 131. As an embodiment of the present disclosure, when the vibration portion 131_a_ needs a piezoelectric characteristic rather than flexibility, a size of the first portion 131_a_1 may be adjusted to be greater than that of the second portion 131_a_2. As another embodiment of the present disclosure, when the vibration portion 131_a_ needs flexibility rather than a piezoelectric characteristic, a size of the second portion 131_a_2 may be adjusted to be greater than that of the first portion 131_a_1. Accordingly, a size of the vibration portion 131_a_ may be adjusted based on a characteristic needed therefor, and thus, the vibration portion 131_a_ may be easy to design.

The first electrode portion 131_b_ may be disposed at a first surface (or an upper surface) of the vibration portion 131_a_. The first electrode portion 131_b_ may be disposed at or coupled to a first surface of each of a plurality of first portions 131_a_1 and a first surface of each of a plurality of second portions 131_a_2 in common and may be electrically connected to the first surface of each of the plurality of first portions 131_a_1. For example, the first electrode portion 131_b_ may be a single-body electrode (or a common electrode) shape which is disposed at a whole first surface of the vibration portion 131_a_. For example, the first electrode portion 131_b_ may have substantially the same shape as that of the vibration portion 131_a_, but embodiments of the present disclosure are not limited thereto.

The first electrode portion 131_b_ according to an embodiment of the present disclosure may be formed of a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), Mg, or the like, or an alloy thereof, but embodiments of the present disclosure are not limited thereto.

The second electrode portion 131*c* may be disposed at a second surface (or a rear surface) different from (or opposite to) the first surface of the vibration portion 131*a*. The second electrode portion 131*c* may be disposed at or coupled to a second surface of each of a plurality of first portions 131*a*1 and the second surface of each of a plurality of second portions 131*a*2 in common and may be electrically connected to a second surface of each of the plurality of first portions 131*a*1. For example, the second electrode portion 131*c* may be a single-body electrode (or a common electrode) shape which is disposed at a whole second surface of the vibration portion 131*a*. The second electrode portion 131*c* may have the same shape as the vibration portion 131*a*, but embodiments of the present disclosure are not limited thereto. The second electrode portion 131*c* according to an embodiment of the present disclosure may be formed of a transparent conductive material, a semitransparent conductive material, or an opaque conductive material. For example, the second electrode portion 131*c* may be formed of the same material as the first electrode portion 131*b*, but embodiments of the present disclosure are not limited thereto. As another embodiment of the present disclosure, the second electrode portion 131*c* may be formed of a different material than the first electrode portion 131*b*.

The vibration portion 131*a* may be polarized (or poling) by a certain voltage applied to the first electrode portion 131*b* and the second electrode portion 131*c* in a certain temperature atmosphere, or a temperature atmosphere that may be changed from a high temperature to a room temperature, but embodiments of the present disclosure are not limited thereto. For example, the vibration portion 131*a* may alternately and repeatedly contract and expand based on an inverse piezoelectric effect according to a sound signal (or a voice signal or a vibration driving signal) applied to the first electrode portion 131*b* and the second electrode portion 131*c* from the outside to vibrate. For example, the vibration portion 131*a* may vibrate based on a vertical-direction vibration and a planar direction vibration by the first electrode portion 131*b* and the second electrode portion 131*c*. The vibration portion 131*a* may increase the displacement of a vibration member (or a vibration plate or a vibration object) by contraction and expansion of the planar direction, thereby further improving the vibration.

The vibration device 131 according to an embodiment of the present disclosure may further include a first cover member 131*d* and a second cover member 131*e*.

The first cover member 131*d* may be disposed at the first surface of the vibration device 131. For example, the first cover member 131*d* may be configured to cover the first electrode portion 131*b*. Accordingly, the first cover member 131*d* may protect the first electrode portion 131*b*.

The second cover member 131*e* may be disposed at the second surface of the vibration device 131. For example, the second cover member 131*e* may be configured to cover the second electrode portion 131*c*. Accordingly, the second cover member 131*e* may protect the second electrode portion 131*c*.

The first cover member 131*d* and the second cover member 131*e* according to an embodiment of the present disclosure may each include one or more material of a plastic, a fiber, and wood, but embodiments of the present disclosure are not limited thereto. For example, each of the first cover member 131*d* and the second cover member 131*e* may include the same or different material. For example, each of the first cover member 131*d* and the second cover member 131*e* may be a polyimide (PI) film or a polyethylene terephthalate (PET) film, but embodiments of the present disclosure are not limited thereto.

The first cover member 131*d* according to an embodiment of the present disclosure may be connected or coupled to the first electrode portion 131*b* by a first adhesive layer 131*f* For example, the first cover member 131*d* may be connected or coupled to the first electrode portion 131*b* by a film laminating process using the first adhesive layer 131*f*.

The second cover member 131*e* according to an embodiment of the present disclosure may be connected or coupled to the second electrode portion 131*c* by a second adhesive layer 131*g*. For example, the second cover member 131*e* may be connected or coupled to the second electrode portion 131*c* by a film laminating process using the second adhesive layer 131*g*.

The first adhesive layer 131*f* may be disposed between the first electrode portion 131*b* and the first cover member 131*d*. The second adhesive layer 131*g* may be disposed between the second electrode portion 131*c* and the second cover member 131*e*. For example, the first adhesive layer 131*f* and second adhesive layer 131*g* may be configured between the first cover member 131*d* and the second cover member 131*e* to completely surround the vibration portion 131*a*, the first electrode portion 131*b*, and the second electrode portion 131*c*. For example, the vibration portion 131*a*, the first electrode portion 131*b*, and the second electrode portion 131*c* may be embedded or built-in between the first adhesive layer 131*f* and the second adhesive layer 131*g*.

Each of the first adhesive layer 131*f* and second adhesive layer 131*g* according to an embodiment of the present disclosure may include an electric insulating material which has adhesiveness and is capable of compression and decompression. For example, each of the first adhesive layer 131*f* and the second adhesive layer 131*g* may include an epoxy resin, an acrylic resin, a silicone resin, or a urethane resin, but embodiments of the present disclosure are not limited thereto.

According to an embodiment of the present disclosure, any one of the first cover member 131*d* and the second cover member 131*e* may be attached to or coupled to the vibration member (or the vibration plate or the vibration object) by an adhesive member. For example, any one of the first cover member 131*d* and the second cover member 131*e* may be attached on or coupled to the vibration member 110 by the adhesive member 120 as described above with reference to FIGS. 1 to 3.

The vibration device 131 according to an embodiment of the present disclosure may further include a first power supply line PL1 disposed at the first cover member 131*d*, a second power supply line PL2 disposed at the second cover member 131*e*, and a pad part 131*p* electrically connected to the first power supply line PL1 and the second power supply line PL2.

The first power supply line PL1 may be disposed between the first electrode portion 131*b* and the first cover member 131*d* and may be electrically connected to the first electrode portion 131*b*. The first power supply line PL1 may be extended long along the second direction Y and may be electrically connected to a central portion of the first electrode portion 131*b*. As an embodiment of the present disclosure, the first power supply line PL1 may be electrically connected to the first electrode portion 131*b* by an anisotropic conductive film. As another embodiment of the present disclosure, the first power supply line PL1 may be electrically connected to the first electrode portion 131*b* through a conductive material (or particle) included in the first adhesive layer 131*f*.

The second power supply line PL2 may be disposed between the second electrode portion 131*c* and the second cover member 131*e* and may be electrically connected to the second electrode portion 131*c*. The second power supply line PL2 may be extended long along the second direction Y and may be electrically connected to a central portion of the second electrode portion 131*c*. As an embodiment of the present disclosure, the second power supply line PL2 may be electrically connected to the second electrode portion 131*c* by an anisotropic conductive film. As another embodiment of the present disclosure, the second power supply line PL2 may be electrically connected to the second electrode portion 131*c* through a conductive material (or particle) included in the second adhesive layer 131*g*.

The pad part 131*p* may be configured at one periphery portion of any one of the first cover member 131*d* and the second cover member 131*e* to be electrically connected to one portion (or one end) of each of the first power supply line PL1 and the second power supply line PL2.

The pad part 131*p* according to an embodiment of the present disclosure may include a first pad electrode electrically connected to one end of the first power supply line PL1, and a second pad electrode electrically connected to one end of the second power supply line PL2.

The first pad electrode may be disposed at one periphery portion of any one of the first cover member 131*d* and the second cover member 131*e* to be electrically connected to one portion of the first power supply line PL1. For example, the first pad electrode may pass through any one of the first cover member 131*d* and the second cover member 131*e* to be electrically connected to one portion of the first power supply line PL1.

The second pad electrode may be disposed in parallel with the first pad electrode to be electrically connected to one portion of the second power supply line PL2. For example, the second pad electrode may pass through any one of the first cover member 131*d* and the second cover member 131*e* to be electrically connected to one portion of the second power supply line PL2.

According to an embodiment of the present disclosure, each of the first power supply line PL1, the second power supply line PL2, and the pad part 131*p* may be configured to be transparent, translucent, or opaque.

The pad part 131*p* according to another embodiment of the present disclosure may be electrically connected to a signal cable 132.

The signal cable 132 may be electrically connected to the pad part 131*p* disposed at the vibration device 131 and may supply the vibration device 131 with vibration driving signal (or a sound signal or a voice signal) provided from a sound processing circuit. The signal cable 132 according to an embodiment of the present disclosure may include a first terminal electrically connected to the first pad electrode of the pad part 131*p* and a second terminal electrically connected to the second pad electrode of the pad part 131*p*. For example, the signal cable 132 may be configured as a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sound processing circuit may generate an alternating current (AC) vibration driving signal including a first vibration driving signal and a second vibration driving signal based on a sound data provided from an external sound data generating circuit part. The first vibration driving signal may be any one of a positive (+) vibration driving signal and a negative (−) vibration driving signal, and the second vibration driving signal may be any one of a positive (+) vibration driving signal and a negative (−) vibration driving signal. For example, the first vibration driving signal may be supplied to the first electrode portion 131*b* through a first terminal of the signal cable 132, the first pad electrode of the pad part 131*p*, and the first power supply line PL1. The second vibration driving signal may be supplied to the second electrode portion 131*c* through a second terminal of the signal cable 132, the second pad electrode of the pad part 131*p*, and the second power supply line PL2.

According to an embodiment of the present disclosure, the signal cable 132 may be configured to be transparent, semitransparent, or opaque.

As described above, the vibration device 131 according to an embodiment of the present disclosure may be implemented as a thin film type where the first portion 131*a*1 having a piezoelectric characteristic and a second portion 131*a*2 having flexibility are alternately repeated and connected, and thus, may be bent in a shape corresponding to a shape of the vibration member or the vibration object. For example, when the vibration device 131 is connected or coupled to the vibration member including various curved portions by an adhesive member 120, the vibration device 131 may be bent in a curved shape along a shape of a curved portion of the vibration member and reliability against damage or breakdown may not be reduced despite being bent in a curved shape.

FIGS. 7A to 7D are perspective views illustrating a vibration portion according to another embodiment of the present disclosure, in vibration device according to an embodiment of the present disclosure.

Figure 7A:
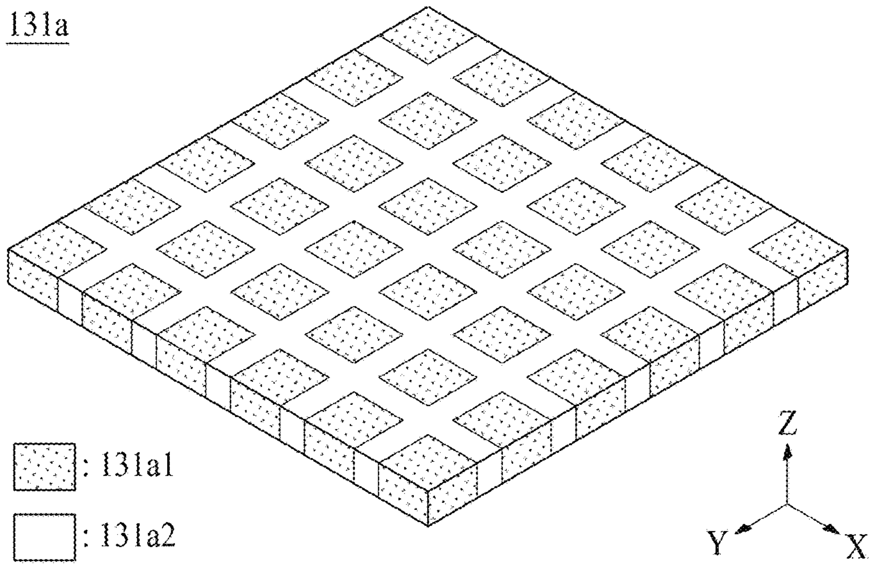
FIGS. 7A to 7D are a perspective view illustrating a vibration portion according to another embodiment of the present disclosure in the vibration device according to an embodiment of the present disclosure.

With reference to FIG. 7A, the vibration portion 131*a* according to another embodiment of the present disclosure may include a plurality of first portions 131*a*1, which are spaced apart from one another along a first direction X and a second direction Y, and a second portion 131*a*2 (or one or more second portions) disposed between the plurality of first portions 131*a*1.

Each of the plurality of first portions 131*a*1 may be disposed to be spaced apart from one another along the first direction X and the second direction Y. For example, each of the plurality of first portions 131*a*1 may have a hexahedral shape (or a six-sided object shape) having the same size and may be disposed in a lattice shape. Each of the plurality of first portions 131*a*1 may include a piezoelectric material which is be substantially the same as the first portion 131*a*1 described above with reference to FIGS. 4 to 6, and thus, like reference numerals may refer to like elements, and their repetitive descriptions may be omitted.

The second portion 131*a*2 may be disposed between the plurality of first portions 131*a*1 along each of the first direction X and the second direction Y. The second portion 131*a*2 may be configured to fill a gap or a space between two adjacent first portions 131*a*1 or to surround each of the plurality of first portions 131*a*1, and thus, may be connected or adhered to an adjacent first portion 131*a*1. According to an embodiment of the present disclosure, a width of a second portion 131*a*2 disposed between two first portions 131*a*1 adjacent to each other along the first direction X may be the same as or different from that of a width of the first portion 131*a*1, and the width of a second portion 131*a*2 disposed between two first portions 131*a*1 adjacent to each other along the second direction Y may be the same as or different from that of the width of the first portion 131*a*1. The second portion 131*a*2 may include an organic material which is be substantially the same as the second portion 131*a*2 described above with reference to FIGS. 4 to 6, and thus, like reference numerals may refer to like elements, and their repetitive descriptions may be omitted.

As described above, the vibration portion 131*a* according to another embodiment of the present disclosure may include a 1-3 composite structure having a piezoelectric characteristic of a 1-3 vibration mode, and thus, may have a resonance frequency of 30 MHz or less, but embodiments of the present disclosure are not limited thereto. For example, a resonance frequency of the vibration portion 131*a* may vary based on at least one or more of a shape, a length, and a thickness, or the like.

Figure 7B:
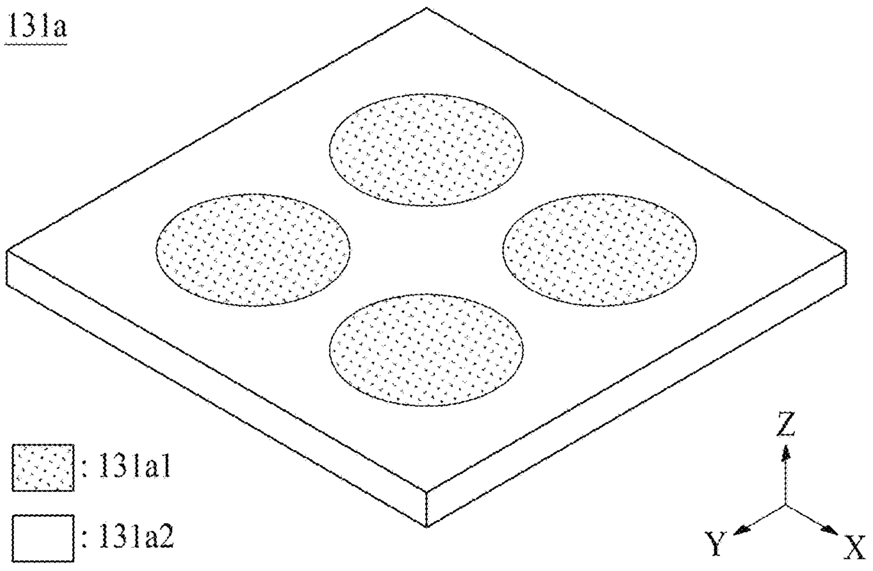

With reference to FIG. 7B, the vibration portion 131*a* according to another embodiment of the present disclosure may include a plurality of first portions 131*a*1, which are spaced apart from one another along a first direction X and a second direction Y, and a second portion (or one or more second portions) 131*a*2 disposed between the plurality of first portions 131*a*1.

Each of the plurality of first portions 131*a*1 may have a flat structure of a circular shape. For example, each of the plurality of first portions 131*a*1 may have a circular plate shape, but embodiments of the present disclosure are not limited thereto. For example, each of the plurality of first portions 131*a*1 may have a dot shape including an oval shape, a polygonal shape, or a donut shape. Each of the plurality of first portions 131*a*1 may include a piezoelectric material which is be substantially the same as the first portion 131*a*1 described above with reference to FIGS. 4 to 6, and thus, like reference numerals may refer to like elements, and their repetitive descriptions may be omitted.

The second portion 131*a*2 may be disposed between the plurality of first portions 131*a*1 along each of the first direction X and the second direction Y. The second portion 131*a*2 may be configured to surround each of the plurality of first portions 131*a*1, and thus, may be connected or adhered to a side surface of each of the plurality of first portions 131*a*1. Each of the plurality of first portions 131*a*1 and the second portion 131*a*2 may be disposed (or arranged) in parallel on the same plane (or the same layer). The second portion 131*a*2 may include an organic material which is be substantially the same as the second portion 131*a*2 described above with reference to FIGS. 4 to 6, and thus, like reference numerals may refer to like elements, and their repetitive descriptions may be omitted.

Figure 7C:
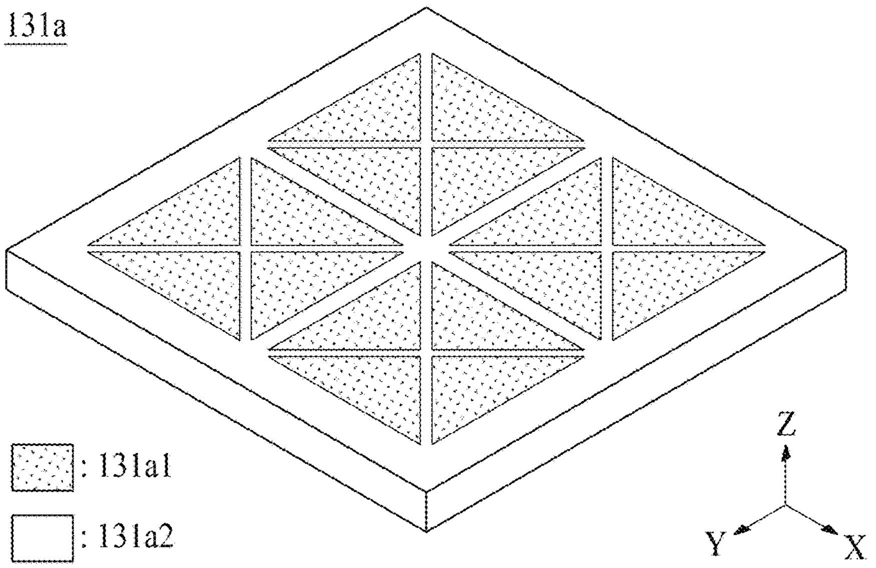

With reference to FIG. 7C, the vibration portion 131*a* according to another embodiment of the present disclosure may include a plurality of first portions 131*a*1, which are spaced apart from one another along a first direction X and a second direction Y, and a second portion (or one or more second portions) 131*a*2 disposed between the plurality of first portions 131*a*1.

Each of the plurality of first portions 131*a*1 may have a flat structure of a triangular shape. For example, each of the plurality of first portions 131*a*1 may have a triangular plate shape. Each of the plurality of first portions 131*a*1 may include a piezoelectric material which is be substantially the same as the first portion 131*a*1 described above with reference to FIGS. 4 to 6, and thus, like reference numerals may refer to like elements, and their repetitive descriptions may omitted.

According to an embodiment of the present disclosure, four adjacent first portions 131*a*1 among the plurality of first portions 131*a*1 may be adjacent to one another to form a tetragonal (or a square shape or quadrilateral shape). Vertices of the four adjacent first portions 131*a*1 forming a tetragonal shape may be adjacent to one another in a center portion (or a central portion) of the tetragonal shape.

The second portion 131*a*2 may be disposed between the plurality of first portions 131*a*1 along each of the first direction X and the second direction Y. The second portion 131*a*2 may be configured to surround each of the plurality of first portions 131*a*1, and thus, may be connected or adhered to a side surface of each of the plurality of first portions 131*a*1. Each of the plurality of first portions 131*a*1 and the second portion 131*a*2 may be disposed (or arranged) in parallel on the same plane (or the same layer). The second portion 131*a*2 may include an organic material which is be substantially the same as the second portion 131*a*2 described above with reference to FIGS. 4 to 6 and thus, like reference numerals may refer to like elements, and their repetitive descriptions may be omitted.

Figure 7D:
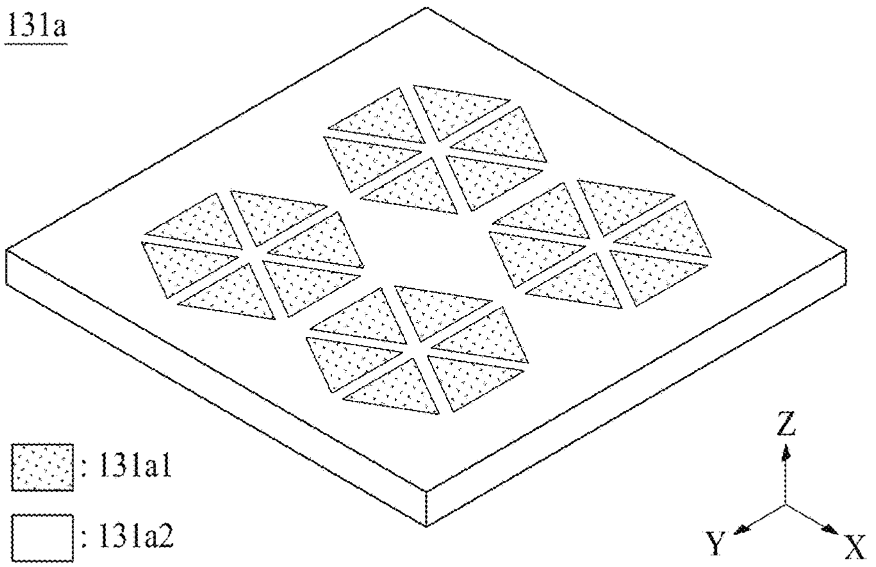

With reference to FIG. 7D, the vibration portion 131*a* according to another embodiment of the present disclosure may include a plurality of first portions 131*a*1, which are spaced apart from one another along a first direction X and a second direction Y, and a second portion (or one or more second portions) 131*a*2 disposed between the plurality of first portions 131*a*1.

Each of the plurality of first portions 131*a*1 may have a flat structure of a triangular shape. For example, each of the plurality of first portions 131*a*1 may have a triangular plate shape. Each of the plurality of first portions 131*a*1 may include a piezoelectric material which is be substantially the same as the first portion 131*a*1 described above with reference to FIGS. 4 to 6, and thus, like reference numerals may refer to like elements, and their repetitive descriptions may be omitted.

According to another embodiment of the present disclosure, six adjacent first portions 131*a*1 of the plurality of first portions 131*a*1 may be adjacent to one another to form a hexagonal shape (or a regularly hexagonal shape). Vertices of the six adjacent first portions 131*a*1 forming a hexagonal shape may be adjacent to one another in a center portion (or a central portion) of the hexagonal shape.

The second portion 131*a*2 may be disposed between the plurality of first portions 131*a*1 along each of the first direction X and the second direction Y. The second portion 131*a*2 may be configured to surround each of the plurality of first portions 131*a*1, and thus, may be connected or adhered to a side surface of each of the plurality of first portions 131*a*1. Each of the plurality of first portions 131*a*1 and the second portion 131*a*2 may be disposed (or arranged) in parallel on the same plane (or the same layer). The second portion 131*a*2 may include an organic material which is be substantially the same as the second portion 131*a*2 described above with reference to FIGS. 4 to 6, and thus, like reference numerals may refer to like elements, and their repetitive descriptions may be omitted.

Figure 8:
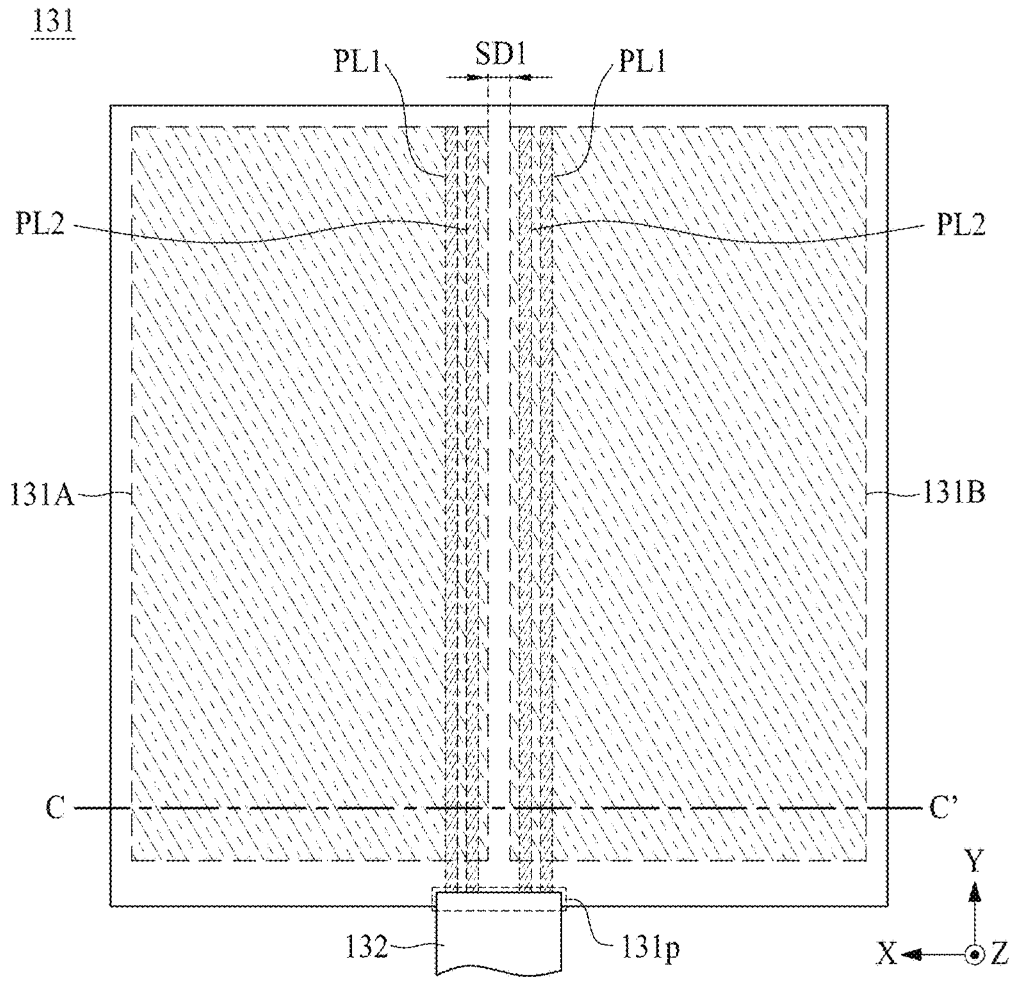
FIG. 8 illustrates a vibration device according to another embodiment of the present disclosure.
Figure 9:
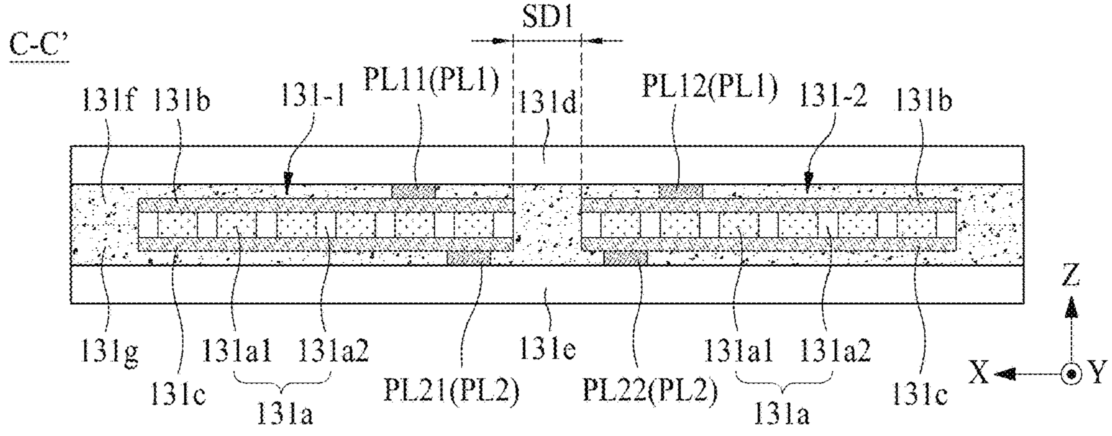
FIG. 9 is a cross-sectional view taken along line C-C' illustrated in FIG. 8.

FIG. 8 illustrates a vibration device according to another embodiment of the present disclosure. FIG. 9 is a cross-sectional view taken along line C-C' illustrated in FIG. 8. FIGS. 8 and 9 illustrate another embodiment of the vibration device illustrated in one or more of FIGS. 1 to 3.

With reference to FIGS. 8 and 9, the vibration device 131 according to another embodiment of the present disclosure may include first and second vibration generating portions 131A and 131B.

Each of the first and second vibration generating portions 131A and 131B may be electrically separated and disposed while being spaced apart from each other along a first direction X. Each of the first and second vibration generating portions 131A and 131B may alternately and repeatedly contract and/or expand based on a piezoelectric effect to vibrate. For example, the first and second vibration generating portions 131A and 131B may be disposed or tiled at a certain interval (or distance) SD1 along the first direction X. Thus, the vibration device 131 in which the first and second vibration generating portions 131A and 131B are tiled may be a vibration array, a vibration array portion, a vibration module array portion, a vibration array structure, a tiling vibration array, a tiling vibration array module, or a tiling vibration film.

Each of the first and second vibration generating portions 131A and 131B according to an embodiment of the present disclosure may have a tetragonal shape. For example, each of the first and second vibration generating portions 131A and 131B may have a tetragonal shape having a width of about 5 cm or more. For example, each of the first and second vibration generating portions 131A and 131B may have a square shape having a size of 5 cm×5 cm or more, but embodiments of the present disclosure are not limited thereto.

Each of the first and second vibration generating portions 131A and 131B may be arranged or tiled on the same plane, and thus, the vibration device 131 may have an enlarged area based on tiling of the first and second vibration generating portions 131A and 131B having a relatively small size.

Each of the first and second vibration generating portions 131A and 131B may be arranged or tiled at a certain interval SD1, and thus, may be implemented as one vibration apparatus (or a single vibration apparatus) which is driven as one complete single-body without being independently driven. According to an embodiment of the present disclosure, with respect to the first direction X, a first separation distance SD1 between the first and second vibration generating portions 131A and 131B may be 0.1 mm or more and less than 3 cm, but embodiments of the present disclosure are not limited thereto.

According to an embodiment of the present disclosure, each of the first and second vibration generating portions 131A and 131B may be disposed or tiled to have the first separation distance (or an interval) SD1 of 0.1 mm or more and less than 3 cm, and thus, may be driven as one vibration apparatus, thereby increasing a reproduction band of a sound and a sound pressure level characteristic of a sound which is generated based on a single-body vibration of the first and second vibration generating portions 131A and 131B. For example, the first and second vibration generating portions 131A and 131B may be disposed in the first separation distance (or the interval) SD1 of 0.1 mm or more and less than 5 mm, in order to increase a reproduction band of a sound generated based on a single-body vibration of the first and second vibration generating portions 131A and 131B and to increase a sound of a low-pitched sound band (for example, a sound pressure level characteristic in 500 Hz or less).

According to an embodiment of the present disclosure, when the first and second vibration generating portions 131A and 131B are disposed in the interval SD1 of less than 0.1 mm or without the interval SD1, the reliability of the first and second vibration generating portions 131A and 131B or the vibration device 131 may be reduced due to damage or a crack caused by a physical contact therebetween which occurs when each of the first and second vibration generating portions 131A and 131B vibrates.

According to an embodiment of the present disclosure, when the first and second vibration generating portions 131A and 131B are disposed in the interval SD1 of 3 cm or more, the first and second vibration generating portions 131A and 131B may not be driven as one vibration apparatus due to an independent vibration of each of the first and second vibration generating portions 131A and 131B. Therefore, a reproduction band of a sound and a sound pressure level characteristic of a sound which is generated based on vibrations of the first and second vibration generating portions 131A and 131B may be reduced. For example, when the first and second vibration generating portions 131A and 131B are disposed in the interval SD1 of 3 cm or more, a sound characteristic and a sound pressure level characteristic of the low-pitched sound band (for example, in 500 Hz or less) may each be reduced.

According to an embodiment of the present disclosure, when the first and second vibration generating portions 131A and 131B are disposed in an interval SD1 of 5 mm, each of the first and second vibration generating portions 131A and 131B may not be perfectly driven as one vibration apparatus, and thus, a sound characteristic and a sound pressure level characteristic of the low-pitched sound band (for example, in 200 Hz or less) may each be reduced.

According to another embodiment of the present disclosure, when the first and second vibration generating portions 131A and 131B are disposed in an interval SD1 of 1 mm, each of the first and second vibration generating portions 131A and 131B may be driven as one vibration apparatus, and thus, a reproduction band of a sound may increase and a sound of the low-pitched sound band (for example, a sound pressure level characteristic in 500 Hz or less) may increase. For example, when the first and second vibration generating portions 131A and 131B are disposed in the interval SD1 of 1 mm, the vibration device 131 may be implemented as a large-area vibrator which is enlarged based on optimization of a separation distance between the first and second vibration generating portions 131A and 131B. Therefore, the vibration device 131 may be driven as a large-area vibrator based on a single-body vibration of the first and second vibration generating portions 131A and 131B, and thus, a sound characteristic and a sound pressure level characteristic may each increase a reproduction band of a sound and in the low-pitched sound band generated based on a large-area vibration of the vibration device 131.

Therefore, to implement a single-body vibration (or one vibration apparatus) of the first and second vibration generating portions 131A and 131B, the separation distance (or the interval) SD1 between the first and second vibration generating portions 131A and 131B may be adjusted to 0.1 mm or more and less than 3 cm. In addition, to implement a single-body vibration (or one vibration apparatus) of the first and second vibration generating portions 131A and 131B and to increase a sound pressure level characteristic of a sound of the low-pitched sound band, the separation distance (or the interval) SD1 between the first and second vibration generating portions 131A and 131B may be adjusted to 0.1 mm or more and less than 5 mm.

Each of the first and second vibration generating portions 131A and 131B according to an embodiment of the present disclosure may include a vibration portion 131*a*, a first electrode portion 131*b*, and a second electrode portion 131*c*.

The vibration portion 131*a* of each of the first and second vibration generating portions 131A and 131B may include a piezoelectric material (or an electroactive material) having a piezoelectric effect. For example, the vibration portion 131*a* of each of the first and second vibration generating portions 131A and 131B may be configured substantially the same as any one of the vibration portion 131*a* described above with reference to FIGS. 6 and 7A to 7D, and thus, like reference numeral may refer to like element, and the repetitive description thereof may be omitted.

According to an embodiment of the present disclosure, each of the first and second vibration generating portions 131A and 131B may include any one vibration portion 131*a* of the vibration portion 131*a* described above with reference to FIGS. 6 and 7A to 7D, or may include different vibration portion 131*a*.

The first electrode portion 131*b* may be disposed at a first surface of the vibration portion 131*a* and may be electrically connected to the first surface of the vibration portion 131*a*. For example, the first electrode portion 131*b* may be substantially the same as the first electrode portion 131*b* described above with reference to FIG. 5, and thus, like reference numeral may refer to like element, and the repetitive description thereof may be omitted.

The second electrode portion 131*c* may be disposed at a second surface of the vibration portion 131*a* and electrically connected to the second surface of the vibration portion 131*a*. The second electrode portion 131*c* may be substantially the same as the second electrode portion 131*c* described above with reference to FIG. 5, and thus, like reference numerals may refer to like elements, and the repetitive description thereof may be omitted.

The vibration device 131 according to another embodiment of the present disclosure may further include a first cover member 131*d* and a second cover member 131*e*.

The first cover member 131*d* may be disposed at the first surface of the vibration device 131. For example, the first cover member 131*d* may cover the first electrode portion 131*b* which is disposed at a first surface of each of the first and second vibration generating portions 131A and 131B, and thus, the first cover member 131*d* may be connected to the first surface of each of the first and second vibration generating portions 131A and 131B in common or may support the first surface of each of the first and second vibration generating portions 131A and 131B in common. Accordingly, the first cover member 131*d* may protect the first surface or the first electrode portion 131*b* of each of the first and second vibration generating portions 131A and 131B.

The second cover member 131*e* may be disposed at the second surface of the vibration device 131. For example, the second cover member 131*e* may cover the second electrode portion 131*c* which is disposed at a second surface of each of the first and second vibration generating portions 131A and 131B, and thus, the second cover member 131*e* may be connected to the second surface of each of the first and second vibration generating portions 131A and 131B in common or may support the second surface of each of the first and second vibration generating portions 131A and 131B in common. Accordingly, the second cover member 131*e* may protect the second surface or the second electrode portion 131*c* of each of the first and second vibration generating portions 131A and 131B.

The first cover member 131*d* and the second cover member 131*e* according to an embodiment of the present disclosure may each include one or more materials of plastic, fiber, and wood, but embodiments of the present disclosure are not limited thereto. For example, each of the first cover member 131*d* and the second cover member 131*e* may include the same material or different material. For example, each of the first cover member 131*d* and the second cover member 131*e* may be a polyimide (PI) film or a polyethylene terephthalate (PET) film, but embodiments of the present disclosure are not limited thereto.

The first cover member 131*d* according to an embodiment of the present disclosure may be disposed at the first surface of each of the first and second vibration generating portions 131A and 131B by a first adhesive layer 131*f*. For example, the first cover member 131*d* may be directly disposed at the first surface of each of the first and second vibration generating portions 131A and 131B by a film laminating process using the first adhesive layer 131*f*. Accordingly, each of the first and second vibration generating portions 131A and 131B may be integrated (or disposed) or tiled with the first cover member 131*d* to have the certain interval SD1.

The second cover member 131*e* according to an embodiment of the present disclosure may be disposed at the second surface of each of the first and second vibration generating portions 131A and 131B by a second adhesive layer 131*g*. For example, the second cover member 131*e* may be directly disposed at the second surface of each of the first and second vibration generating portions 131A and 131B by a film laminating process using the second adhesive layer 131*g*. Accordingly, each of the first and second vibration generating portions 131A and 131B may be integrated (or disposed) or tiled with the second cover member 131*e* to have the certain interval SD1.

The first adhesive layer 131*f* may be disposed between the first and second vibration generating portions 131A and 131B and disposed at the first surface of each of the first and second vibration generating portions 131A and 131B. For example, the first adhesive layer 131*f* may be formed at a rear surface (or an inner surface) of the first cover member 131*d* facing the first surface of each of the first and second vibration generating portions 131A and 131B, filled between the first and second vibration generating portions 131A and 131B, and disposed between at the first cover member 131*d* and the first surface of each of the first and second vibration generating portions 131A and 131B.

The second adhesive layer 131*g* may be disposed between the first and second vibration generating portions 131A and 131B and disposed at the second surface of each of the first and second vibration generating portions 131A and 131B. For example, the second adhesive layer 131*g* may be formed at a front surface (or an inner surface) of the second cover member 131*e* facing the second surface of each of the first and second vibration generating portions 131A and 131B, filled between the first and second vibration generating portions 131A and 131B, and disposed between at the second cover member 131*e* and the second surface of each of the first and second vibration generating portions 131A and 131B.

The first and second adhesive layers 131*f* and 131*g* may be connected or coupled to each other between the first and second vibration generating portions 131A and 131B. Therefore, each of the first and second vibration generating portions 131A and 131B may be surrounded by the first and second adhesive layers 131*f* and 131*g*. For example, the first and second adhesive layers 131*f* and 131*g* may be configured between the first cover member 131*d* and the second cover member 131*e* to completely surround the first and second vibration generating portions 131A and 131B. For example, each of the first and second vibration generating portions 131A and 131B may be embedded or built-in between the first adhesive layer 131*f* and the second adhesive layer 131*g*.

Each of the first and second adhesive layers 131*f* and 131*g* according to an embodiment of the present disclosure may include an electric insulating material which has adhesiveness and is capable of compression and decompression. For example, each of the first and second adhesive layers 131*f* and 131*g* may include an epoxy resin, an acrylic resin, a silicone resin, or a urethane resin, but embodiments of the present disclosure are not limited thereto. Each of the first and second adhesive layers 131*f* and 131*g* may be configured to be transparent, translucent, or opaque.

The vibration device 131 according to another embodiment of the present disclosure may further include a first power supply line PL1 disposed at the first cover member 131*d*, a second power supply line PL2 disposed at the second cover member 131*e*, and a pad part 131*p* electrically connected to the first power supply line PL1 and the second power supply line PL2.

The first power supply line PL1 may be disposed at the first cover member 131*d*. The first power supply line PL1 may be disposed at the rear surface of the first cover member 131*d* facing the first surface of each of the first and second vibration generating portions 131A and 131B. The first power supply line PL1 may be electrically connected to the first electrode portion 131*b* of each of the first and second vibration generating portions 131A and 131B. For example, the first power supply line PL1 may be electrically and directly connected to the first electrode portion 131*b* of each of the first and second vibration generating portions 131A and 131B. As an embodiment of the present disclosure, the first power supply line PL1 may be electrically connected to the first electrode portion 131*b* of each of the first and second vibration generating portions 131A and 131B by an anisotropic conductive film. As another embodiment of the present disclosure, the first power supply line PL1 may be electrically connected to the first electrode portion 131*b* of each of the first and second vibration generating portions 131A and 131B through a conductive material (or particle) included in the first adhesive layer 131*f*.

The first power supply line PL1 according to an embodiment of the present disclosure may include first and second upper power lines PL11 and PL12 disposed along a second direction Y. For example, the first upper power line PL11 may be electrically connected to the first electrode portion 131*b* of the first vibration generating portion 131A. The second upper power line PL12 may be electrically connected to the first electrode portion 131*b* of the second vibration generating portion 131B.

The second power supply line PL2 may be disposed at the second cover member 131*e*. The second power supply line PL2 may be disposed at the front surface of the second cover member 131*e* facing the second surface of each of the first and second vibration generating portions 131A and 131B. The second power supply line PL2 may be electrically connected to the second electrode portion 131*c* of each of the first and second vibration generating portions 131A and 131B. For example, the second power supply line PL2 may be electrically and directly connected to the second electrode portion 131*c* of each of the first and second vibration generating portions 131A and 131B. As an embodiment of the present disclosure, the second power supply line PL2 may be electrically connected to the second electrode portion 131*c* of each of the first and second vibration generating portions 131A and 131B by an anisotropic conductive film. As another embodiment of the present disclosure, the second power supply line PL2 may be electrically connected to the second electrode portion 131*c* of each of the first and second vibration generating portions 131A and 131B through a conductive material (or particle) included in the second adhesive layer 131*g*.

The second power supply line PL2 according to an embodiment of the present disclosure may include first and second lower power lines PL21 and PL22 disposed along a second direction Y. For example, the first lower power line PL21 may be electrically connected to the second electrode portion 131*c* of the first vibration generating portion 131A. For example, the first lower power line PL21 may be overlapped the first upper power line PL11. For example, the first lower power line PL21 may be disposed not to overlap the first upper power line PL11. The second lower power line PL22 may be electrically connected to the second electrode portion 131*c* of the second vibration generating portion 131B. For example, the second lower power line PL22 may be overlapped the second upper power line PL12. For example, the second lower power line PL22 may be disposed not to overlap the second upper power line PL12.

The pad part 131*p* may be configured at one periphery portion of any one of the first cover member 131*d* and the second cover member 131*e* to be electrically connected to one portion (or one end) of each of the first power supply line PL1 and the second power supply line PL2.

The pad part 131*p* according to an embodiment of the present disclosure may include a first pad electrode electrically connected to one end of the first power supply line PL1, and a second pad electrode electrically connected to one end of the second power supply line PL2.

The first pad electrode may be connected to one portion of each of the first and second upper power lines PL11 and PL12 of the first power supply line PL1 in common. For example, the one portion of each of the first and second upper power lines PL11 and PL12 may branch from the first pad electrode. The second pad electrode may be connected to one portion of each of the first and second lower power lines PL21 and PL22 of the second power supply line PL2 in common. For example, the one portion of each of the first and second lower power lines PL21 and PL22 may branch from the second pad electrode.

The vibration device 131 according to another embodiment of the present disclosure may further include a signal cable 132.

The signal cable 132 may be electrically connected to the pad part 131*p* disposed at the vibration device 131 and may supply the vibration device 131 with a vibration driving signal (or a sound signal or a voice signal) provided from a sound processing circuit. The signal cable 132 according to an embodiment of the present disclosure may include a first terminal electrically coupled to the first pad electrode of the pad part 131*p* and a second terminal electrically coupled to the second pad electrode of the pad part 131*p*. For example, the signal cable 132 may be configured as a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sound processing circuit may generate an alternating current (AC) vibration driving signal including a first vibration driving signal and a second vibration driving signal based on a sound data. The first vibration driving signal may be any one of a positive (+) vibration driving signal and a negative (−) vibration driving signal, and the second vibration driving signal may be any one of a positive (+) vibration driving signal and a negative (−) vibration driving signal. For example, the first vibration driving signal may be supplied to the first electrode portion 131*b* of each of the first and second vibration generating portions 131A and 131B through a first terminal of the signal cable 132, the first pad electrode of the pad part 131*p*, and the first power supply line PL1. The second vibration driving signal may be supplied to the second electrode portion 131*c* of each of the first and second vibration generating portions 131A and 131B through a second terminal of the signal cable 132, the second pad electrode of the pad part 131*p*, and the second power supply line PL2.

Figure 10:
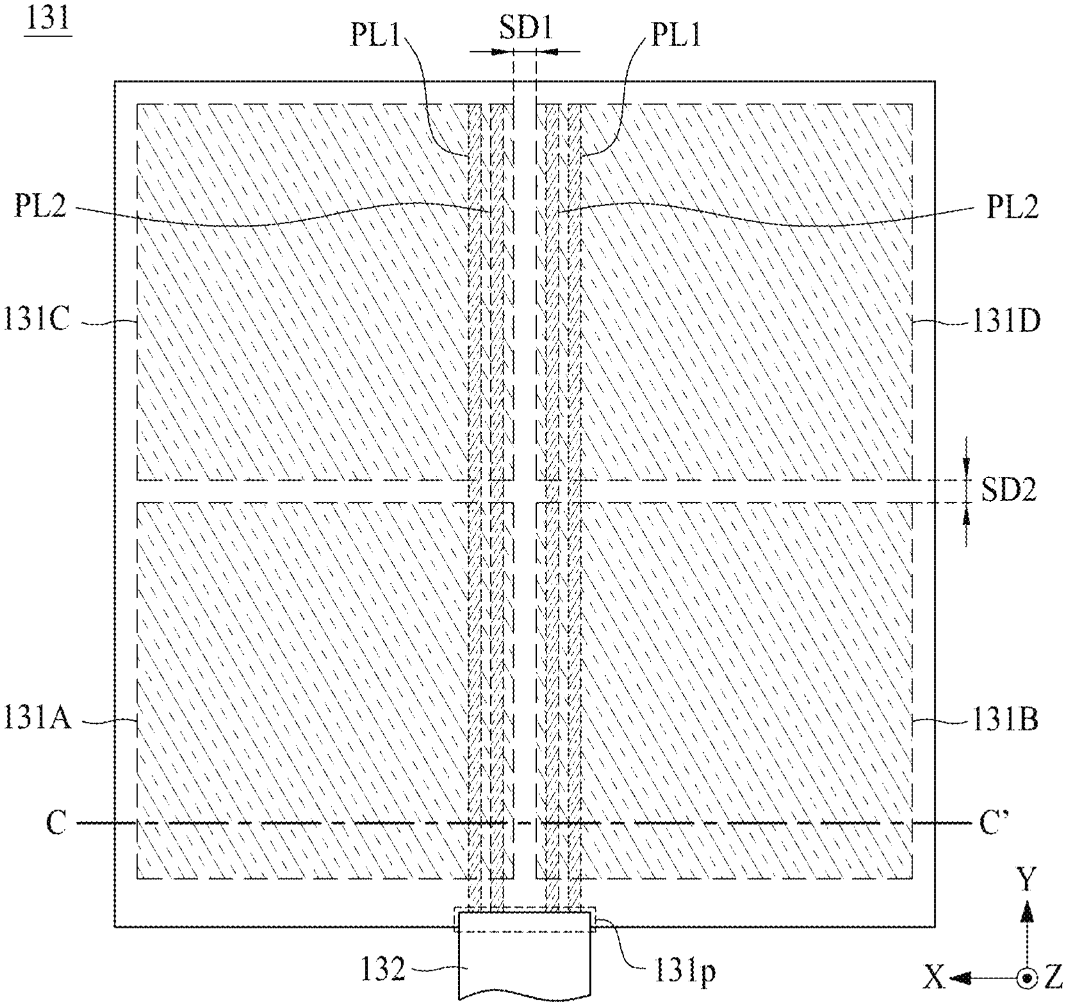
FIG. 10 illustrates a vibration device according to another embodiment of the present disclosure.

FIG. 10 illustrates a vibration device according to another embodiment of the present disclosure. FIG. 10 illustrates an embodiment where four vibration generating portions are provided in the vibration device illustrated in FIGS. 8 and 9. Hereinafter, therefore, the elements except four vibration generating portions and relevant elements may be referred to by like reference numerals, and their repetitive descriptions may be omitted or will be briefly given. A cross-sectional surface taken along line C-C' illustrated in FIG. 10 is illustrated in FIG. 9.

With reference to FIG. 10 in conjunction with FIG. 9, the vibration device 131 according to another embodiment of the present disclosure may include a plurality of vibration generating portions 131A to 131D.

The plurality of vibration generating portions 131A to 131D may be electrically disconnected and disposed spaced apart from one another along a first direction X and a second direction Y. For example, the plurality of vibration generating portions 131A to 131D may be arranged or tiled in an i×j form on the same plane, and thus, the vibration device 131 may be implemented to have a large area based on tiling of the plurality of vibration generating portions 131A to 131D having a relatively small size. For example, i may be the number of vibration generating portions disposed in the first direction X and may be a natural number of 2 or more, and j may be the number of vibration generating portions disposed along the second direction Y and may be a natural number of 2 or more which is the same as or different from i. For example, the plurality of vibration generating portions 131A to 131D may be arranged or tiled in a 2×2 form, but embodiments of the present disclosure are not limited thereto. Hereinafter, an example where the vibration device 131 includes first to fourth vibration generating portions 131A to 131D will be described.

According to an embodiment of the present disclosure, the first and second vibration generating portions 131A and 131B may be spaced apart from each other along the first direction X. The third and fourth vibration generating portions 131C and 131D may be spaced apart from each other along the first direction X and may be spaced apart from each of the first and second vibration generating portions 131A and 131B along the second direction Y. The first and third vibration generating portions 131A and 131C may be spaced apart from each other along the second direction Y to face each other. The second and fourth vibration generating portions 131B and 131D may be spaced apart from each other along the second direction Y to face each other.

The first to fourth vibration generating portions 131A to 131D may be disposed between the first cover member 131*d* and the second cover member 131*e*. For example, each of the first cover member 131*d* and the second cover member 131*e* may be connected to the first to fourth vibration generating portions 131A to 131D or may support the first to fourth vibration generating portions 131A to 131D in common, and thus, may drive the first to fourth vibration generating portions 131A to 131D as one vibration apparatus (or a single vibration apparatus). For example, the first to fourth vibration generating portions 131A to 131D may be tiled in a certain interval by the cover members 131*d* and 131*e*, and thus, may be driven as one vibration apparatus (or a single vibration apparatus).

According to an embodiment of the present disclosure, as described above with reference to FIGS. 8 and 9, in order to a complete single body vibration or a large-area vibration, the first to fourth vibration generating portions 131A to 131D may be disposed (or tiled) at the intervals SD1 and SD2 of 0.1 mm or more and less than 3 cm, more preferably, may be disposed (or tiled) at the intervals SD1 and SD2 0.1 mm or more and less than 5 mm, along each of the first direction X and the second direction Y.

Each of the first to fourth vibration generating portions 131A to 131D may include a vibration portion 131*a*, a first electrode portion 131*b*, and a second electrode portion 131*c*.

The vibration portion 131*a* of each of the first to fourth vibration generating portions 131A to 131D may include a piezoelectric material (or an electroactive material) having a piezoelectric effect. The vibration portion 131*a* of each of the first to fourth vibration generating portions 131A to 131D may be configured substantially the same as any one of the vibration portion 131*a* described above with reference to FIGS. 6 and 7A to 7D, and thus, like reference numerals may refer to like elements, and the repetitive description thereof may be omitted.

According to an embodiment of the present disclosure, each of the first to fourth vibration generating portions 131A to 131D may include any one vibration portion 131*a* of the vibration portion 131*a* described above with reference to FIGS. 6 and 7A to 7D, or may include different vibration portion 131*a*.

According to another embodiment of the present disclosure, one or more of the first to fourth vibration generating portions 131A to 131D may include different vibration portions 131*a* of the vibration portion 131*a* described above with reference to FIGS. 6 and 7A to 7D.

The first electrode portion 131*b* may be disposed at a first surface of the corresponding vibration portion 131*a* and electrically connected to the first surface of the vibration portion 131*a*. The first electrode portion 131*b* may be substantially the same as the first electrode portion 131*b* described above with reference to FIG. 5, and thus, like reference numeral may refer to like element, and the repetitive description thereof may be omitted.

The second electrode portion 131*c* may be disposed at a second surface of the corresponding vibration portion 131*a* and electrically connected to the second surface of the vibration portion 131*a*. The second electrode portion 131*c* may be substantially the same as the second electrode portion 131*c* described above with reference to FIG. 5, and thus, like reference numeral may refer to like element, and the repetitive description thereof may be omitted.

According to an embodiment of the present disclosure, first and second adhesive layers 131*f* and 131*g* may be connected or coupled to each other between first to fourth vibration generating portions 131A to 131D. Therefore, each of the first to fourth vibration generating portions 131A to 131D may be surrounded by the first and second adhesive layers 131*f* and 131*g*. For example, the first and second adhesive layers 131*f* and 131*g* may be configured between a first cover member 131*d* and a second cover member 131*e* to completely surround each of the first to fourth vibration generating portions 131A to 131D. For example, each of the first to fourth vibration generating portions 131A to 131D may be embedded or built-in between the first adhesive layer 131*f* and the second adhesive layer 131*g*.

The vibration device 131 according to another embodiment of the present disclosure may further include a first power supply line PL1, a second power supply line PL2, and a pad part 131*p*.

Except for an electrical connection structure between the first and second power supply lines PL1 and PL2 and the first to fourth vibration generating portions 131A to 131D, the first and second power supply lines PL1 and PL2 may be substantially the same as the first and second power supply lines PL1 and PL2 described above with reference to FIGS. 8 and 9, and thus, only the electrical connection structure between the first and second power supply lines PL1 and PL2 and the first to fourth vibration generating portions 131A to 131D will be briefly described below.

The first power supply line PL1 according to an embodiment of the present disclosure may include first and second upper power lines PL11 and PL12 disposed along a second direction Y. For example, the first upper power line PL11 may be electrically connected to the first electrode portion 131*b* of each of the first and third vibration generating portions 131A and 131C (or a first group or a first vibration generating group) disposed at a first row parallel to a second direction Y of the first to fourth vibration generating portions 131A to 131D. The second upper power line PL12 may be electrically connected to the first electrode portion 131*b* of each of the second and fourth vibration generating portions 131B and 131D (or a second group or a second vibration generating group) disposed at a second row parallel to the second direction Y of the first to fourth vibration generating portions 131A to 131D.

The second power supply line PL2 according to an embodiment of the present disclosure may include first and second lower power lines PL21 and PL22 disposed along a second direction Y. For example, the first lower power line PL21 may be electrically connected to the second electrode portion 131*c* of each of the first and third vibration generating portions 131A and 131C (or the first group or the first vibration generating group) disposed at the first row parallel to the second direction Y of the first to fourth vibration generating portions 131A to 131D. The second lower power line PL22 may be electrically connected to the second electrode portion 131*c* of each of the second and fourth vibration generating portions 131B and 131D (or the second group or the second vibration generating group) disposed at the second row parallel to the second direction Y of the first to fourth vibration generating portions 131A to 131D.

The pad part 131*p* may be configured at one periphery portion of any one among the first cover member 131*d* and the second cover member 131*e* so as to be electrically connected to one side (or one end) of each of the first and second power supply lines PL1 and PL2. The pad part 131*p* may be substantially the same as the pad part 131*p* illustrated in FIGS. 8 and 9, and thus, like reference numeral may refer to like element, and the repetitive description thereof may be omitted.

As described above, the vibration device 131 according to another embodiment of the present disclosure may have the same effect as that of the vibration device 131 described above with reference to FIGS. 4 to 8, and thus, the repetitive description thereof may be omitted.

Figure 11:
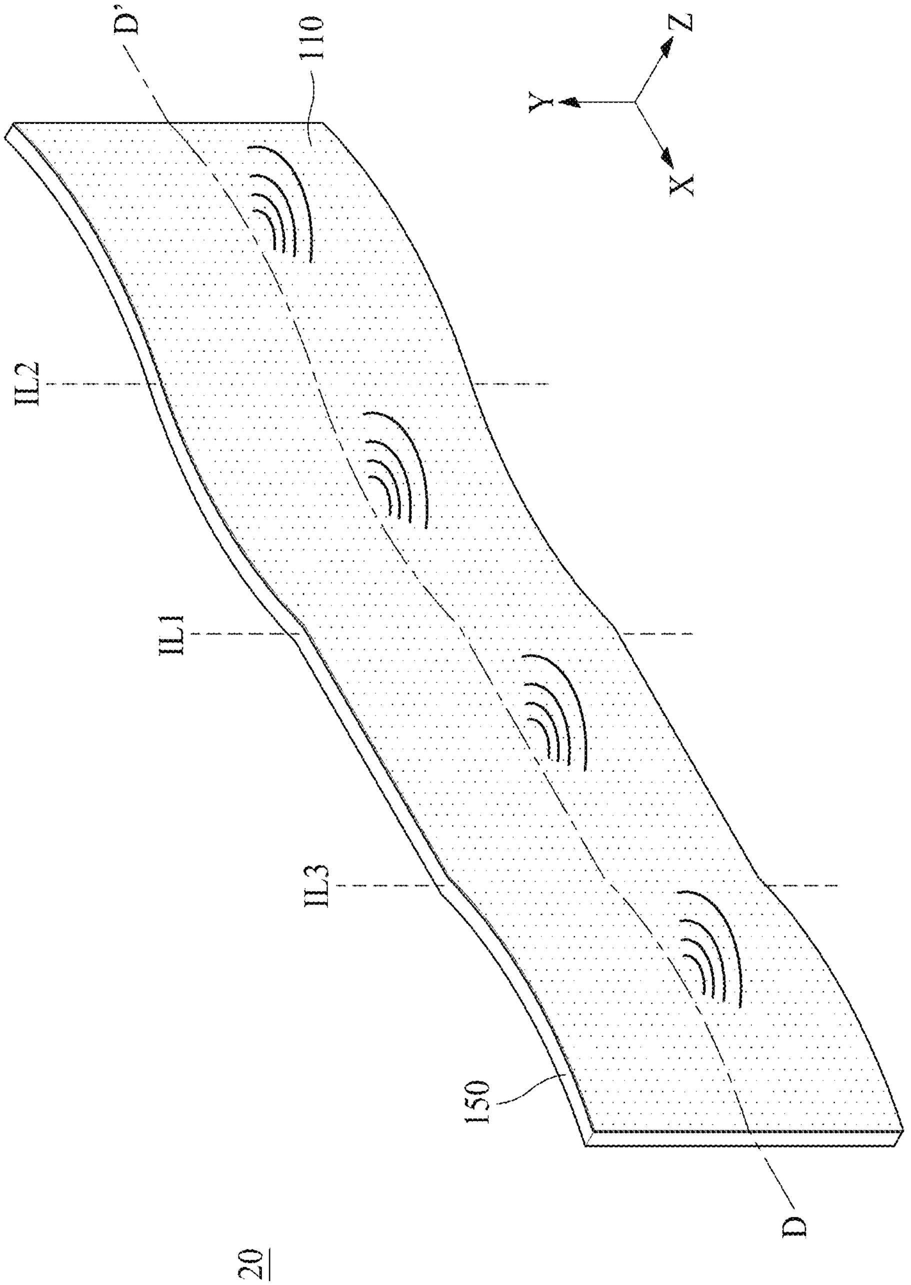
FIG. 11 is a perspective view illustrating an apparatus according to another embodiment of the present disclosure.
Figure 12:
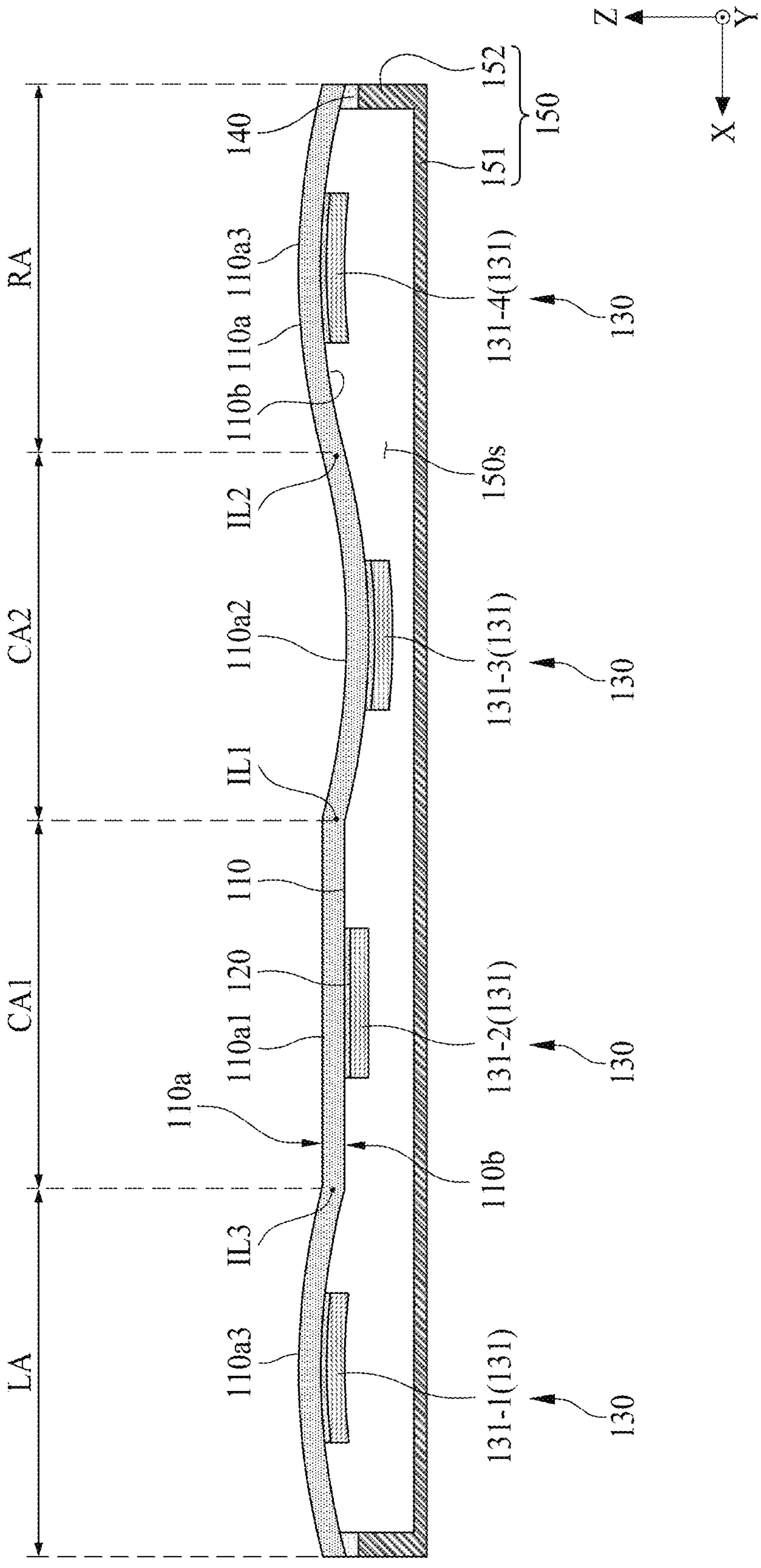
FIG. 12 is a cross-sectional view taken along line D-D' illustrated in FIG. 11.

FIG. 11 is a perspective view illustrating an apparatus according to another embodiment of the present disclosure. FIG. 12 is a cross-sectional view taken along line D-D' illustrated in FIG. 11. FIG. 11 illustrates an apparatus according to another embodiment of the present disclosure and illustrates an embodiment implemented by modifying a structure of the vibration member of FIGS. 1 and 2. Therefore, in the following description, repetitive descriptions of the other elements except a vibration member, a vibration apparatus, and relevant elements may be omitted.

With reference to FIGS. 11 and 12, a vibration member 110 according to another embodiment of the present disclosure may include a flat portion and a flexural portion. The flat portion may include a portion where the vibration member 110 is implemented to be flat, and the flexural portion may include a portion where at least a portion of the vibration member 110 is flexed in a concave or convex shape. The flat portion may include one or more flat portions 110*a*1, and the flexural portion may include one or more concave curved portions 110*a*2 and one or more convex curved portions 110*a*3.

According to another embodiment of the present disclosure, the apparatus 20 may include first to fourth regions. For example, a concave curved portion 110*a*2 may be configured at the first region of the apparatus 20, a flat portion 110*a*1 may be configured at the second region of the apparatus 20, a concave curved portion 110*a*2 may be configured at the third region of the apparatus 20, and a convex curved portion 110*a*3 may be configured at the fourth region of the apparatus 20.

According to another embodiment of the present disclosure, the apparatus 20 may include a left region (or a first region) LA, a first center region (or a second region or a 2-1$^{st}$ region) CAL a second center region (or a third region or a 2-2$^{nd}$ region) CA2, and a right region (or a fourth region) RA. For example, a convex curved portion 110*a*3 may be configured at the left region LA of the apparatus 20, a flat portion 110*a*1 may be configured at the first center region CA1 of the apparatus 20, a concave curved portion 110*a*2 may be configured at the second center region CA2 of the apparatus 20, and a convex curved portion 110*a*3 may be configured at the right region RA of the apparatus 20. Alternatively, a concave curved portion 110*a*2 may be configured at the left region LA of the apparatus 20, a flat portion 110*a*1 may be configured at the first center region CA1 of the apparatus 20, a convex curved portion 110*a*3 may be configured at the second center region CA2 of the apparatus 20, and a concave curved portion 110*a*2 may be configured at the right region RA of the apparatus 20. Further alternatively, a concave curved portion 110*a*2 may be configured at the left region LA of the apparatus 20, a flat portion 110*a*1 may be configured at the first center region CA1 of the apparatus 20, a concave curved portion 110*a*2 may be configured at the second center region CA2 of the apparatus 20, and a convex curved portion 110*a*3 may be configured at the right region RA of the apparatus 20. Further alternatively, a convex curved portion 110*a*3 may be configured at the left region LA of the apparatus 20, a flat portion 110*a*1 may be configured at the first center region CA1 of the apparatus 20, a convex curved portion 110*a*3 may be configured at the second center region CA2 of the apparatus 20, and a concave curved portion 110*a*2 may be configured at the right region RA of the apparatus 20. Therefore, a combination of a flat portion and a curved portion of the vibration member 110 according to an embodiment of the present disclosure is not limited, and an arrangement relationship between the flat portion 110*a*1, the concave curved portion 110*a*2, and the convex curved portion 110*a*3 may be variously combined.

The vibration member 110 may further include a first inflection line IL1 between the flat portion 110*a*1 and the concave curved portion 110*a*2, a second inflection line IL2 between the concave curved portion 110*a*2 and the convex curved portion 110*a*3, and a third inflection line IL3 between the flat portion 110*a*1 and the convex curved portion 110*a*3. The first inflection line ILL the second inflection line IL2, and the third inflection line IL3 may be at a position at which a bending state of the vibration member 110 or a slope of the vibration member 110 is inflected.

Figure 13:
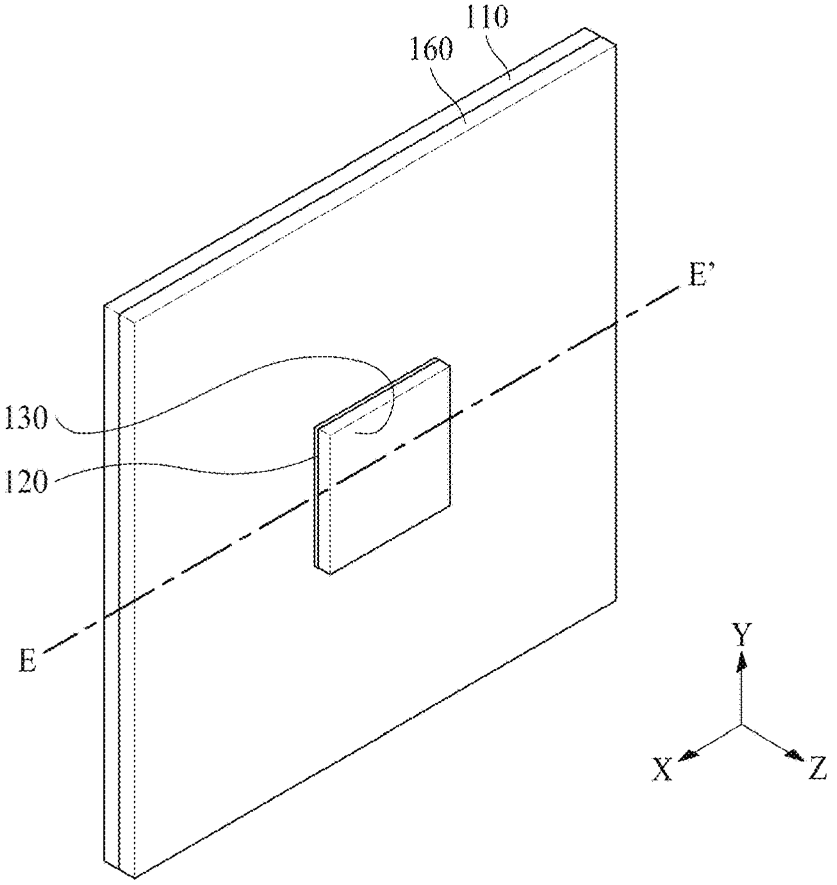
FIG. 13 illustrates a curvature variable structure of a vibration member according to an embodiment of the present disclosure.
Figure 14:
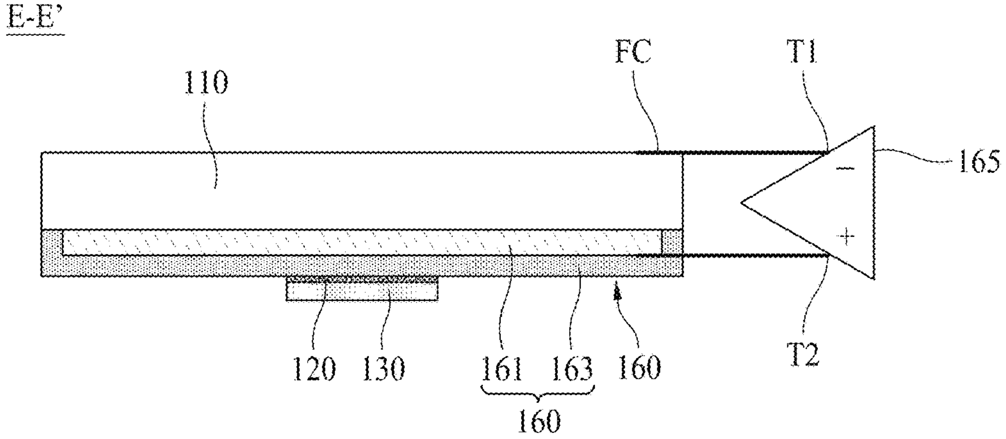
FIG. 14 is a cross-sectional view taken along line E-E' illustrated in FIG. 13.

FIG. 13 illustrates a curvature variable structure of a vibration member according to an embodiment of the present disclosure. FIG. 14 is a cross-sectional view taken along line E-E' illustrated in FIG. 13. FIGS. 13 and 14 illustrate a curvature variable structure of a vibration member according to an embodiment of the present disclosure.

With reference to FIGS. 13 and 14, a curvature variable structure according to an embodiment of the present disclosure may include a vibration member 110 and a curvature variable layer 160 disposed at one surface of the vibration member 110, and a vibration apparatus 130 may be disposed at a rear surface of the curvature variable layer 160.

The curvature variable layer 160 according to an embodiment of the present disclosure may include a curvature variable portion 161 and a protection member 163 which covers the curvature variable portion 161.

In addition, the curvature variable structure according to an embodiment of the present disclosure may include the curvature variable portion 161 and a curvature variable layer controller (or a curvature variable circuit) 165 for applying a direct current (DC) voltage to the vibration member 110, and the curvature variable circuit 165 may supply the vibration member 110 with a first polarity signal of a first variable signal output from a first output terminal T1, and a second polarity signal of a second variable signal output from a second output terminal T2 may be supplied to the curvature variable portion 161 through a flexible cable FC. The first polarity signal may be a positive (+) voltage and the second polarity signal may be a negative (−) voltage, or the first polarity signal may be a negative (−) voltage and the second polarity signal may be a positive (+) voltage. Also, because the curvature variable portion 161 is for inducing contraction or expansion of the curvature variable portion 161 instead of an element for generating a vibration, the first polarity signal and the second polarity signal supplied through a curvature variable layer controller 165 may each be a DC voltage instead of an alternating current (AC) voltage. Also, a DC voltage should be maintained for maintaining a contraction state or an expansion state of the curvature variable portion 161.

When an electrical field based on the first polarity signal and the second polarity signal is applied in the same direction as a falling direction of the curvature variable portion 161, the curvature variable layer may vary to be convex with respect to the vibration member 110, and when the electrical field based on the first polarity signal and the second polarity signal is applied in a direction which differs from the falling direction of the curvature variable portion 161, the curvature variable layer may vary to be concave with respect to the vibration member 110.

The curvature variable portion 161 may include a piezoelectric material (or an electroactive material) which has a piezoelectric effect. For example, the piezoelectric material may have a characteristic in which, when pressure or twisting (or bending) is applied to a crystalline structure by an external force, a potential difference occurs due to dielectric polarization (or poling) caused by a relative position change of a positive (+) ion and a negative (−) ion, and a vibration is generated by an electric field based on a reverse voltage applied thereto.

The protection member 163 may be a polyimide (PI) film or a polyethylene terephthalate (PET) film, but embodiments of the present disclosure are not limited thereto.

Moreover, the curvature variable structure or the curvature variable layer 160 may further include an adhesive layer or a connection member between the curvature variable portion 161 and the vibration member 110. Alternatively, the protection member 163 may be formed to protect the curvature variable portion 161 and surround the curvature variable portion 161. When the protection member 163 has a certain adhesive characteristic, the adhesive layer or the connection member between the curvature variable portion 161 and the vibration member 110 may be omitted.

According to another embodiment of the present disclosure, in the apparatus 30 to which a structure of the curvature variable layer 160 is applied, the vibration member 110 may be configured to include a conductive material so as to apply the first polarity signal from the curvature variable layer controller 165 to the vibration member 110.

Figure 15A:
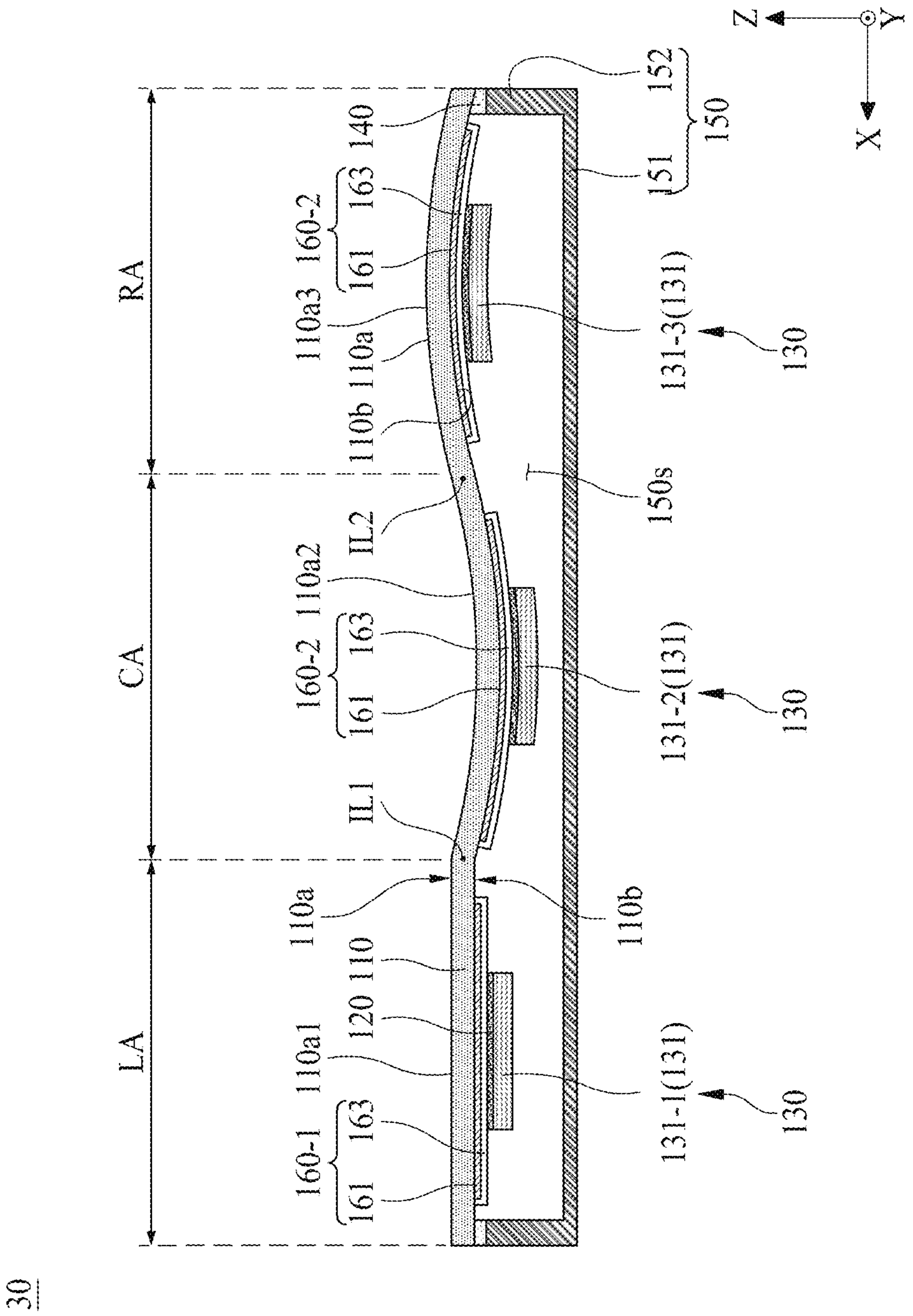
FIGS. 15A and 15B are cross-sectional views of an apparatus to which the curvature variable layer of FIG. 13 is applied.
Figure 15B:
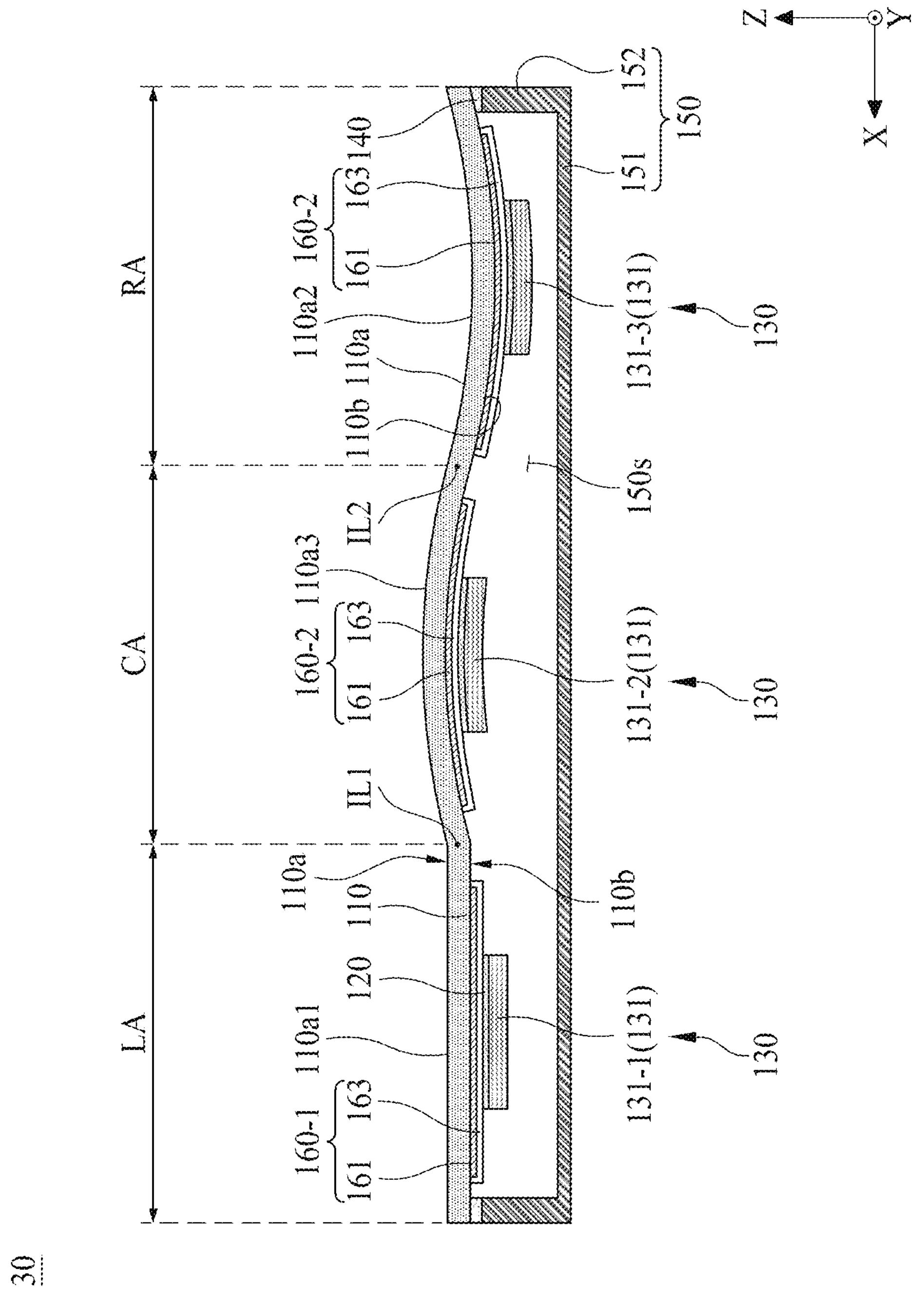

FIGS. 15A and 15B are cross-sectional views of an apparatus to which the curvature variable layer of FIG. 13 is applied. FIG. 15 illustrates an apparatus according to another embodiment of the present disclosure and illustrates an embodiment where a structure of the curvature variable layer of FIGS. 13 and 14 are added to the apparatus of FIGS. 1 and 2. Therefore, in the following description, repetitive descriptions of the other elements except a vibration member, a curvature variable layer, a vibration apparatus, and relevant elements may be omitted.

With reference to FIGS. 14 and 15A, an apparatus 30 according to another embodiment of the present disclosure may include first to third curvature variable layer 160-1, 160-2, and 160-3.

According to another embodiment of the present disclosure, the first curvature variable layer 160-1 may be disposed at a flat portion 110*a*1 and may be disposed between a first vibration device 131-1 and a vibration member 110. The second curvature variable layer 160-2 may be disposed at a concave curved portion 110*a*2 and may be disposed between a second vibration device 131-2 and the vibration member 110. The third curvature variable layer 160-3 may be disposed at a convex curved portion 110*a*3 and may be disposed between a third vibration device 131-3 and the vibration member 110.

According to another embodiment of the present disclosure, a curvature variable layer controller 165 may be disposed at an arbitrary position of an accommodating space 150*s* of a housing 150, or may be mounted on a second surface of the housing 150. A first output terminal T1 of the curvature variable layer controller 165 may apply a first polarity signal to the vibration member 110, and a second output terminal T2 may apply a second polarity signal, which is opposite to the first polarity signal, to the first to third vibration devices 131-1 to 131-3.

According to an embodiment of the present disclosure, an initial state of the vibration member 110 may be configured to include only a single flat portion, and then, the degree of bending or a slope of the vibration member 110 may vary based on an operation of the curvature variable layer 160. Therefore, the apparatus 30 of FIGS. 15A and 15B may be the drawing in a state where the curvature variable layer 160 is driven.

The first curvature variable layer 160-1 may be disposed at a flat portion 110*a*1 of a left region LA, the second curvature variable layer 160-2 may be disposed at a concave curved portion 110*a*2 of a center region CA, and the third curvature variable layer 160-3 may be disposed at a convex curved portion 110_a_3 of a right region RA. Curvature variable portions 161 of each of the second curvature variable layer 160-2 and the third curvature variable layer 160-3 may have opposite polling directions so that the concave curved portion 110_a_2 and the convex curved portion 110_a_3 of the vibration member 110 vary to have different slopes or bending states.

When it is set that the curvature variable portion 161 of the second curvature variable layer 160-2 are exposed to an electrical field and the curvature variable portion 161 has the same polling direction as the electrical field, the curvature variable portion 161 may be configured to expand and a state of the vibration member 110 corresponding to the second curvature variable layer 160-2 is hardly changed, and thus, the vibration member 110 where the second curvature variable layer 160-2 is disposed may vary to be concave.

The curvature variable portion 161 of the third curvature variable layer 160-3 having a polling direction which differs from that of the curvature variable portion 161 of the second curvature variable layer 160-2 may be exposed to an electrical field having a direction opposite to a polling direction, the curvature variable portion 161 may be configured to contract, and a state of the vibration member 110 corresponding to the third curvature variable layer 160-3 is hardly changed, and thus, the vibration member 110 where the third curvature variable layer 160-3 is disposed may vary to be convex.

Moreover, when it is assumed that a curvature of the vibration member 110 does not vary, the flat portion 110_a_1 of the left region LA may be configured so that a second variable signal is not supplied from the curvature variable layer controller 165.

Except for that a slope state of a vibration member of each of the center region CA and the left region RA is changed, FIG. 15B may be the same as the apparatus of FIG. 15A.

With reference to FIG. 15B in conjunction with FIG. 15A, it may be seen that the center region CA of the vibration member 110 varies from the concave curved portion 110_a_2 to the convex curved portion 110_a_3 and the right region RA of the vibration member 110 varies from the convex curved portion 110_a_3 to the concave curved portion 110_a_2. With reference to this, it may be seen that an electrical field applied to the vibration member 110 and the curvature variable layer 160 of FIG. 15A has a direction opposite to an electrical field applied to the vibration member 110 and the curvature variable layer 160 of FIG. 15B.

In the apparatus 30 of FIGS. 15A and 15B, when a difference between a first polarity signal of a first variable signal and a second polarity signal of a second variable signal applied to the vibration member 110 and the curvature variable layer 160 is adjusted to be relatively large, the degree of bending or a slope of the curved portion of the vibration member 110 may increase.

Figure 16A:
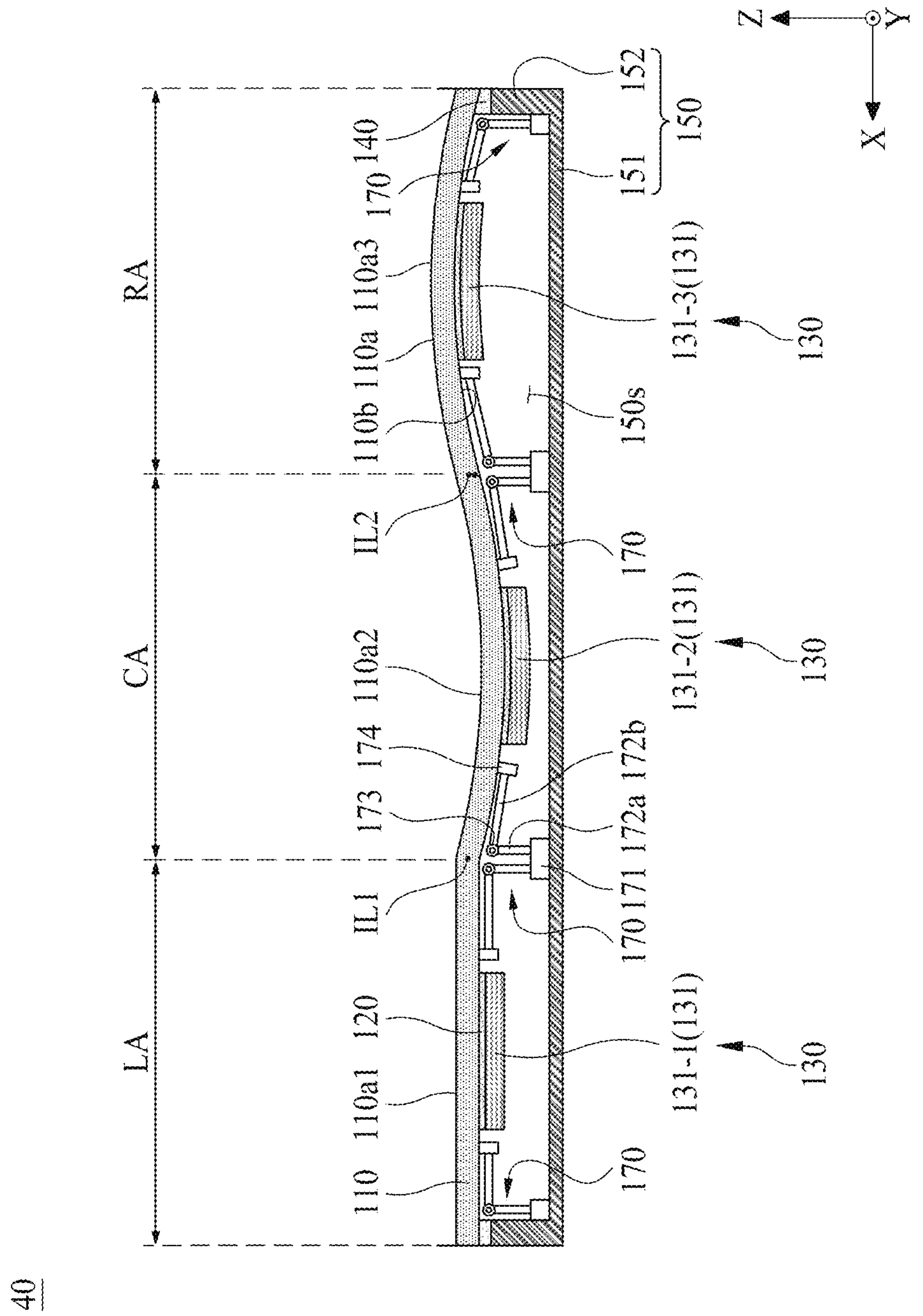
FIGS. 16A and 16B are cross-sectional views of an apparatus to which a curvature variation device is applied.
Figure 16B:
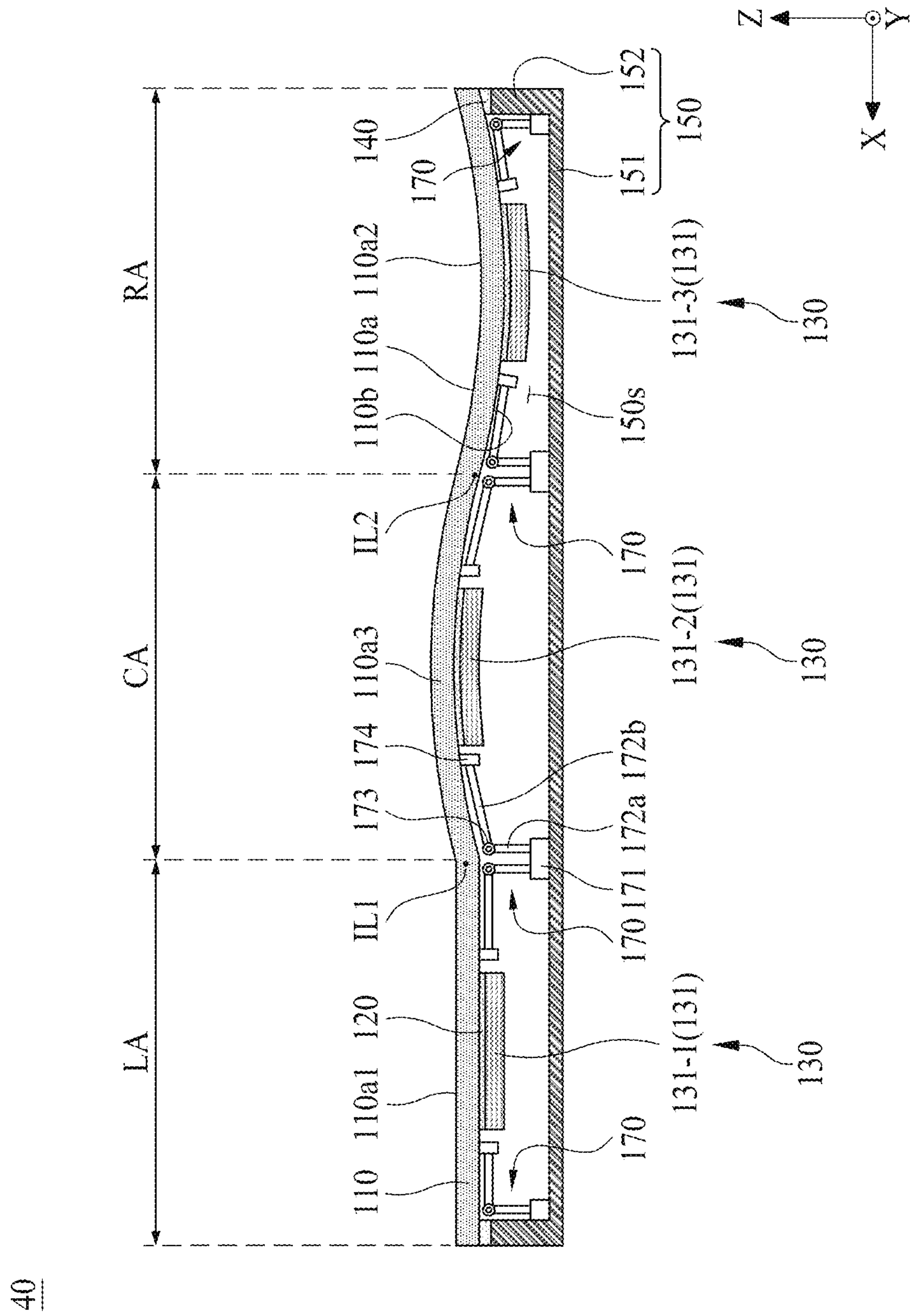

FIGS. 16A and 16B are cross-sectional views of an apparatus to which a curvature variation device is applied. FIGS. 16A and 16B illustrate an apparatus according to another embodiment of the present disclosure and illustrate an embodiment where a structure of a curvature variation device is added to the apparatus of FIGS. 1 and 2. Therefore, in the following description, repetitive descriptions of the other elements except a vibration member, a curvature variable layer, a vibration apparatus, and relevant elements are omitted.

With reference to FIGS. 16A and 16B, an apparatus 40 according to another embodiment of the present disclosure may further include a curvature variation device 170 which is provided in an accommodating space 150_s_ of a housing 150.

According to an embodiment of the present disclosure, the curvature variation device 170 may include a supporting portion 171 (also referred to as fixing portion) which is supported by a bottom portion 151 of the housing 150, a first rotation link portion 172_a_ where one end (or one side) thereof is fixed to the supporting portion 171, a pivot portion 173 which is disposed at the other end (or the other side) of the first rotation link portion 172_a_ and connects or couples the other end (or the other side) of the first rotation link portion 172_a_ to one end (or one side) of a second rotation link portion 172_b_, and a supporting portion 174 which is fixed to the vibration member 110. The other end (or the other side) of the second rotation link portion 172_b_ may be connected or coupled to the supporting portion 174.

The pivot portion 173 may couple the first rotation link portion 172_a_ to the second rotation link portion 172_b_, the first rotation link portion 172_a_ and the second rotation link portion 172_b_ may perform a joint operation, and each of the first rotation link portion 172_a_ and the second rotation link portion 172_b_ may be configured to be rotatable in the pivot portion 173. The supporting portion 174 may be attached on or coupled to at least a portion of a second surface 110_b_ of the vibration member 110. The supporting portion 174 may be fixed to at least a portion of the second surface 110_b_ of the vibration member 110, or may be sliding-driven. In a case where the supporting portion 174 is sliding-driven on the second surface 110_b_ of the vibration member 110, a position of the supporting portion 174 may be changed.

According to another embodiment of the present disclosure, an initial state of the vibration member 110 may be configured to include only a single flat portion, and then, the degree of bending or a slope of the vibration member 110 may vary based on an operation of the curvature variation device 170.

The apparatus 40 according to another embodiment of the present disclosure may further include a control board, and the control board may be configured so that a vibration driving signal based on a demultiplexer and a sound processing circuit 171 of a vibration apparatus 130 is synchronized with a variation signal of a curvature variable layer controller 165 of a curvature variable layer 160. Accordingly, in FIGS. 16A and 16B, in a case where the degree of bending or a curvature of the vibration member 110 varies, the vibration driving signal based on the demultiplexer and the sound processing circuit 171 of the vibration apparatus 130 may operate based thereon.

FIG. 16A may be a diagram after a curvature variation device is driven in a state where an initial state of a vibration member 110 includes only a flat portion. In a vibration apparatus 40 of FIG. 16, an embodiment is described where the degree of bending of a vibration member 110 of a right region RA and a center region CA of the vibration member 110 varies as the curvature variation device is driven in a state where the initial state of the vibration member 110 includes only the flat portion. In the vibration apparatus 40 of FIG. 16B, an embodiment is described where a bending state of the vibration member 110 of FIG. 16A is an initial state.

With reference to FIG. 16A, a curvature variation device 170 disposed at a left region LA of the vibration member 110 may not be driven, a curvature variation device 170 disposed at the center region CA of the vibration member 110 may be configured so that a flat portion of the vibration member 110 configures a concave curved portion 110_a_2, and a curvature variation device 170 disposed at the left region LA of the vibration member 110 may be configured so that a flat portion of the vibration member 110 configures a convex curved portion 110*a*3.

With reference to FIG. 16B, a curvature variation device 170 disposed at the left region LA of the vibration member 110 may not be driven, a curvature variation device 170 disposed at the center region CA of the vibration member 110 may be configured so that a flat portion of the vibration member 110 configures a convex curved portion 110*a*3, and a curvature variation device 170 disposed at the left region LA of the vibration member 110 may be configured so that a flat portion of the vibration member 110 configures a concave curved portion 110*a*2.

Figure 17:
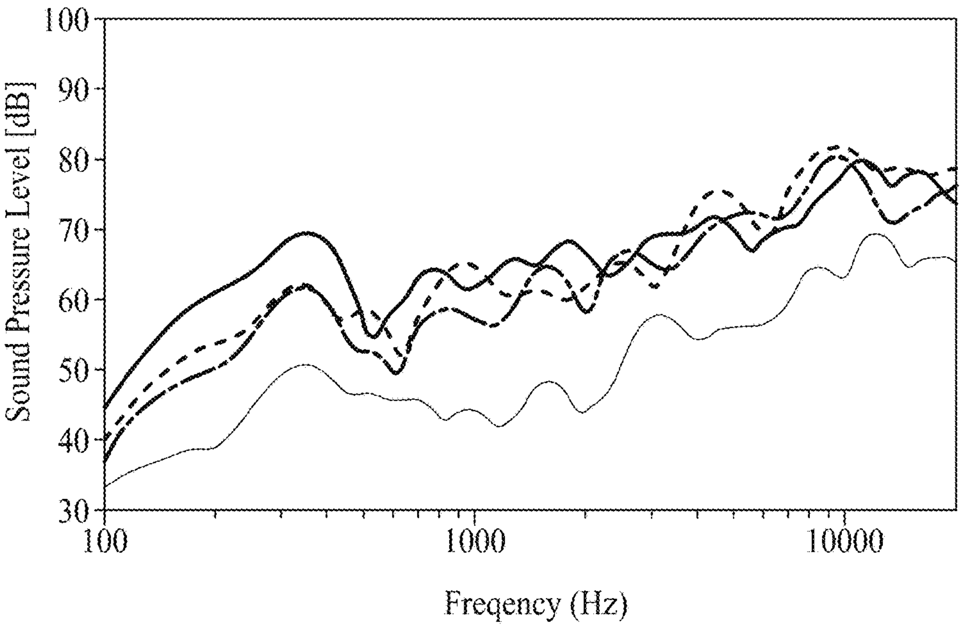
FIGS. 17 to 19 illustrate a frequency sound pressure level output characteristic with respect to a shape of a vibration member of a flat portion, a concave curved portion, and a convex curved portion.
Figure 18:
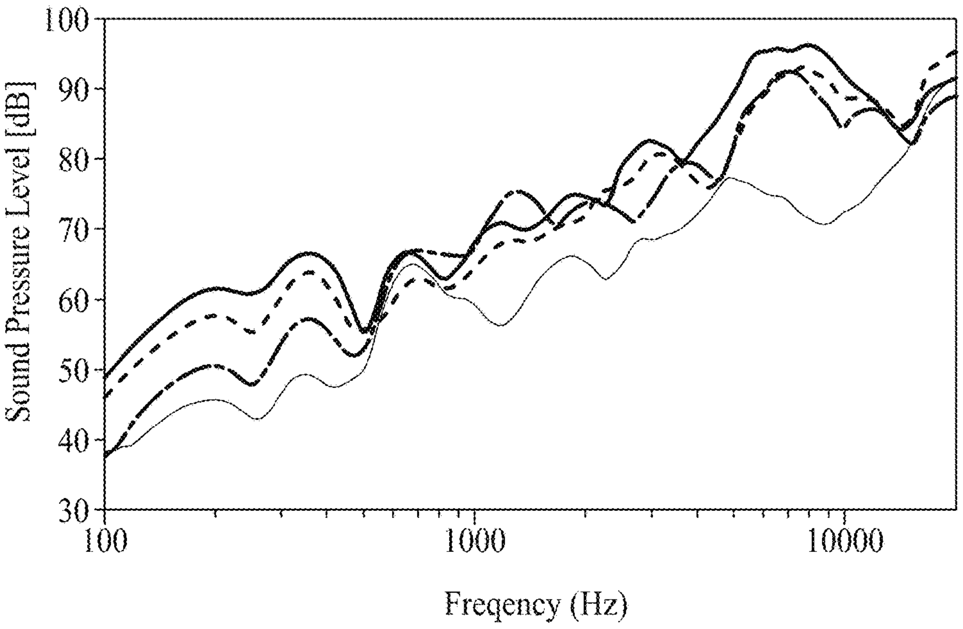
Figure 19:
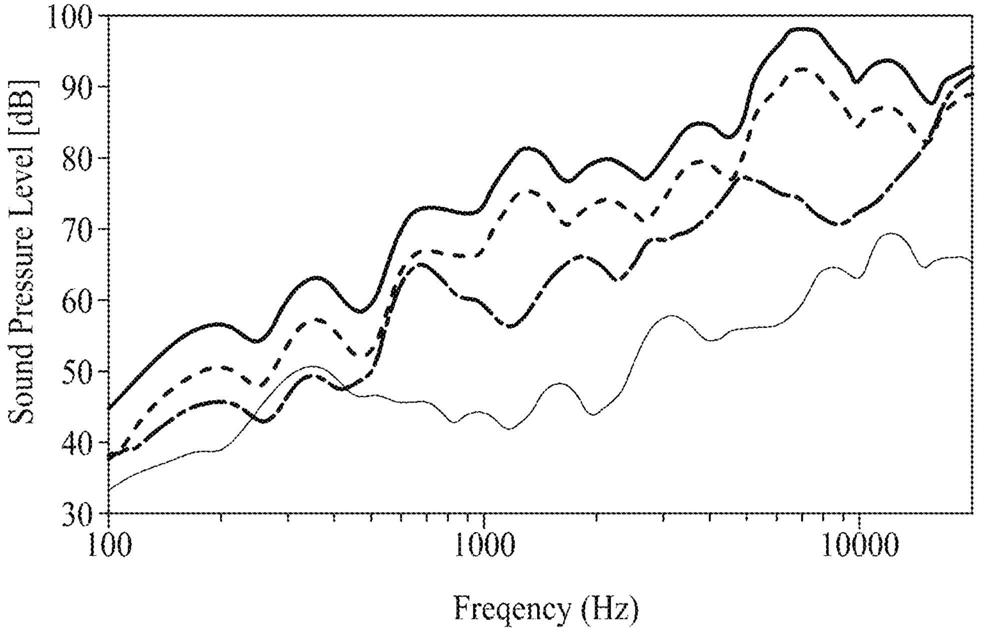

FIGS. 17 to 19 illustrate a frequency sound pressure level output characteristic with respect to a shape of a vibration member of a flat portion, a concave curved portion, and a convex curved portion.

A sound output characteristic may be measured by a sound analysis apparatus. The sound output characteristic has been measured by a B&K audio measurement apparatus. The sound analysis apparatus may include a sound card which transmits or receives a sound to or from a control personal computer (PC), an amplifier which amplifies a signal generated from the sound card and transfers the amplified signal to a vibration apparatus, and a microphone which collects a sound generated by the vibration apparatus in a display panel. For example, the microphone may be disposed at a center of the vibration apparatus, and a distance between the display panel and the microphone may be 30 cm. A sound may be measured under a condition where the microphone is vertical to the vibration apparatus. The sound collected through the microphone may be input to the control PC through the sound card, and a control program may check the input sound to analyze a sound of the vibration apparatus. For example, a frequency response characteristic corresponding to a frequency range of 100 Hz to 20 kHz may be measured by using a pulse program.

In FIG. 17, the abscissa axis represents a frequency in hertz (Hz), and the ordinate axis represents a sound pressure level SPL in decibels (dB).

A thin solid line of FIG. 17 represents a result of measurement when one vibration device 131 described above with reference to FIG. 2 is disposed at the second surface 110*b* of the vibration member 110 including a flat portion, and a thick dash-single dotted line represents a result of measurement when three vibration devices 131 are provided under the same condition. A thick dotted line represents a result of measurement when five vibration devices 131 are provided under the same condition. A thick solid line represents a result of measurement when ten vibration devices 131 are provided under the same condition. A voltage of 5 Vrms has been identically applied. FIGS. 17 to 19 show a result of measurement when an organic light emitting display panel is configured. For example, the organic light emitting display panel may include an anode electrode, a cathode electrode, and a light emitting device. The light emitting device may include a light emitting device layer formed on the anode electrode. The light emitting device layer may be implemented to emit light of the same color (for example, white light) for each pixel, or may be configured to emit light of a different color (for example, red, green, or blue light) for each pixel. In a stack structure including two or more structures having the same color or one or more different colors, a charge generating layer may be further provided between two or more structures. The charge generating layer may have a PN junction structure and may include an N-type charge generating layer or a P-type charge generating layer. A sound output characteristic has been measured in an apparatus which is configured in two stack structures and where a charge generating layer is provided between the two stack structures. Each of the two stack structures may be a configuration where a hole injection layer, a hole transport layer, a light emitting layer, an electron transport layer, and an electron injection layer are provided between the anode electrode and the cathode electrode, but embodiments of the present disclosure are not limited thereto. A capping layer may be further disposed on the cathode electrode. The light emitting layer may be configured as a light emitting layer which emits red light, green light, and blue light for each pixel.

With reference to FIG. 17, in a thin solid line (example 1), a mean sound pressure level in a frequency range of 300 Hz to 1,000 Hz has been measured to be 46.7 dB, a mean sound pressure level in a frequency range of 1,000 Hz to 8,000 Hz has been measured to be 51.9 dB, a mean sound pressure level in a frequency range of 300 Hz to 8,000 Hz has been measured to be 50.0 dB, and a mean sound pressure level in a frequency range of a full pitched sound band of 200 Hz to 20,000 Hz has been measured to be 52.6 dB.

In a thick dash-single dotted line (example 2), a mean sound pressure level in a frequency range of 300 Hz to 1,000 Hz has been measured to be 56.6 dB, a mean sound pressure level in a frequency range of 1,000 Hz to 8,000 Hz has been measured to be 65.9 dB, a mean sound pressure level in a frequency range of 300 Hz to 8,000 Hz has been measured to be 62.5 dB, and a mean sound pressure level in a frequency range of a full pitched sound band of 200 Hz to 20,000 Hz has been measured to be 64.6 dB.

In a thick dotted line (example 3), a mean sound pressure level in a frequency range of 300 Hz to 1,000 Hz has been measured to be 59.6 dB, a mean sound pressure level in a frequency range of 1,000 Hz to 8,000 Hz has been measured to be 67.0 dB, a mean sound pressure level in a frequency range of 300 Hz to 8,000 Hz has been measured to be 64.3 dB, and a mean sound pressure level in a frequency range of a full pitched sound band of 200 Hz to 20,000 Hz has been measured to be 66.6 dB.

In a thick solid line (example 4), a mean sound pressure level in a frequency range of 300 Hz to 1,000 Hz has been measured to be 63.2 dB, a mean sound pressure level in a frequency range of 1,000 Hz to 8,000 Hz has been measured to be 67.6 dB, a mean sound pressure level in a frequency range of 300 Hz to 8,000 Hz has been measured to be 66.0 dB, and a mean sound pressure level in a frequency range of a full pitched sound band of 200 Hz to 20,000 Hz has been measured to be 68.1 dB.

Based on a frequency sound pressure level measurement result of FIG. 17, in a case where a vibration member is configured to include only a flat portion, when the number of vibration devices disposed on the rear surface 110*b* of the vibration member 110 increases, it may be seen that a sound pressure level output characteristic is enhanced in a full pitched sound band including a low-pitched sound band, a middle-pitched sound band, and a high-pitched sound band. For example, in an embodiment where a vibration member includes a flat portion, it may be seen that a sound pressure level characteristic of the high-pitched sound band is enhanced compared to a case where a vibration member includes only a flat portion. For example, in an embodiment where a vibration member includes a flat portion, it may be seen that a sound pressure level characteristic of the full pitched sound band is enhanced compared to a case where a vibration member includes only a flat portion.

A thin solid line of FIG. 18 represents a result of measurement when one vibration device 131 described above with reference to FIG. 2 is disposed at the second surface 110*b* of the vibration member 110 including a concave convex portion, a thick dash-single dotted line represents a result of measurement when three vibration devices 131 are provided under the same condition, a thick dotted line represents a result of measurement when five vibration devices 131 are provided under the same condition, and a thick solid line represents a result of measurement when ten vibration devices 131 are provided under the same condition.

With reference to FIG. 18, a thin solid line (example 5) represents that a mean sound pressure level in a frequency range of 300 Hz to 1,000 Hz is measured to be 55.6 dB, a mean sound pressure level in a frequency range of 1,000 Hz to 8,000 Hz has been measured to be 67.9 dB, a mean sound pressure level in a frequency range of 300 Hz to 8,000 Hz has been measured to be 63.4 dB, and a mean sound pressure level in a frequency range of a full pitched sound band of 200 Hz to 20,000 Hz has been measured to be 64.8 dB.

A thick dash-single dotted line (example 6) represents that a mean sound pressure level in a frequency range of 300 Hz to 1,000 Hz is measured to be 60.4 dB, a mean sound pressure level in a frequency range of 1,000 Hz to 8,000 Hz has been measured to be 78.0 dB, a mean sound pressure level in a frequency range of 300 Hz to 8,000 Hz has been measured to be 71.6 dB, and a mean sound pressure level in a frequency range of a full pitched sound band of 200 Hz to 20,000 Hz has been measured to be 72.6 dB.

A thick dotted line (example 7) represents that a mean sound pressure level in a frequency range of 300 Hz to 1,000 Hz is measured to be 63.8 dB, a mean sound pressure level in a frequency range of 1,000 Hz to 8,000 Hz has been measured to be 77.4 dB, a mean sound pressure level in a frequency range of 300 Hz to 8,000 Hz has been measured to be 71.4 dB, and a mean sound pressure level in a frequency range of a full pitched sound band of 200 Hz to 20,000 Hz has been measured to be 73.7 dB.

A thick solid line (example 8) represents that a mean sound pressure level in a frequency range of 300 Hz to 1,000 Hz is measured to be 63.8 dB, a mean sound pressure level in a frequency range of 1,000 Hz to 8,000 Hz has been measured to be 80.9 dB, a mean sound pressure level in a frequency range of 300 Hz to 8,000 Hz has been measured to be 74.7 dB, and a mean sound pressure level in a frequency range of a full pitched sound band of 200 Hz to 20,000 Hz has been measured to be 76.5 dB.

Based on a frequency sound pressure level measurement result of FIG. 18, in a case where a vibration member is configured to include only a concave convex portion, when the number of vibration devices disposed at the rear surface 110*b* of the vibration member 110 increases, it may be seen that a sound pressure level output characteristic is enhanced in a full pitched sound band including a low-pitched sound band, a middle-pitched sound band, and a high-pitched sound band.

Comparing with the thick dash-single dotted line of FIG. 17, in the thin solid line of FIG. 18, a mean sound pressure level in a frequency range of 300 Hz to 1,000 Hz further increases by 0.6 dB, a mean sound pressure level in a frequency range of 1,000 Hz to 8,000 Hz further increases by 13.3 dB, a mean sound pressure level in a frequency range of 300 Hz to 8,000 Hz further increases by 8.7 dB, and a mean sound pressure level in a frequency range of a full pitched sound band of 200 Hz to 20,000 Hz further increases by 8.4 dB.

Therefore, With reference to FIGS. 17 and 18, comparing with a vibration member of a flat portion in a case where the vibration device 131 is disposed at the concave curved portion 110*a*2 of the vibration member, it may be seen that a sound pressure level is largely enhanced in a frequency range of 1,000 Hz to 8,000 Hz (for example, a frequency of a high-pitched sound band).

In FIG. 19, a thin solid line represents a result of measurement when one vibration device 131 described above with reference to FIG. 2 is disposed on the second surface 110*b* of the vibration member 110 including a concave convex portion, a thick dash-single dotted line represents a result of measurement when one vibration device 131 are provided on the second surface 110*b* of the vibration member 110 including a concave curved portion, a thick dotted line represents a result of measurement when three vibration devices 131 are provided on the second surface 110*b* of the vibration member 110 including a concave curved portion, and a thick solid line represents a result of measurement when a voltage of a vibration driving signal applied to a vibration device under the same condition as the thick dotted line is changed from 5 Vrms to 10 Vrms.

In FIG. 19, the thin solid line represents data under the same condition as the example 1 of FIG. 17, the thick dash-single dotted line represents data under the same condition as an example 5 of FIG. 18, and the thick dotted line represents data under the same condition as the example 6 of FIG. 18.

A thick solid line (an example 9) represents that a mean sound pressure level in a frequency range of 300 Hz to 1,000 Hz is measured to be 66.6 dB, a mean sound pressure level in a frequency range of 1,000 Hz to 8,000 Hz has been measured to be 84.1 dB, a mean sound pressure level in a frequency range of 300 Hz to 8,000 Hz has been measured to be 77.7 dB, and a mean sound pressure level in a frequency range of a full pitched sound band of 200 Hz to 20,000 Hz has been measured to be 78.7 dB.

Figure 20:
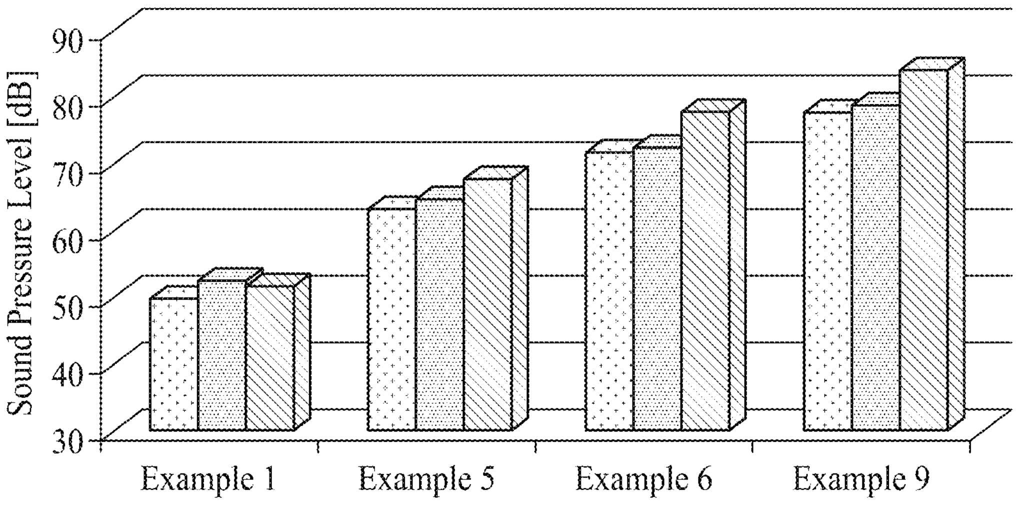
FIG. 20 illustrates a measurement result of FIG. 19 as a bar graph.

FIG. 20 illustrates a measurement result of FIG. 19 as a bar graph. FIG. 20 is a bar graph showing a measurement result of FIG. 19. FIG. 20 shows a mean sound pressure level value of each interval of the example 1, the example 5, the example 6, and the example 9. In each example of FIG. 20, a left bar graph represents a mean sound pressure level in a frequency range of 300 Hz to 8,000 Hz, a middle bar graph represents a mean sound pressure level in a frequency range of 200 Hz to 20,000 Hz, and a right bar graph represents a mean sound pressure level in a frequency range of 1,000 Hz to 8,000 Hz.

With reference to FIG. 20, comparing with an example 1, in an example 5, it may be seen that a mean sound pressure level in a frequency range of 1,000 Hz to 8,000 Hz increases by 16.0 dB. Comparing with the example 5, in an example 6, it may be seen that a mean sound pressure level in a frequency range of 1,000 Hz to 8,000 Hz increases by 10.1 dB. Comparing with the example 6, in an example 9, it may be seen that a mean sound pressure level in a frequency range of 1,000 Hz to 8,000 Hz increases by 6.1 dB.

In a case where the vibration member 110 is configured with a concave curved portion, based on a combination of the frequency sound pressure level characteristics of FIGS. 17 to 20, a sound pressure level of a middle-high-pitched sound band is enhanced, and as a voltage of a vibration driving signal applied to a vibration device is changed from 5 Vrms to 10 Vrms, a sound pressure level is additionally enhanced. When a plurality of vibration devices 131 are provided on the rear surface 110*b* of the vibration member

110, it may be seen that a sound pressure level output characteristic is enhanced in proportion to the number of vibration devices 131.

Figure 21:
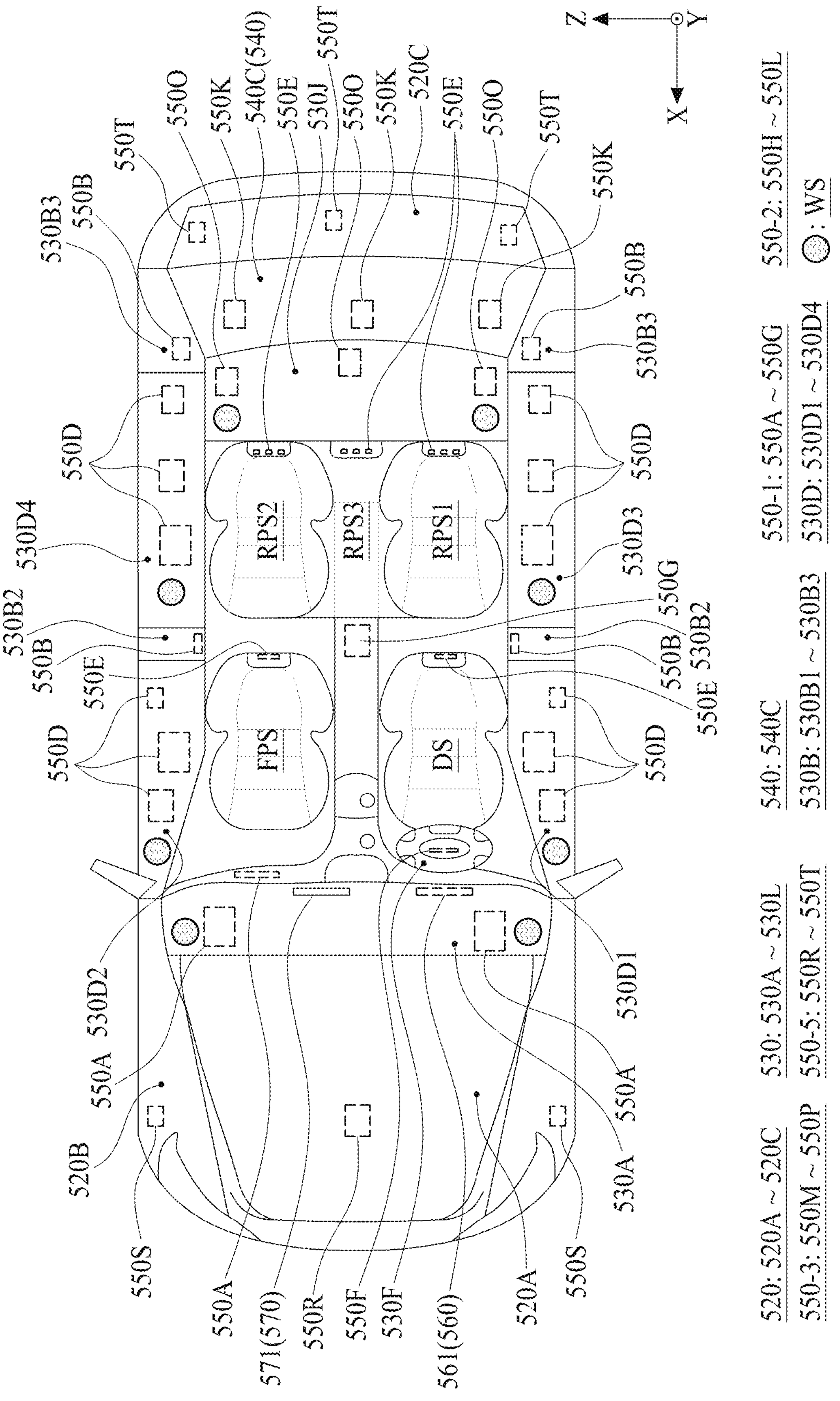
FIG. 21 illustrates a vehicular apparatus according to an embodiment of the present disclosure.
Figure 22:
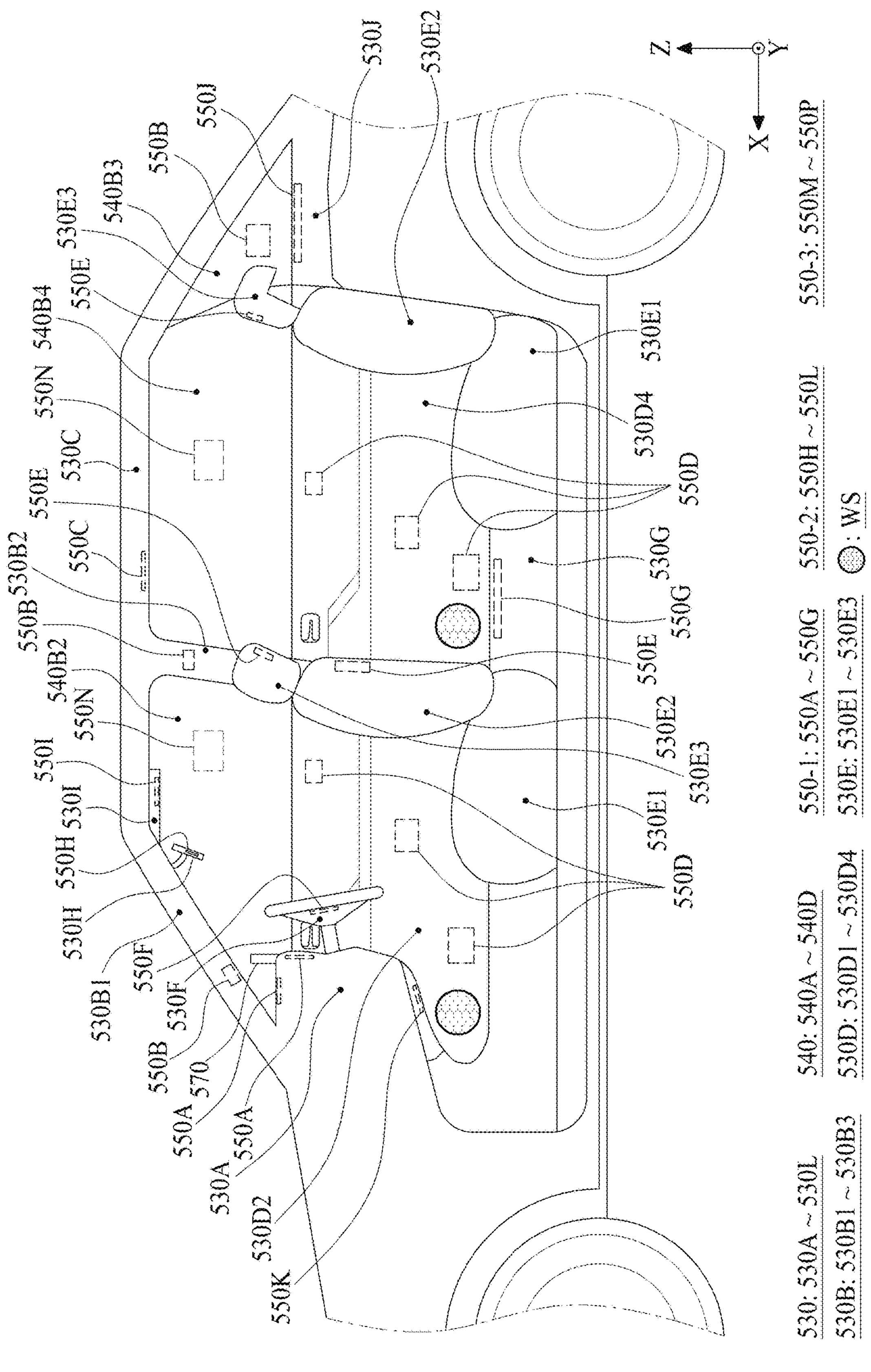
FIG. 22 is a cross-sectional view illustrating a vehicular apparatus according to an embodiment of the present disclosure.
Figure 23:
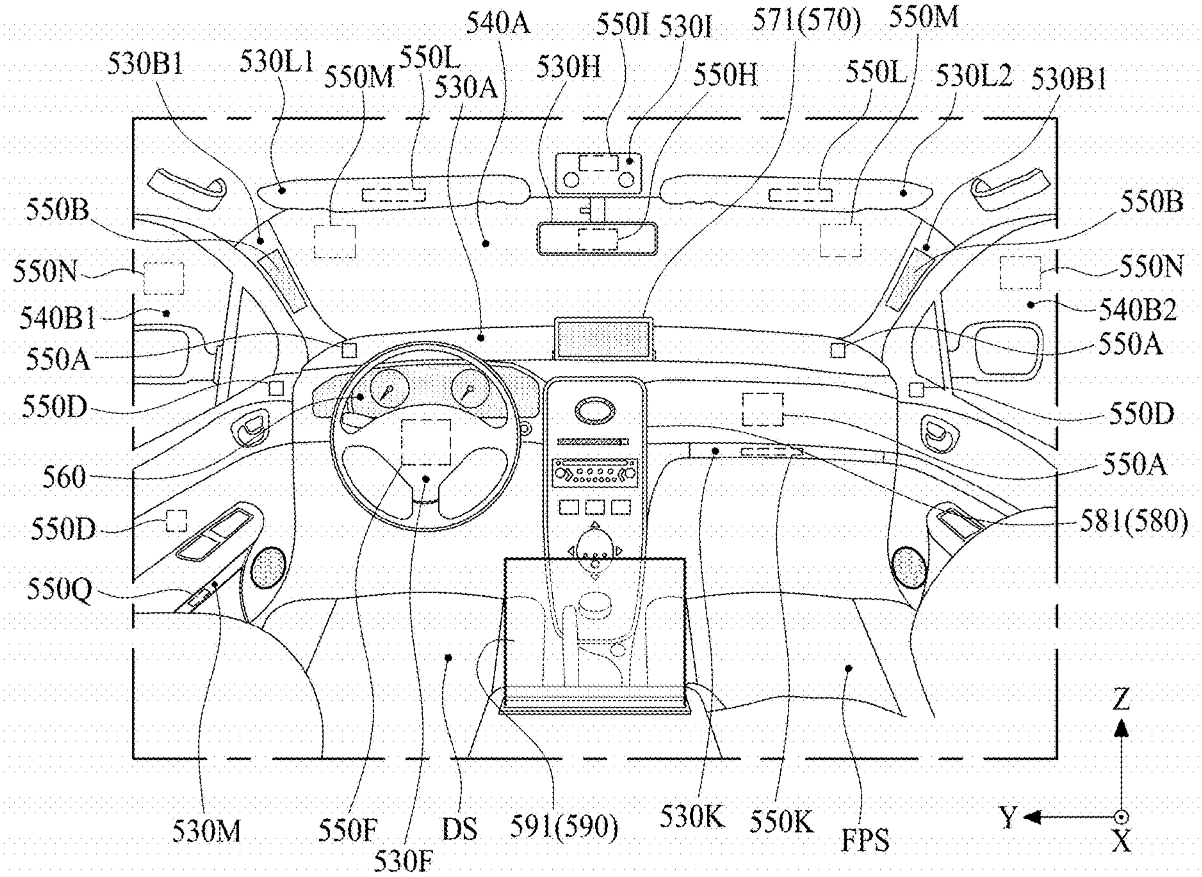
FIG. 23 illustrates a vibration generating apparatus disposed near a driver seat and a passenger seat of the vehicular apparatus of FIGS. 21 and 22.
Figure 24:
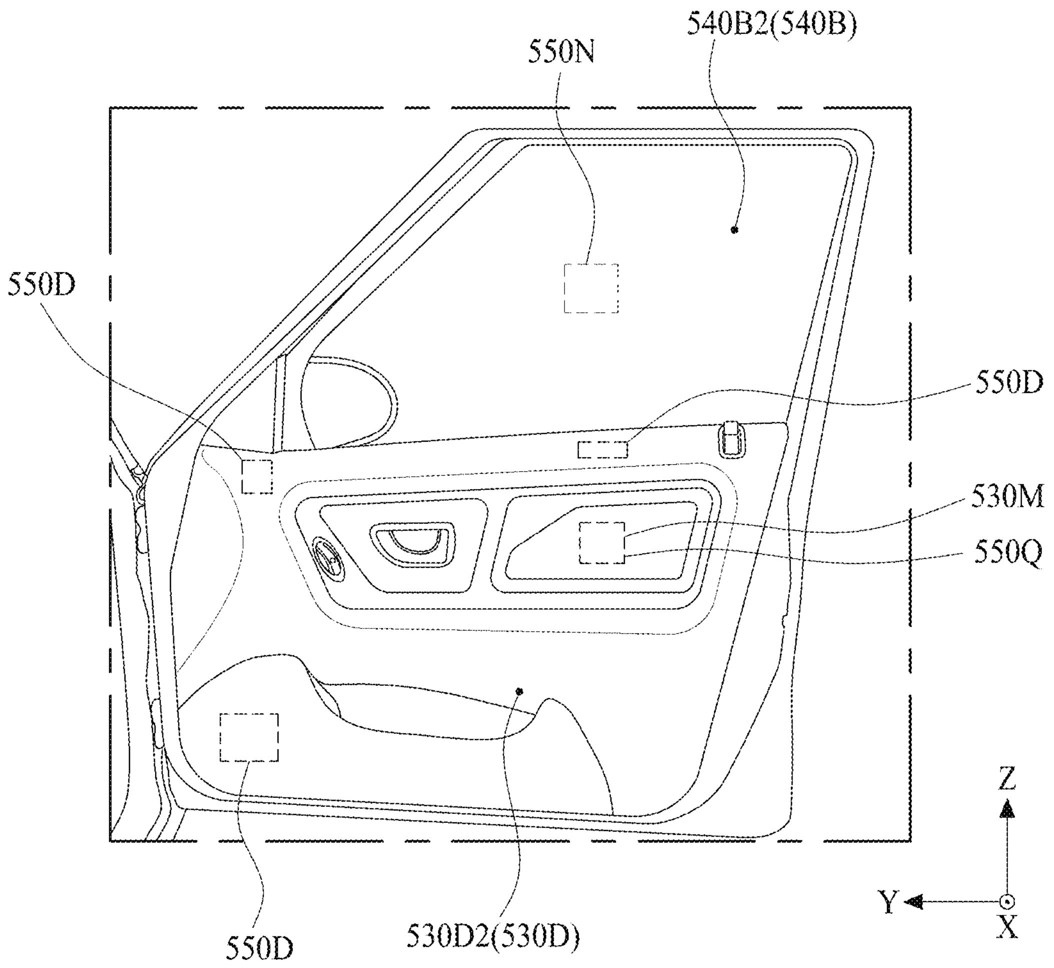
FIG. 24 illustrates a vibration generating apparatus disposed at a door and a glass window of the vehicular apparatus of FIGS. 21 and 22.
Figure 25:
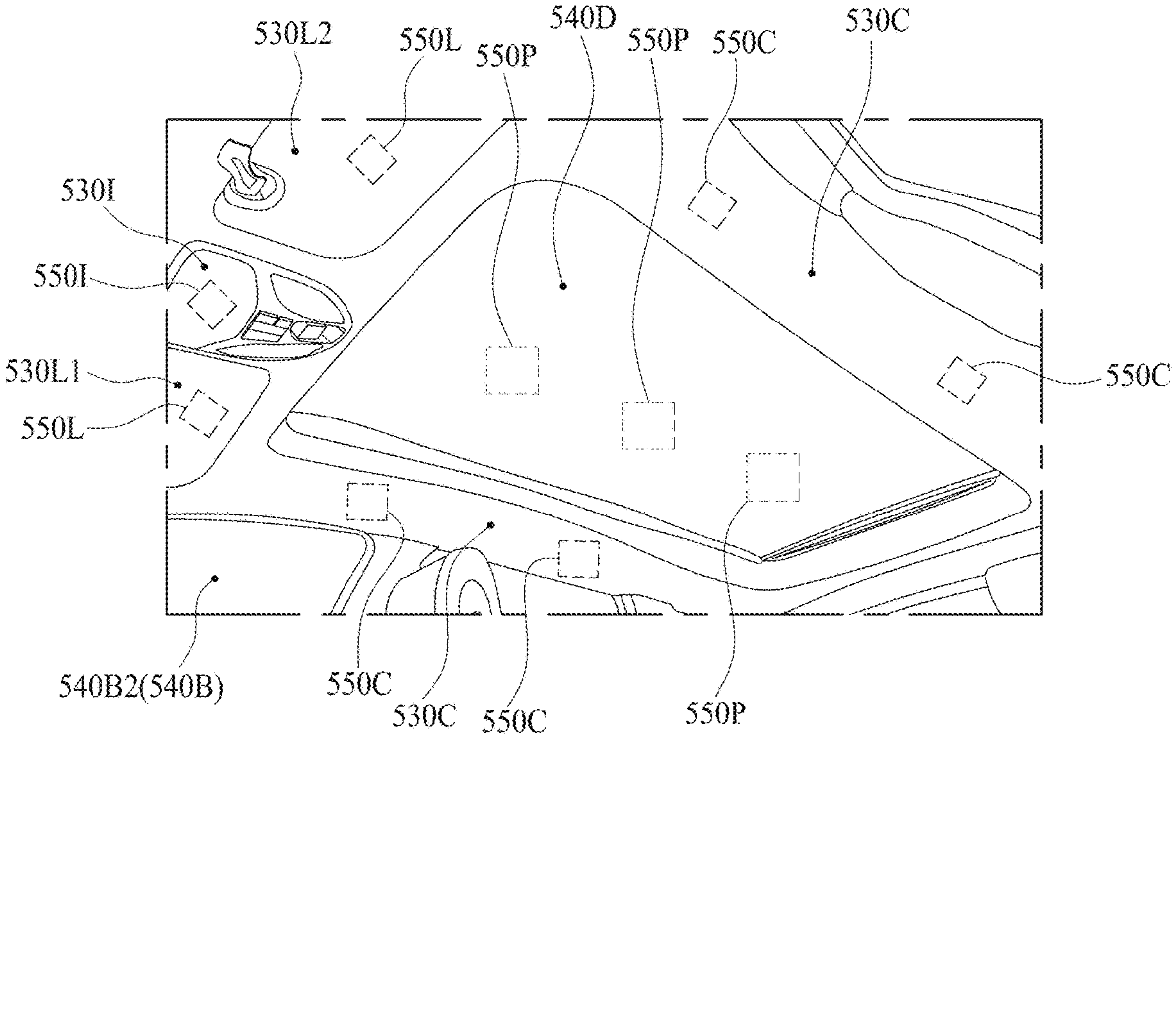
FIG. 25 illustrates a vibration generating apparatus disposed at a roof panel of the vehicular apparatus of FIGS. 21 and 22.
Figure 26:
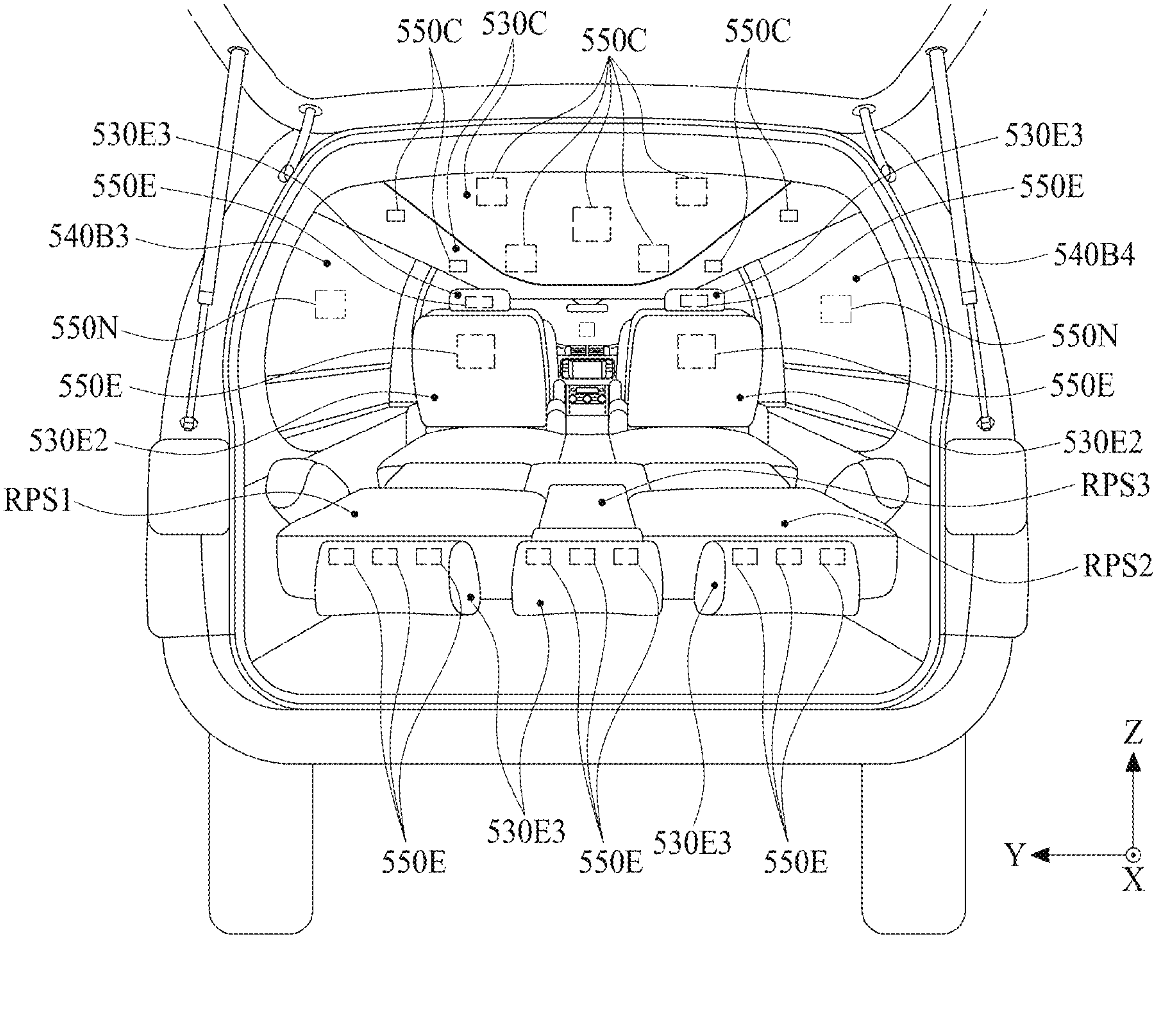
FIG. 26 illustrates a vibration generating apparatus disposed at a roof panel, a glass window, and a seat of the vehicular apparatus of FIGS. 21 and 22.

FIG. 21 illustrates a vehicular apparatus according to another embodiment of the present disclosure. FIG. 22 illustrates a vehicular apparatus according to another embodiment of the present disclosure. FIG. 23 illustrates a vibration generating apparatus disposed near a driver seat and a front passenger seat of FIGS. 21 and 22. FIG. 24 illustrates a vibration generating apparatus disposed in or at each of a door and a window of FIGS. 21 and 22. FIG. 25 illustrates a vibration generating apparatus disposed in or at a roof panel of FIGS. 21 and 22. FIG. 26 illustrates a vibration generating apparatus disposed in or at each of a roof panel, a window, and a seat of FIGS. 21 and 22.

With reference to FIGS. 21 to 26, a vehicular apparatus according to another embodiment of the present disclosure may include a first vibration generating apparatus 550-1 configured to output a sound in an exterior material 520 and an interior material 530. For example, the first vibration generating apparatus 550-1 may be disposed in or at the exterior material 520 or the interior material 530 or between the exterior material 520 and the interior material 530 to output a sound. For example, the first vibration generating apparatus 550-1 may be disposed in or at one or more of the exterior material 520, the interior material 530, and a region between the exterior material 520 and the interior material 530 to output a sound. For example, one or more of the exterior material 520 and the interior material 530 may output a sound based on vibrations of one or more vibration apparatuses.

The first vibration generating apparatus 550-1 may include at least one or more vibration apparatuses 550A to 550G which are disposed between the main structure (or the exterior material) and one or more of a dashboard interior material 530A, a pillar interior material 530B, a roof interior material 530C, a door interior material 530D, a seat interior material 530E, a handle interior material 530F, and a floor interior material 530G. For example, the first vibration generating apparatus 550-1 may include at least one or more of the first to seventh vibration apparatuses 550A to 550G and may output sounds of one or more channels by the one or more vibration apparatuses. For example, one or more of the first to seventh vibration apparatuses 550A to 550G may be configured to be transparent or semitransparent. For example, when a window is totally transparent, one or more of the first to seventh vibration apparatuses 550A to 550G may be configured to be transparent and may be disposed at a center region or a peripheral region of the window. When the window includes a semitransparent portion or an opaque portion, one or more of the first to seventh vibration apparatuses 550A to 550G may be configured to be semitransparent or opaque and may be disposed at the semitransparent portion or the opaque portion of the window. For example, one or more of the first to seventh vibration apparatuses 550A to 550G may be referred to as a transparent vibration generator, a transparent vibration generating apparatus, or a transparent sound generating apparatus, but embodiments of the present disclosure are not limited thereto.

With reference to FIGS. 21 to 23, the first vibration apparatus 550A according to an embodiment of the present disclosure may be disposed between the dashboard 530A and a dash panel and may be configured to indirectly or directly vibrate the dashboard 530A to output a sound. For example, the first vibration apparatus 550A may include the vibration apparatus 130 described above with reference to FIGS. 1 to 20, and thus, the repetitive description thereof may be omitted. For example, the first vibration apparatus 550A may be referred to as a term such as a dashboard speaker or a first speaker, or the like, but embodiments of the present disclosure are not limited thereto.

According to an embodiment of the present disclosure, at least one or more of the dash panel and the dashboard 530A may include a first region corresponding to a driver seat DS, a second region corresponding to a passenger seat FPS, and a third region (or a middle region) between the first region and the second region. At least one or more of the dash panel and the dashboard 530A may further include a fourth region which is inclined to face the passenger seat FPS. According to an embodiment of the present disclosure, the first vibration apparatus 550A may be configured to vibrate at least one or more among the first to fourth regions of the dashboard 530A. For example, the first vibration apparatus 550A may be disposed at each of the first and second regions of the dashboard 530A, or may be disposed at each of the first to fourth regions of the dashboard 530A. For example, the first vibration apparatus 550A may be disposed at each of the first and second regions of the dashboard 530A, or may be disposed at at least one or more of the first to fourth regions of the dashboard 530A. For example, the first vibration apparatus 550A may be configured to output a sound of about 150 Hz to about 20 kHz. For example, the first vibration apparatus 550A configured to vibrate at least one or more among the first to fourth regions of the dashboard 530A may have the same sound output characteristic or different sound output characteristics. For example, the first vibration apparatus 550A configured to vibrate each of the first to fourth regions of the dashboard 530A may have the same sound output characteristic or different sound output characteristics.

The second vibration apparatus 550B according to an embodiment of the present disclosure may be disposed between the pillar interior material 530B and a pillar panel and may be configured to indirectly or directly vibrate the pillar interior material 530B to output a sound. For example, the second vibration apparatus 550B may include the vibration apparatus 130 described above with reference to FIGS. 1 to 20, and thus, the repetitive description thereof may be omitted. The second vibration apparatus 550B may be referred to as a term such as a pillar speaker, a tweeter speaker, or a second speaker, or the like, but embodiments of the present disclosure are not limited thereto.

According to an embodiment of the present disclosure, the pillar panel may include a first pillar (or an A pillar) disposed at both sides of a front glass window, a second pillar (or a B pillar) disposed at both sides of a center of a vehicle body, and a third pillar (or a C pillar) disposed at both sides of a rear portion of the vehicle body. The pillar interior material 530B may include a first pillar interior material 530B1 covering the first pillar, a second pillar interior material 530B2 covering the second pillar, and a third pillar interior material 530B3 covering the third pillar. According to an embodiment of the present disclosure, the second vibration apparatus 550B may be disposed in or at at least one or more of a region between the first pillar and the first pillar interior material 530B1, a region between the second pillar and the second pillar interior material 530B2, and a region between the third pillar and the third pillar interior material 530B3, and thus, may vibrate at least one or more of the first to third pillar interior materials 530B1 to 530B3. For example, the second vibration apparatus 550B may be configured to output a sound of about 2 kHz to about 20 kHz, but embodiments of the present disclosure are not limited thereto. For example, the second vibration apparatus

550B may be configured to output a sound of about 150 Hz to about 20 kHz. For example, the second vibration apparatus 550B configured to vibrate at least one or more of the first to third pillar interior materials 530B1 to 530B3 may have the same sound output characteristic or different sound output characteristics.

With reference to FIGS. 22, 25, and 26, a third vibration apparatus 550C according to an embodiment of the present disclosure may be disposed between a roof panel and a roof interior material 530C and may be configured to directly or indirectly vibrate the roof interior material 530C to output a sound. For example, the third vibration apparatus 550C may be configured to be transparent or semitransparent. For example, the third vibration apparatus 550C may include the vibration apparatus 130 described above with reference to FIGS. 1 to 20, and thus, the repetitive description thereof may be omitted. For example, the third vibration apparatus 550C may be referred to as a roof speaker or a third speaker, but embodiments of the present disclosure are not limited thereto.

According to an embodiment of the present disclosure, at least one or more of the roof panel and the roof interior material 530C covering the roof panel may include the first region corresponding to the driver seat DS, the second region corresponding to the passenger seat FPS, a third region corresponding to a region between the driver seat DS and the passenger seat FPS, a fourth region corresponding to a first rear seat RPS1 behind the driver seat DS, a fifth region corresponding to a second rear seat RPS2 behind the passenger seat FPS, a sixth region corresponding to a region between the first rear seat RPS1 and the second rear seat RPS2, and a seventh region between the third region and the sixth region. For example, the third vibration apparatus 550C may be configured to vibrate at least one or more among the first to seventh regions of the roof interior material 530C. For example, the third vibration apparatus 550C may be configured to output a sound of about 150 Hz to about 20 kHz. For example, the third vibration apparatus 550C configured to vibrate at least one or more among the first to seventh regions of the roof interior material 530C may have the same sound output characteristic or different sound output characteristics. For example, the third vibration apparatus 550C configured to vibrate each of the first to seventh regions of the roof interior material 530C may have the same sound output characteristic or different sound output characteristics. For example, at least one or more third vibration apparatuses 550C configured to vibrate at least one or more among the first to seventh regions of the roof interior material 530C may be configured to output a sound of about 2 kHz to about 20 kHz, and the other third vibration apparatuses 550C may be configured to output a sound of about 150 Hz to about 20 kHz. For example, at least one or more among third vibration apparatuses 550C configured to vibrate each of the first to seventh regions of the roof interior material 530C may be configured to output a sound of about 2 kHz to about 20 kHz, and the other third vibration apparatuses 550C may be configured to output a sound of about 150 Hz to about 20 kHz.

With reference to FIGS. 21 to 24, the fourth vibration apparatus 550D according to an embodiment of the present disclosure may be disposed between the door frame and the door interior material 530D and may be configured to indirectly or directly vibrate the door interior material 530D to output a sound. For example, the fourth vibration apparatus 550D may include the vibration apparatus 130 described above with reference to FIGS. 1 to 20, and thus, the repetitive description thereof may be omitted. For example, the fourth vibration apparatus 550D may be referred to as a term such as a door speaker or a fourth speaker, or the like, but embodiments of the present disclosure are not limited thereto.

According to an embodiment of the present disclosure, at least one or more of the door frame and the door interior material 530D may include an upper region, a middle region, and a lower region with respect to a height direction Z of the apparatus 20. For example, the fourth vibration apparatus 550D may be disposed at at least one or more among an upper region, a middle region, and a lower region between the door frame and the door interior material 530D, and thus, may vibrate at least one or more among an upper region, a middle region, and a lower region of the door interior material 530D.

According to an embodiment of the present disclosure, the upper region of a door interior material 530D may include a curved portion having a curvature radius which is relatively small. A fourth vibration apparatus 550D for vibrating the upper region of the door interior material 530D may have the second portion 131*a*2 having flexibility of the vibration device 131 illustrated in one or more of FIGS. 7A to 7D among the vibration apparatuses described above with reference to FIGS. 1 to 20, and thus, may be bent in a shape (an equiangular shape or a conformal shape) based on a shape (or a surface shape) of a curved portion of the upper region of the door interior material 530D.

According to an embodiment of the present disclosure, the door frame may include a first door frame (or a left front door frame), a second door frame (or a right front door frame), a third door frame (or a left rear door frame), and a fourth door frame (or a right rear door frame). According to an embodiment of the present disclosure, the door interior material 530D may include a first door interior material (or a left front door interior material) 530D1 covering the first door frame, a second door interior material (or a right front door interior material) 530D2 covering the second door frame, a third door interior material (or a left rear door interior material) 530D3 covering the third door frame, and a fourth door interior material (or a right rear door interior material) 530D4 covering the fourth door frame. For example, the fourth vibration apparatus 550D may be disposed at at least one or more among an upper region, a middle region, and a lower region between each of the first to fourth door frames and the first to fourth door interior materials 530D1 to 530D4 and may vibrate at least one or more among an upper region, a middle region, and a lower region of each of the first to fourth door interior materials 530D1 to 530D4.

According to an embodiment of the present disclosure, the fourth vibration apparatus 550D configured to vibrate the upper region of each of the first to fourth door interior materials 530D1 to 530D4 may be configured to output a sound of about 2 kHz to about 20 kHz, or may be configured to output a sound of about 150 Hz to about 20 kHz. For example, the fourth vibration apparatus 550D configured to vibrate the upper regions of at least one or more among the first to fourth door interior materials 530D1 to 530D4 may be configured to output a sound of about 2 kHz to about 20 kHz, or may be configured to output a sound of about 150 Hz to about 20 kHz.

According to an embodiment of the present disclosure, the fourth vibration apparatus 550D configured to vibrate the middle regions or/and the lower regions of at least one or more among the first to fourth door interior materials 530D1 to 530D4 may be configured to output a sound of about 150 Hz to about 20 kHz. The fourth vibration apparatus 550D configured to vibrate the middle region or/and the lower region of each of the first to fourth door interior materials 530D1 to 530D4 may be configured to output a sound of about 150 Hz to about 20 kHz. For example, the fourth vibration apparatus 550D configured to vibrate the middle regions or/and the lower regions of at least one or more among the first to fourth door interior materials 530D1 to 530D4 may be one or more of a woofer, a mid-woofer, and a sub-woofer, but embodiments of the present disclosure are not limited thereto. For example, the fourth vibration apparatus 550D configured to vibrate the middle region or/and the lower region of each of the first to fourth door interior materials 530D1 to 530D4 may be referred to as a term such as one or more of a woofer, a mid-woofer, and a sub-woofer, but embodiments of the present disclosure are not limited thereto.

Sounds, which are respectively output from the fourth vibration apparatus 550D disposed at the first door interior material 530D1 and the fourth vibration apparatus 550D disposed at the second door interior material 530D2, may be combined and output. For example, sounds, which are output from at least one or more of the fourth vibration apparatuses 550D disposed at the first door interior material 530D1 and the fourth vibration apparatus 550D disposed at the second door interior material 530D2, may be combined and output. Moreover, a sound output from the fourth vibration apparatus 550D disposed at the third door interior material 530D3 and a sound output from the fourth vibration apparatus 550D disposed at the fourth door interior material 530D4 may be combined and output.

According to an embodiment of the present disclosure, an upper region of each of the first to fourth door interior materials 530D1 to 530D4 may include a first upper region adjacent to the dashboard 530A, a second upper region adjacent to the rear seats RPS1, RPS2, and RPS3, and a third upper region between the first upper region and the second upper region. For example, the fourth vibration apparatus 550D may be disposed at one or more among the first to third upper regions of each of the first to fourth door interior materials 530D1 to 530D4. For example, the fourth vibration apparatus 550D may be disposed at the first upper region of each of the first and second door interior materials 530D1 and 530D2 and may be disposed at one or more among the second and third upper regions of each of the first and second door interior materials 530D1 and 530D2. For example, the fourth vibration apparatus 550D may be disposed at one or more among the first to third upper regions of one or more among the first to fourth door interior materials 530D1 to 530D4. For example, the fourth vibration apparatus 550D configured to vibrate the first upper regions of one or more among the first and second door interior materials 530D1 and 530D2 may be configured to output a sound of about 2 kHz to about 20 kHz, and the fourth vibration apparatus 550D configured to vibrate one or more among the second and third upper regions of each of the first and second door interior materials 530D1 and 530D2 may be configured to output a sound of about 2 kHz to about 20 kHz, or may be configured to output a sound of about 150 Hz to about 20 kHz. For example, the fourth vibration apparatus 550D configured to vibrate one or more among the second and third upper regions of one or more among the first and second door interior materials 530D1 and 530D2 may be configured to output a sound of about 2 kHz to about 20 kHz, or may be configured to output a sound of about 150 Hz to about 20 kHz.

With reference to FIGS. 21, 22, and 26, the fifth vibration apparatus 550E according to an embodiment of the present disclosure may be disposed between a seat frame and the seat interior material 530E and may be configured to indirectly or directly vibrate the seat interior material 530E to output a sound. For example, the fifth vibration apparatus 550E may include the vibration apparatus 130 described above with reference to FIGS. 1 to 20, and thus, the repetitive description thereof may be omitted. For example, the fifth vibration apparatus 550E may be referred to as a term such as a seat speaker, a headrest speaker, or a fifth speaker, or the like, but embodiments of the present disclosure are not limited thereto.

According to an embodiment of the present disclosure, the seat frame may include a first seat frame (or a driver seat frame), a second seat frame (or a passenger seat frame), a third seat frame (or a first rear seat frame), a fourth seat frame (or a second rear seat frame), and a fifth seat frame (or a third rear seat frame). According to an embodiment of the present disclosure, the seat interior material 530E may include a first seat interior material surrounding the first seat frame, a second seat interior material surrounding the second seat frame, a third seat interior material surrounding the third seat frame, a fourth seat interior material surrounding the fourth seat frame, and a fifth seat interior material surrounding the fifth seat frame.

According to an embodiment of the present disclosure, at least one or more among the first to fifth seat frames may include a seat bottom frame, a seat back frame, and a headrest frame. The seat interior material 530E may include a seat bottom interior material 530E1 surrounding the seat bottom frame, a seat back interior material 530E2 surrounding the seat back frame, and a headrest interior material 530E3 surrounding the headrest frame. At least one or more among the seat bottom interior material 530E1, the seat back interior material 530E2, and the headrest interior material 530E3 may include a seat inner interior material and a seat outer interior material. The seat inner interior material may include a foam layer. The seat outer interior material may include a surface layer including a fiber or leather. The outer seat interior material may further include a base layer including a plastic material which supports the surface layer.

According to an embodiment of the present disclosure, the fifth vibration apparatus 550E may be disposed at at least one or more among a region between the seat back frame and the seat back interior material 530E2 and a region between the headrest frame and the headrest interior material 530E3, and thus, may vibrate at least one or more among the seat outer interior material of the seat back interior material 530E2 and the seat outer interior material of the headrest interior material 530E3.

According to an embodiment of the present disclosure, the fifth vibration apparatus 550E disposed at at least one or more of the driver seat DS and the passenger seat FPS may be disposed at at least one or more among the region between the seat back frame and the seat back interior material 530E2 and the region between the headrest frame and the headrest interior material 530E3.

According to an embodiment of the present disclosure, the fifth vibration apparatus 550E disposed at at least one or more among the first to third rear seats RPS1, RPS2, and RPS3 may be disposed between the headrest frame and the headrest interior material 530E3. For example, at least one or more among the first to third rear seats RPS1, RPS2, and RPS3 may include at least one or more fifth vibration apparatuses 550E disposed between the headrest frame and the headrest interior material 530E3.

According to an embodiment of the present disclosure, the fifth vibration apparatus 550E vibrating the seat back interior materials 530E2 of at least one or more among the driver seat DS and the passenger seat FPS may be configured to output a sound of about 150 Hz to about 20 kHz.

According to an embodiment of the present disclosure, the fifth vibration apparatus 550E vibrating the headrest interior materials 530E3 of at least one or more among the driver seat DS, the passenger seat FPS, and the first to third rear seats RPS1, RPS2, and RPS3 may be configured to output a sound of about 2 kHz to about 20 kHz, or may be configured to output a sound of about 150 Hz to about 20 kHz.

With reference to FIGS. 21 to 23, the sixth vibration apparatus 550F according to an embodiment of the present disclosure may be disposed between a handle frame and the handle interior material 530F and may be configured to indirectly or directly vibrate the handle interior material 530F to output a sound. For example, the sixth vibration apparatus 550F may include the vibration apparatus 130 described above with reference to FIGS. 1 to 20, and thus, the repetitive description thereof mat be omitted. For example, the sixth vibration apparatus 550F may be referred to as a term such as a handle speaker, a steering speaker, or a sixth speaker, or the like, but embodiments of the present disclosure are not limited thereto.

According to an embodiment of the present disclosure, the sixth vibration apparatus 550F may be configured to indirectly or directly vibrate the handle interior material 530F to provide a driver with a sound. A sound output by the sixth vibration apparatus 550F may be a sound which is the same as or different from a sound output from each of the first to fifth vibration apparatuses 550A to 550E. For example, a sound output by the sixth vibration apparatus 550F may be a sound which is the same as or different from sounds output from at least one or more among the first to fifth vibration apparatuses 550A to 550E. As an embodiment of the present disclosure, the sixth vibration apparatus 550F may output a sound which is to be provided to only the driver. In another embodiment of the present disclosure, the sound output by the sixth vibration apparatus 550F and a sound output by each of the first to fifth vibration apparatuses 550A to 550E may be combined and output. For example, the sound output by the sixth vibration apparatus 550F and the sound output by at least one or more among the first to fifth vibration apparatuses 550A to 550E may be combined and output.

With reference to FIGS. 21 and 22, the seventh vibration apparatus 550G may be disposed between the floor panel and the floor interior material 530G and may be configured to indirectly or directly vibrate the floor internal material 530G to output a sound. The seventh vibration apparatus 550G may be disposed between the floor interior material 530G and the floor panel disposed between the front seats DS and FPS and the third rear seat RPS3. For example, the seventh vibration apparatus 550G may include the vibration apparatus 130 described above with reference to FIGS. 1 to 20, and thus, the repetitive description thereof may be omitted. For example, the seventh vibration apparatus 550G may be configured to output a sound of about 150 Hz to about 20 kHz. For example, the seventh vibration apparatus 550G may be referred to as a term such as a floor speaker, a bottom speaker, an under speaker, or a seventh speaker, or the like, but embodiments of the present disclosure are not limited thereto.

With reference to FIGS. 21 to 25, the vehicular apparatus according to an embodiment of the present disclosure may further include a second vibration generating apparatus 550-2 which is disposed in or at the interior material 530 exposed at an indoor space. For example, the vehicular apparatus according to an embodiment of the present disclosure may include only the second vibration generating apparatus 550-2 instead of the first vibration generating apparatus 550-1, or may include all of the first vibration generating apparatus 550-1 and the second vibration generating apparatus 550-2. For example, a first vibration generating apparatus 550-1 and/or a second vibration generating apparatus 550-2 may be disposed in or at an interior material 530 to output a sound. For example, the interior material 530 may output a sound based on vibrations of one or more vibration generating apparatuses (or vibration apparatus).

According to an embodiment of the present disclosure, the interior material 530 may further include a rear view mirror 530H, an overhead console 530I, a rear package interior material 530J, a glove box 530K, and a sun visor 530L, or the like.

The second vibration generating apparatus 550-2 according to an embodiment of the present disclosure may include at least one or more vibration apparatuses 550H to 550L which are disposed at at least one among the rear view mirror 530H, the overhead console 530I, the rear package interior material 530I, the glove box 530K, and the sun visor 530L. For example, the second vibration generating apparatus 550-2 may include at least one or more among eighth to twelfth vibration apparatuses 550H to 550L, and thus, may output sounds of one or more channels.

With reference to FIGS. 21 to 25, the eighth vibration apparatus 550H may be disposed at the rear view mirror 530H and may be configured to indirectly or directly vibrate the rear view mirror 530H to output a sound. The eighth vibration apparatus 550H may be disposed between a mirror housing connected to the main structure and the rear view mirror 530H supported by the mirror housing. For example, the eighth vibration apparatus 550H may include the vibration apparatus 130 described above with reference to FIGS. 7A to 7D in the vibration apparatus of FIGS. 1 to 20, and thus, repetitive description thereof may be omitted. For example, the eighth vibration apparatus 550H may be configured to output a sound of about 150 Hz to about 20 kHz. For example, the eighth vibration apparatus 550H may be referred to as a term such as a mirror speaker or an eighth speaker, or the like, but embodiments of the present disclosure are not limited thereto.

With reference to FIGS. 22, 23, and 25, the ninth vibration apparatus 550I may be disposed at the overhead console 530I and may be configured to indirectly or directly vibrate a console cover of the overhead console 530I to output a sound. According to an embodiment of the present disclosure, the overhead console 530I may include a console box buried (or embedded) into the roof panel, a lighting device disposed at the console box, and a console cover covering the lighting device and the console box.

The ninth vibration apparatus 550I may be disposed between the console box of the overhead console 530I and the console cover and may vibrate the console cover. For example, the ninth vibration apparatus 550I may be disposed between the console box of the overhead console 530I and the console cover and may directly vibrate the console cover. For example, the ninth vibration apparatus 550I may include the vibration apparatus 130 described above with reference to FIGS. 7A to 7D in the vibration apparatus of FIGS. 1 to 20, and thus, the repetitive description thereof may be omitted. For example, the ninth vibration apparatus 550I may be configured to output a sound of about 150 Hz to about 20 kHz. For example, the ninth vibration apparatus 550I may be referred to as a term such as a console speaker, a lighting speaker, or a ninth speaker, or the like, but embodiments of the present disclosure are not limited thereto.

The vehicular apparatus according to an embodiment of the present disclosure may further include a center lighting box disposed at a center region of the roof interior material 530C, a center lighting device disposed at the center lighting box, and a center lighting cover covering the center lighting device. For example, the ninth vibration apparatus 550I may be further disposed between the center lighting box and the center lighting cover of the center lighting device and may additionally vibrate the center lighting cover.

With reference to FIGS. 21 and 22, the tenth vibration apparatus 550J may be disposed at the rear package interior material 530J and may be configured to indirectly or directly vibrate the rear package interior material 530J to output a sound. The rear package interior material 530J may be disposed behind (or back portion) the first to third rear seats RPS1, RPS2, and RPS3. For example, a portion of the rear package interior material 530J may be disposed under a rear glass window 540C.

The tenth vibration apparatus 550J may be disposed at a rear surface of the rear package interior material 530J and may vibrate the rear package interior material 530J. For example, the tenth vibration apparatus 550J may include the vibration apparatus 130 described above with reference to FIGS. 7A to 7D in the vibration apparatus of FIGS. 1 to 20, and thus, the repetitive description thereof may be omitted. For example, the tenth vibration apparatus 550J may be referred to as a term such as a rear speaker or a tenth speaker, or the like, but embodiments of the present disclosure are not limited thereto.

According to an embodiment of the present disclosure, the rear package interior material 530J may include a first region corresponding to a rear portion of the first rear seat RPS1, a second region corresponding to a rear portion of the second rear seat RPS2, and a third region corresponding to a rear portion of the third passenger seat RPS3. According to an embodiment of the present disclosure, the tenth vibration apparatus 550J may be disposed to vibrate at least one or more among the first to third regions of the rear package interior material 530J. For example, the tenth vibration apparatus 550J may be disposed at each of the first and second regions of the rear package interior material 530J, or may be disposed at each of the first to third regions of the rear package interior material 530J. For example, the tenth vibration apparatus 550J may be disposed at at least one or more among the first and second regions of the rear package interior material 530J, or may be disposed at at least one or more among the first to third regions of the rear package interior material 530J. For example, the tenth vibration apparatus 550J may be configured to output a sound of about 150 Hz to about 20 kHz. For example, the tenth vibration apparatus 550J configured to vibrate each of the first to third regions of the rear package interior material 530J may have the same sound output characteristic or different sound output characteristics. For example, the tenth vibration apparatus 550J configured to vibrate at least one or more among the first to third regions of the rear package interior material 530J may have the same sound output characteristic or different sound output characteristics.

With reference to FIGS. 21 to 23, the eleventh vibration apparatus 550K may be disposed at a glove box 530K and may be configured to indirectly or directly vibrate the glove box 530K to output a sound. The glove box 530K may be disposed at a dashboard 530A corresponding to a front portion of the passenger seat FPS.

The eleventh vibration apparatus 550K may be disposed at an inner surface of the glove box 530K and may vibrate the glove box 530K. For example, the eleventh vibration apparatus 550K may include the vibration apparatus 130 described above with reference to FIGS. 7A to 7D in the vibration apparatus of FIGS. 1 to 20, and thus, the repetitive description thereof may be omitted. For example, the eleventh vibration apparatus 550K may be configured to output a sound of about 150 Hz to about 20 kHz, or may be one or more of a woofer, a mid-woofer, and a sub-woofer, but embodiments of the present disclosure are not limited thereto. For example, the eleventh vibration apparatus 550K may be referred to as a term such as a glove box speaker or an eleventh speaker, or the like, but embodiments of the present disclosure are not limited thereto.

With reference to FIG. 23, the twelfth vibration apparatus 550L may be disposed at the sun visor 530L and may be configured to indirectly or directly vibrate the sun visor 530L to output a sound. The sun visor 530L may include a first sun visor 530L1 corresponding to the driver seat DS and a second sun visor 530L2 corresponding to the passenger seat FPS.

The twelfth vibration apparatus 550L may be disposed at at least one or more among the first sun visor 530L1 and the second sun visor 530L2 and may indirectly or directly vibrate at least one or more among the first sun visor 530L1 and the second sun visor 530L2. For example, the twelfth vibration apparatus 550L may include the vibration apparatus 130 described above with reference to FIGS. 7A to 7D in the vibration apparatus of FIGS. 1 to 20, and thus, the repetitive description thereof may be omitted. For example, the twelfth vibration apparatus 550L may be configured to output a sound of about 150 Hz to about 20 kHz. For example, the twelfth vibration apparatus 550L may be referred to as a term such as a sun visor speaker or a twelfth speaker, or the like, but embodiments of the present disclosure are not limited thereto.

According to an embodiment of the present disclosure, at least one or more among the first sun visor 530L1 and the second sun visor 530L2 may further include a sun visor mirror. In this case, the twelfth vibration apparatus 550L may be configured to indirectly or directly vibrate a sun visor mirror of at least one or more among the first sun visor 530L1 and the second sun visor 530L2. The twelfth vibration apparatus 550L vibrating the sun visor mirror may include the vibration apparatus 130 described above with reference to FIGS. 7A to 7D in the vibration apparatus of FIGS. 1 to 20, and thus, the repetitive description thereof may be omitted.

With reference to FIGS. 21 to 25, the vehicular apparatus according to an embodiment of the present disclosure may further include a third vibration generating apparatus 550-3 disposed at the glass window 540. For example, the vehicular apparatus according to an embodiment of the present disclosure may include the third vibration generating apparatus 550-3 instead of at least one or more of the first and second vibration generating apparatuses 550-1 and 550-2, or may include all of the first to third vibration generating apparatuses 550-1, 550-2, and 550-3. For example, one or more of the first vibration generating apparatus 550-1, a second vibration generating apparatus 550-2, and a third vibration generating apparatus 550-3 may be disposed in or at a window 540 to output a sound. For example, the window 540 may output a sound on based vibrations of one or more vibration generating apparatuses (or vibration apparatus).

The third vibration generating apparatus 550-3 may include at least one or more vibration apparatuses 550M to

550P disposed at the glass window 540. For example, the third vibration generating apparatus 550-3 may include at least one or more among thirteenth to sixteenth vibration apparatuses 550M to 550P, and thus, may output sounds of one or more channels. For example, the third vibration generating apparatus 550-3 may be referred to as a term such as a window speaker, a transparent sound generating apparatus, a transparent speaker, or an opaque speaker, or the like, but embodiments of the present disclosure are not limited thereto.

At least one or more among the thirteenth to sixteenth vibration apparatuses 550M to 550P according to an embodiment of the present disclosure may be configured to indirectly or directly vibrate the glass window 540. For example, at least one or more among the thirteenth to sixteenth vibration apparatuses 550M to 550P may include the vibration apparatus 130 described above with reference to FIGS. 1 to 20, may be configured to be transparent, semitransparent, or opaque, and thus, their repetitive descriptions may be omitted.

According to an embodiment of the present disclosure, the glass window 540 may include a front glass window 540A, a side glass window 540B, and a rear glass window 540C. According to an embodiment of the present disclosure, the glass window 540 may further include a roof glass window 540D. For example, when the vehicular apparatus includes the roof glass window 540D, a portion of a region of the roof frame and the roof interior material 530C may be replaced with the roof glass window 540D. For example, when the vehicular apparatus includes the roof glass window 540D, the third vibration apparatus 550C may be configured to indirectly or directly vibrate a periphery portion of the roof interior material 530C surrounding the roof glass window 540D.

With reference to FIGS. 21 to 23, the thirteenth vibration apparatus 550M according to an embodiment of the present disclosure may be disposed at the front glass window 540A and may be configured to output a sound by vibrating itself or may be configured to indirectly or directly vibrate the front glass window 540A to output a sound.

According to an embodiment of the present disclosure, the front glass window 540A may include a first region corresponding to the driver seat DS, a second region corresponding to the passenger seat FPS, and a third region (or a middle region) between the first region and the second region. For example, the thirteenth vibration apparatus 550M may be disposed at at least one or more among the first to third regions of the front glass window 540A. For example, the thirteenth vibration apparatus 550M may be disposed at each of the first and second regions of the front glass window 540A, or may be disposed at each of the first to third regions of the front glass window 540A. For example, the thirteenth vibration apparatus 550M may be disposed at at least one or more among the first and second regions of the front glass window 540A, or may be disposed at at least one or more among the first to third regions of the front glass window 540A. For example, the thirteenth vibration apparatus 550M disposed in or at each of the first to third regions of the front glass window 540A may have the same sound output characteristic or different sound output characteristics. For example, the thirteenth vibration apparatus 550M disposed at at least one or more among the first to third regions of the front glass window 540A may have the same sound output characteristic or different sound output characteristics. For example, the thirteenth vibration apparatus 550M may be configured to output a sound of about 150 Hz to about 20 kHz. For example, the thirteenth vibration apparatus 550M may be referred to as a term such as a front window speaker or a thirteenth speaker, or the like, but embodiments of the present disclosure are not limited thereto.

With reference to FIGS. 22 to 24 and 26, the fourteenth vibration apparatus 550N according to an embodiment of the present disclosure may be disposed at the side glass window 540B and may be configured to output a sound by vibrating itself or may be configured to indirectly or directly vibrate the side glass window 540B to output a sound.

According to an embodiment of the present disclosure, the side glass window 540B may include a first side glass window (or a left front window) 540B1, a second side glass window (or a right front window) 540B2, a third side glass window (or a left rear window) 540B3, and a fourth side glass window (or a right rear window) 540B4.

According to an embodiment of the present disclosure, the fourteenth vibration apparatus 550N may be disposed at at least one or more among the first to fourth side glass windows 540B1 to 540B4. For example, at least one or more among the first to fourth side glass windows 540B1 to 540B4 may include at least one or more fourteenth vibration apparatuses 550N.

According to an embodiment of the present disclosure, the fourteenth vibration apparatus 550N may be disposed at at least one or more among the first to fourth side glass windows 540B1 to 540B4 and may be configured to output a sound by vibrating itself or may be configured to indirectly or directly vibrate a corresponding side glass window 540B1 to 540B4 to output the sound. For example, the fourteenth vibration apparatus 550N may be configured to output a sound of about 150 Hz to about 20 kHz. For example, the fourteenth vibration apparatus 550N disposed at at least one or more among the first to fourth side glass windows 540B1 to 540B4 may have the same sound output characteristic or different sound output characteristics. For example, the fourteenth vibration apparatus 550N may be configured to output a sound of about 150 Hz to about 20 kHz. For example, the fourteenth vibration apparatus 550N may be a side window speaker or a fourteenth speaker, or the like, but embodiments of the present disclosure are not limited thereto.

With reference to FIG. 21, the fifteenth vibration apparatus 550O according to an embodiment of the present disclosure may be disposed at the rear glass window 540C and may be configured to output a sound by vibrating itself or may be configured to indirectly or directly vibrate the rear glass window 540C to output a sound.

According to an embodiment of the present disclosure, the rear glass window 540C may include a first region corresponding to a rear portion of the first rear seat RPS1, a second region corresponding to a rear portion of the second rear seat RPS2, and a third region corresponding to a rear portion of the third rear seat RPS3. According to an embodiment of the present disclosure, the fifteenth vibration apparatus 550O may be disposed at each of first to third regions of the rear glass window 540C. For example, the fifteenth vibration apparatus 550O may be disposed at at least one or more among the first to third regions of the rear glass window 540C. For example, the fifteenth vibration apparatus 550O may be disposed at each of the first and second regions of the rear glass window 540C, or may be disposed at each of the first to third regions of the rear glass window 540C. For example, the fifteenth vibration apparatus 550O may be disposed at at least one or more among the first and second regions of the rear glass window 540C, or may be disposed at at least one or more among the first to third regions of the rear glass window 540C. For example, the fifteenth vibration apparatus 550O may be configured to output a sound of about 150 Hz to about 20 kHz. For example, the fifteenth vibration apparatus 550O disposed at each of the first to third regions of the rear glass window 540C may have the same sound output characteristic or different sound output characteristics. For example, the fifteenth vibration apparatus 550O disposed at at least one or more among the first to third regions of the rear glass window 540C may have the same sound output characteristic or different sound output characteristics. For example, the fifteenth vibration apparatus 550O disposed at at least one or more among the first to third regions of the rear glass window 540C may be configured to output a sound of about 150 Hz to about 20 kHz, or may be one or more of a woofer, a mid-woofer, and a sub-woofer, or the like, but embodiments of the present disclosure are not limited thereto. For example, the fifteenth vibration apparatus 550O may be referred to as a term such as a rear window speaker or a fifteenth speaker, or the like, but embodiments of the present disclosure are not limited thereto.

With reference to FIG. 25, the sixteenth vibration apparatus 550P according to an embodiment of the present disclosure may be disposed at the roof glass window 540D and may output a sound by vibrating itself or may be configured to indirectly or directly vibrate the roof glass window 540D to output a sound.

The roof glass window 540D according to an embodiment of the present disclosure may be disposed over the front seats DS and FPS. For example, the sixteenth vibration apparatus 550P may be disposed at a middle region of the roof glass window 540D. For example, the sixteenth vibration apparatus 550P may be configured to output a sound of about 150 Hz to about 20 kHz. For example, the sixteenth vibration apparatus 550P may be referred to as a term such as a roof window speaker or a sixteenth speaker, or the like, but embodiments of the present disclosure are not limited thereto.

According to another embodiment of the present disclosure, the roof glass window 540D may be disposed at the front seats DS and FPS or may be disposed at the front seats DS and FPS and the rear seats RPS1, RPS2, and RPS3. For example, the roof glass window 540D may include a first region corresponding to the front seats DS and FPS and a second region corresponding to the rear seats RPS1, RPS2, and RPS3. Moreover, the roof glass window 540D may include a third upper region between the first upper region and the second upper region. For example, the sixteenth vibration apparatus 550P may be disposed at at least one or more among the first and second regions of the roof glass window 540D or may be disposed at at least one or more among the first to third regions of the roof glass window 540D. For example, the sixteenth vibration apparatus 550P may be configured to output a sound of about 150 Hz to about 20 kHz. For example, the sixteenth vibration apparatus 550P disposed at at least one or more among the first to third regions of the roof glass window 540D may have the same sound output characteristic or different sound output characteristics.

With reference to FIGS. 21 to 23, the vehicular apparatus according to an embodiment of the present disclosure may further include a woofer speaker WS which is disposed at at least one or more among a dashboard 530A, a door frame, and a rear package interior material 530J.

The woofer speaker WS according to an embodiment of the present disclosure may include at least one or more among a woofer, a mid-woofer, and a sub-woofer. For example, the woofer speaker WS may be referred to as a term such as a speaker or the like which outputs a sound of about 60 Hz to about 150 Hz, but embodiments of the present disclosure are not limited thereto. Therefore, the woofer speaker WS may output a sound of about 60 Hz to about 150 Hz, and thus, may enhance a low-pitched sound band characteristic of a sound which is output to an indoor space.

According to an embodiment of the present disclosure, the woofer speaker WS may be disposed at at least one or more among first and second regions of the dashboard 530A. According to an embodiment of the present disclosure, the woofer speaker WS may be disposed at each of first to fourth door frames of the door frame and may be exposed at a lower region among each of the first to fourth door interior materials 530D1 to 530D4 of the door interior material 530D. For example, the woofer speaker WS may be disposed at at least one or more among the first to fourth door frames of the door frame and may be exposed at the lower regions of at least one or more among the first to fourth door interior materials 530D1 to 530D4 of the door interior material 530D. According to another embodiment of the present disclosure, the woofer speaker WS may be disposed at at least one or more among the first and second regions of the rear package interior material 530J. For example, the fourth vibration apparatus 550D disposed at the lower region of each of the first to fourth door interior materials 530D1 to 530D4 may be replaced by the woofer speaker WS. For example, the fourth vibration apparatus 550D disposed in or at the lower regions of at least one or more among the first to fourth door interior materials 530D1 to 530D4 may be replaced by the woofer speaker WS.

With reference to FIGS. 23 and 24, the vehicular apparatus according to an embodiment of the present disclosure may further include a garnish member 530M which covers a portion of the interior material 530 exposed at the indoor space and a fourth vibration generating apparatus 550-4 disposed at the interior material 530. For example, a fourth vibration generating apparatus 550-4 may be disposed at a garnish member 530M and the interior material 530 to output a sound. For example, one or more of the garnish member 530M and the interior material 530 may output a sound based on vibrations of one or more vibration generating apparatuses (or vibration apparatus).

The garnish member 530M may be configured to cover a portion of the door interior material 530D exposed at an indoor space, but embodiments of the present disclosure are not limited thereto. For example, the garnish member 530M may be configured to cover a portion of one or more among the dashboard 530A, the filler interior material 530B, and the roof interior material 530C, which are exposed at the indoor space.

The garnish member 530M according to an embodiment of the present disclosure may include a metal material or a nonmetal material (or a composite nonmetal material) having a material characteristic suitable for generating a sound based on a vibration. For example, a metal material of the garnish member 530M may include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the garnish member 530M may include one or more of wood, plastic, glass, metal, cloth, fiber, rubber, paper, carbon, a mirror, and leather, but embodiments of the present disclosure are not limited thereto. For example, the garnish member 530M may include a metal material having a material characteristic suitable for generating a sound of a high-pitched sound band, but embodiments of the present disclosure are not limited thereto. For example, the high-pitched sound band may have a frequency of 1 kHz or more or 3 kHz or more, but embodiments of the present disclosure are not limited thereto.

The fourth vibration generating apparatus 550-4 may include a seventeenth vibration apparatus 550Q disposed between the garnish member 530M and the interior material 530. For example, the fourth vibration generating apparatus 550-4 or the seventeenth vibration apparatus 550Q may be referred to as a term such as a garnish speaker or a seventeenth speaker, or the like, but embodiments of the present disclosure are not limited thereto.

The seventeenth vibration apparatus 550Q according to an embodiment of the present disclosure may include one or more of the vibration apparatuses 130 described above with reference to FIGS. 1 to 20. The seventeenth vibration apparatus 550Q may be disposed in or at a main interior material 530 and a garnish member 530M and may be connected or coupled to the garnish member 530M.

The seventeenth vibration apparatus 550Q according to an embodiment of the present disclosure may be configured to indirectly or directly vibrate the garnish member 530M to output a sound into the indoor space of the vehicular apparatus. For example, the seventeenth vibration apparatus 550Q may be configured to output a sound of a high-pitched sound band, but embodiments of the present disclosure are not limited thereto.

With reference to FIG. 23, the vehicular apparatus according to an embodiment of the present disclosure may further include a fifth vibration generating apparatus 550-5 disposed at an inner surface of the exterior material 520. For example, the fifth vibration generating apparatus 550-5 may be disposed or at in the exterior material 520 to output a sound. For example, the exterior material 520 may output a sound based on vibrations of one or more vibration generating apparatuses (or vibration apparatus).

The fifth vibration generating apparatus 550-5 may include one or more vibration apparatuses 550R, 550S, and 550T disposed at one or more among a hood panel 520A, a front fender panel 520B, and a trunk panel 520C. For example, the fifth vibration generating apparatus 550-5 may include at least one or more among one or more eighteenth to twentieth vibration apparatuses 550R, 550S, and 550T, and thus, may output sounds of one or more channels.

The one or more eighteenth vibration apparatuses 550R according to an embodiment of the present disclosure may be connected or coupled to an inner surface of the hood panel 520A and may indirectly or directly vibrate the hood panel 520A to output a sound into an outdoor space of the vehicular apparatus. For example, the one or more eighteenth vibration apparatuses 550R may be configured to be connected or coupled to one or more among a center portion and a periphery portion of the inner surface of the hood panel 520A.

One or more eighteenth vibration apparatuses 550R according to an embodiment of the present disclosure may include one or more of the vibration apparatuses 130 described above with reference to FIGS. 1 to 20. The one or more eighteenth vibration apparatuses 550R may be connected or coupled to an inner surface of a hood panel 520A. For example, the one or more eighteenth vibration apparatuses 550R may be configured to output a sound of 150 Hz to 20 kHz. For example, the one or more eighteenth vibration apparatuses 550R may be referred to as a hood panel speaker or an eighteenth speaker, but embodiments of the present disclosure are not limited thereto.

The one or more nineteenth vibration apparatuses 550S according to an embodiment of the present disclosure may be connected or coupled to an inner surface of the front fender panel 520B and may be configured to indirectly or directly vibrate the front fender panel 520B to output a sound to the outdoor space of the vehicular apparatus. For example, the one or more nineteenth vibration apparatuses 550S may be disposed to have a certain interval at the inner surface of the front fender panel 520B.

The one or more nineteenth vibration apparatuses 550S according to an embodiment of the present disclosure may include the vibration apparatus 130 described above with reference to FIGS. 1 to 20, and thus, the repetitive description thereof may be omitted. The one or more nineteenth vibration apparatuses 550S may be connected or coupled to the inner surface of the front fender panel 520B through a coupling member. For example, the one or more nineteenth vibration apparatuses 550S may be configured to output a sound of about 150 Hz to about 20 kHz. For example, the one or more nineteenth vibration apparatuses 550S may be referred to as a term such as a fender panel speaker or a nineteenth speaker, or the like, but embodiments of the present disclosure are not limited thereto.

The one or more twentieth vibration apparatuses 550T according to an embodiment of the present disclosure may be connected or coupled to an inner surface of the trunk panel 520C and may be configured to indirectly or directly vibrate the trunk panel 520C to output a sound to the outdoor space of the vehicular apparatus. For example, the one or more twentieth vibration apparatuses 550T may be configured to be connected or coupled to one or more among a center portion and a periphery portion of the trunk panel 520C.

The one or more twentieth vibration apparatuses 550T according to an embodiment of the present disclosure may include the vibration apparatuses 130 disclosure described above with reference to FIGS. 1 to 20. The one or more twentieth vibration apparatuses 550T may be connected or coupled to the inner surface of the trunk panel 520C through a coupling member. For example, the one or more twentieth vibration apparatuses 550T may be configured to output a sound of about 150 Hz to about 20 kHz. For example, the one or more twentieth vibration apparatuses 550T may be referred to as a term such as a trunk panel speaker or a twentieth speaker, or the like, but embodiments of the present disclosure are not limited thereto.

According to another embodiment of the present disclosure, the fifth vibration generating apparatus 550-5 may further include one or more vibration apparatuses which are disposed in or at one or more of a door inner panel and a door outer panel.

With reference to FIGS. 21 to 23, the vehicular apparatus according to an embodiment of the present disclosure may further include an instrument panel apparatus 560, an infotainment apparatus 570, a center fascia apparatus 580, and a curvature variation device 590.

The instrument panel apparatus 560 according to an embodiment of the present disclosure may be disposed at a first region of the dashboard 530A to face the driver seat DS. The instrument panel apparatus 560 may include a first display 561 which is disposed at the first region of the dashboard 530A to face the driver seat DS.

The first display 561 may include any one of the apparatus 10 to 40 described above with reference to FIGS. 1 to 20, and thus, the repetitive description thereof may be omitted.

For example, the instrument panel apparatus 560 may output a sound, generated by a vibration of a vibration member (or a display panel) 100 based on a vibration of one or more vibration apparatuses 130 included at the first display 561, toward the driver seat DS. For example, the vibration apparatus 130 disposed at the first display 261 of the instrument panel apparatus 560 may be configured to output a sound of about 150 Hz to about 20 kHz.

The infotainment apparatus 570 may be disposed at a third region of the dashboard 530A.

The infotainment apparatus 570 according to an embodiment of the present disclosure may be fixed on the third region of the dashboard 530A in an upright state.

The infotainment apparatus 570 according to another embodiment of the present disclosure may be installed to be raised and lowered at the third region of the dashboard 530A. For example, the infotainment apparatus 570 may be received or accommodated into the dashboard 530A based on the power turn-off of the vehicular apparatus or the manipulation of a vehicle passenger and may protrude to a region on the dashboard 530A based on the power turn-on of the vehicular apparatus or the manipulation of the vehicle passenger.

The infotainment apparatus 570 according to an embodiment of the present disclosure may include a display (or a second display) 571 disposed at the third region of the dashboard 530A, and a display elevation device.

The second display 571 may include any one of the apparatuses described above with reference to FIGS. 1 to 16, and thus, the repetitive description thereof may be omitted. For example, the infotainment apparatus 570 may output a sound, generated by a vibration of a display panel based on a vibration of one or more vibration apparatuses 130 included at the second display 571, toward the driver seat DS. For example, the one or more vibration apparatuses 130 disposed at the second display 571 of the infotainment apparatus 570 may be configured to output a sound of about 150 Hz to about 20 kHz.

The display elevation device may be disposed into or at the third region of the dashboard 530A and may support the second display 571 so as to be raised and lowered. For example, the display elevation device may raise the second display 571 based on the power turn-on of the vehicular apparatus or the manipulation of the vehicle passenger, thereby allowing the second display 571 to protrude to a region on the dashboard 530A. Also, the display elevation device may lower the second display 571 based on the power turn-off of the vehicular apparatus or the manipulation of the vehicle passenger, thereby allowing the second display 571 to be received or accommodated into the dashboard 530A.

The center fascia apparatus 580 according to an embodiment of the present disclosure may include a display (or a third display) 581.

The third display 581 may include any one of the apparatuses described above with reference to FIGS. 1 to 20, and thus, the repetitive description thereof may be omitted. For example, the center fascia apparatus 580 may output a sound, generated by a vibration of a display panel based on a vibration of one or more vibration apparatuses 130 included at the third display 581, toward a driver seat DS or a passenger seat FPS.

The curvature variation device 590 according to an embodiment of the present disclosure may include a display (or a fourth display) 591.

The fourth display 591 may include any one of the apparatuses described above with reference to FIGS. 13 to 20, and thus, the repetitive description thereof may be omitted. For example, the curvature variation device 590 may output a sound, generated by a vibration of a display panel based on a vibration of one or more vibration apparatuses 130 included at the fourth display 591, toward a driver seat DS or a passenger seat FPS.

As described above, the vehicular apparatus according to an embodiment of the present disclosure may output a sound to one or more of an indoor space and an external space by at least one or more of the first vibration generating apparatuses 550-1 disposed at the interior material 530, the second vibration generating apparatus 550-2 disposed at the interior material 530 exposed at the indoor space, the third vibration generating apparatus 550-3 disposed at the window 540, the fourth vibration generating apparatus 550-4 disposed at the garnish member 530M, and the fifth vibration generating apparatus 550-5 disposed at the exterior material 520, and thus, may output a sound by one or more of the exterior material 520 and the interior material 530 as a sound vibration plate, thereby outputting a multi-channel surround stereo sound. Moreover, the vehicular apparatus according to an embodiment of the present disclosure may output a sound by using, as a sound vibration plate, one or more display panels of one or more displays 561, 571, 581, and 291 of the instrument panel apparatus 560, the infotainment apparatus 570, the center fascia apparatus 580, and curvature variation device 590, and may output a multi-channel surround stereo sound, which is more realistic, through each of the first to fourth vibration generating apparatuses 550-1 to 550-4, the instrument panel apparatus 560, the infotainment apparatus 570, the center fascia apparatus 580, and curvature variation device 590.

The vibration apparatus according to an embodiment of the present disclosure may be connected to all electronic devices by wire or wirelessly and may be used as a vibration apparatus of a corresponding electronic device. For example, an apparatus connectable to the vibration apparatus according to some embodiments of the present disclosure may be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. Also, the vibration apparatus according to some embodiments of the present disclosure may be applied to organic light-emitting lighting apparatuses or inorganic light-emitting lighting apparatuses. When the vibration apparatus according to some embodiments of the present disclosure is applied to lighting apparatuses, the lighting apparatuses may act as lighting and a speaker. Also, when the vibration apparatus according to some embodiments of the present disclosure is applied to a mobile device, or the like, the vibration apparatus may be one or more of a speaker, a receiver, and a haptic device, but embodiments of the present disclosure are not limited thereto.

An apparatus and a vehicular apparatus including the same according to an embodiment of the present disclosure are described below.

An apparatus according to some embodiments of the present disclosure may comprise a vibration member; a housing at a rear surface of the vibration member; a connection member between the vibration member and the housing; and a vibration apparatus configured to vibrate the vibration member, the vibration member may comprise at least one flat portion; and at least one flexural portion adjacent to the at least one flat portion.

According to some embodiments of the present disclosure, the at least one flexural portion may comprise one or more of at least one concave curved portion and at least one convex curved portion.

According to some embodiments of the present disclosure, the vibration member may comprise a first region, a second region adjacent to the first region, and a third region adjacent to the second region, the first to third regions having different bending states, the first region may comprise the at least one flat portion, the second region may comprise the at least one concave curved portion, and the third region may comprise the at least one convex curved portion.

According to some embodiments of the present disclosure, the apparatus may further comprise at least one first vibration device at the first region, at least one second vibration device at the second region, and at least one third vibration device at the third region.

According to some embodiments of the present disclosure, the at least one first vibration device may have a mechanical quality factor of less than 100, the at least one third vibration device may have a mechanical quality factor of more than 400, and the at least one second vibration device may have a mechanical quality factor of 100 to 400.

According to some embodiments of the present disclosure, the apparatus may further comprise a curvature variable layer contacting a second surface of the vibration member, the curvature variable layer may comprise a curvature variable portion, and a protection member surrounding the curvature variable portion.

According to some embodiments of the present disclosure, the apparatus may further comprise a curvature variable layer controller configured to provide a curvature variable signal to the curvature variable layer, the curvature variable layer controller may comprise a first output terminal configured to output a first polarity signal, and a second output terminal configured to output a second polarity signal, the first output terminal may be electrically connected to the vibration member, and the second output terminal may be electrically connected to the curvature variable portion.

According to some embodiments of the present disclosure, the housing may comprise a bottom portion spaced apart from the vibration member, and a lateral portion protruding toward the vibration member from a periphery portion of the bottom portion.

According to some embodiments of the present disclosure, the apparatus may further comprise a curvature variation device mounted on the bottom portion and configured to change a bending state of the vibration member, the curvature variation device may comprise a fixing portion fixed to the bottom portion, a first rotation link portion fixed to the fixing portion at one side thereof, a second rotation link portion connected to the other side of the first rotation link portion, a pivot portion rotatably fixing the first rotation link portion and the second rotation link portion, and a supporting portion fixed to the other end of the second rotation link portion and coupled to the rear surface of the vibration member.

According to some embodiments of the present disclosure, the apparatus may further comprise a demultiplexer configured to separate the same sound signal, applied to the vibration apparatus, into signals having different frequencies and including a filter.

According to some embodiments of the present disclosure, the vibration apparatus may comprise a vibration device, the vibration device may comprise a vibration portion, a first electrode portion at a first surface of the vibration portion, and a second electrode portion at a second surface different from the first surface of the vibration portion.

According to some embodiments of the present disclosure, the vibration apparatus may further comprise a first cover member at the first electrode portion, and a second cover member at the second electrode portion.

According to some embodiments of the present disclosure, the vibration apparatus may further comprise a first adhesive layer between the first cover member and the first electrode portion, and a second adhesive layer between the second cover member and the second electrode portion.

According to some embodiments of the present disclosure, the vibration portion may comprise an inorganic material portion having a piezoelectric characteristic.

According to some embodiments of the present disclosure, the vibration portion may comprise a plurality of inorganic material portions having a piezoelectric characteristic, and an organic material portion between the plurality of inorganic material portions.

According to some embodiments of the present disclosure, the vibration member may comprise a metal material, or may comprise single nonmetal materials or composite nonmetal materials of one or more of wood, rubber, plastic, glass, fiber, cloth, paper, a mirror, carbon, and leather.

According to some embodiments of the present disclosure, the vibration member may comprise one or more of a display panel including a pixel configured to display an image, a light emitting diode lighting panel, an organic light emitting lighting panel, and an inorganic light emitting lighting panel.

According to some embodiments of the present disclosure, the vibration member may comprise any one of a display panel including a pixel configured to display an image, a screen panel on which an image is to be projected from a display apparatus, a lighting panel, a signage panel, a vehicular interior material, a vehicular glass window, a vehicular exterior material, a building ceiling material, a building interior material, a building glass window, an aircraft interior material, an aircraft glass window, metal, wood, rubber, plastic, glass, fiber, cloth, paper, leather, carbon, and a mirror.

An apparatus according to some embodiments of the present disclosure may comprise a vibration member, a housing at a rear surface of the vibration member, a connection member between the vibration member and the housing, and a vibration apparatus configured to vibrate the vibration member, the vibration member may comprise at least one flat portion, and at least one concave curved portion or at least one convex curved portion provided adjacent to the at least one flat portion, the vibration member may comprise first to fourth regions which do not overlap one another, the second region may comprise the at least one flat portion, the first region and the fourth region may comprise the at least one convex curved portion, and the third region may comprise the at least one concave curved portion.

According to some embodiments of the present disclosure, the vibration apparatus may comprise at least one first vibration device at the first region, at least one third vibration device at the first region and the fourth region, and at least one second vibration device at the third region.

According to some embodiments of the present disclosure, the at least one first vibration device may have a mechanical quality factor of less than 100, the at least one third vibration device may have a mechanical quality factor of more than 400, and the at least one second vibration device may have a mechanical quality factor of 100 to 400.

An apparatus according to some embodiments of the present disclosure may comprise a vibration member, a housing at a rear surface of the vibration member, a connection member between the vibration member and the housing, and a vibration apparatus configured to vibrate the vibration member, the vibration member may comprise at least one flat portion, and at least one concave curved portion or at least one convex curved portion provided adjacent to the at least one flat portion, the vibration member may comprise first to fourth regions which do not overlap one another, the second region may comprise the at least one flat portion, the third region may comprise the at least one convex curved portion, and the first region and the fourth region may comprise the at least one concave curved portion.

According to some embodiments of the present disclosure, the vibration apparatus may comprise at least one first vibration device at the second region, at least one third vibration device at the third region, and at least one second vibration device at the first region and the fourth region.

According to some embodiments of the present disclosure, the at least one first vibration device may have a mechanical quality factor of less than 100, the at least one third vibration device may have a mechanical quality factor of more than 400, and the at least one second vibration device may have a mechanical quality factor of 100 to 400.

A vehicular apparatus according to some embodiments of the present disclosure may comprise an exterior material, an interior material covering the exterior material, and one or more vibration generating apparatuses at one or more among the exterior material, the interior material, and a region between the exterior material and the interior material, the one or more vibration generating apparatuses may comprise the apparatus according to some embodiments of the present disclosure, one or more of the interior material and the exterior material may output sound based on vibrations of the one or more vibration generating apparatuses.

According to some embodiments of the present disclosure, the interior material may comprise one or more materials of metal, plastic, fiber, leather, wood, cloth, rubber, carbon, a mirror, and paper.

According to some embodiments of the present disclosure, the interior material may comprise one or more of a dashboard, a pillar interior material, a roof interior material, a door interior material, a seat interior material, a handle interior material, a floor interior material, a rear view mirror, an overhead console, a glove box, a sun visor, and a rear package interior material; and the one or more vibration generating apparatuses may be configured to vibrate at least one or more of the dashboard, the pillar interior material, the roof interior material, the door interior material, the seat interior material, the handle interior material, the floor interior material, the rear view mirror, the overhead console, the glove box, the sun visor, and the rear package interior material.

According to some embodiments of the present disclosure, the vehicular apparatus may further comprise a glass window, and a transparent vibration generating apparatus at the glass window. According to some embodiments of the present disclosure, the glass window may comprise at least one or more of a front glass window, a side glass window, a rear glass window, and a roof glass window; and the transparent vibration generating apparatus may be configured to vibrate at least one or more of the front glass window, the side glass window, the rear glass window, and the roof glass window.

An apparatus according to some embodiments of the present disclosure may comprise a vibration member, a housing at a rear surface of the vibration member, a connection member between the vibration member and the housing, and a vibration apparatus configured to vibrate the vibration member. The vibration member may comprise at least one flat portion and at least one concave curved portion or at least one convex curved portion provided adjacent to the at least one flat portion. The vibration member may comprise first to fourth regions which do not overlap one another. The first region and the third region may comprise the at least one concave curved portion. The second region may comprise the at least one flat portion. The fourth region may comprise the at least one convex curved portion.

An apparatus according to some embodiments of the present disclosure may comprise a vibration member, a housing at a rear surface of the vibration member, a connection member between the vibration member and the housing, and a vibration apparatus configured to vibrate the vibration member. The vibration member may comprise at least one flat portion and at least one concave curved portion or at least one convex curved portion provided adjacent to the at least one flat portion. The vibration member may comprise first to fourth regions which do not overlap one another. The first region and the third region may comprise the at least one convex curved portion. The second region may comprise the at least one flat portion. The fourth region may comprise the at least one concave curved portion.

A vibration apparatus according to some embodiments of the present disclosure, the vibration apparatus may comprise one or more vibration devices. The one or more vibration devices may comprise a vibration portion, a first electrode portion at a first surface of the vibration portion, and a second electrode portion at a second surface different from the first surface of the vibration portion.

It will be apparent to those skilled in the art that various modifications and variations can be made in the apparatus and the vehicular apparatus including the same of the present disclosure without departing from the technical idea or scope of the disclosures. Thus, it is intended that the present disclosure covers the modifications and variations of this disclosure provided they come within the scope of the appended claims and their equivalents.

What is claimed is:

1. An apparatus, comprising:

a vibration member;

a housing at a rear surface of the vibration member;

a vibration apparatus configured to vibrate the vibration member; and a curvature variable layer between the vibration member and the vibration apparatus, wherein the vibration member comprises:

at least one flat portion; and at least one flexural portion adjacent to the at least one flat portion, wherein the vibration apparatus comprises a vibration device, wherein the vibration device comprises:

a vibration portion;

a first electrode portion at a first surface of the vibration portion; and a second electrode portion at a second surface different from the first surface of the vibration portion, wherein the vibration apparatus vibrates based on an alternating current (AC) vibration driving signal, and wherein the curvature variable layer includes a piezoelectric material and maintains a contraction state or an expansion state based on a variable signal having a direct current (DC) voltage.

2. The apparatus of claim 1, wherein the at least one flexural portion comprises one or more of at least one concave curved portion and at least one convex curved portion.

3. The apparatus of claim 2, wherein:

the vibration member comprises a first region, a second region adjacent to the first region, and a third region adjacent to the second region, the first to the third regions having different bending states;

the first region comprises the at least one flat portion;

the second region comprises the at least one concave curved portion; and the third region comprises the at least one convex curved portion.

4. The apparatus of claim 3, further comprising:

at least one first vibration device at the first region;

at least one second vibration device at the second region; and at least one third vibration device at the third region.

5. The apparatus of claim 4, wherein:

the at least one first vibration device has a mechanical quality factor of less than 100;

the at least one third vibration device has a mechanical quality factor of more than 400; and the at least one second vibration device has a mechanical quality factor in a range from 100 to 400.

6. The apparatus of claim 1, wherein:

the curvature variable layer comprises:

a curvature variable portion; and a protection member surrounding the curvature variable portion; and the curvature variable portion contacts a second surface of the vibration member.

7. The apparatus of claim 6, further comprising a curvature variable layer controller configured to provide a curvature variable signal to the curvature variable layer, wherein the curvature variable layer controller comprises:

a first output terminal configured to output a first polarity signal; and a second output terminal configured to output a second polarity signal, wherein the first output terminal is electrically connected to the vibration member, and wherein the second output terminal is electrically connected to the curvature variable portion.

8. The apparatus of claim 1, wherein the housing comprises:

a bottom portion spaced apart from the vibration member; and a lateral portion protruding toward the vibration member from a periphery portion of the bottom portion.

9. The apparatus of claim 1, further comprising a connection member between the vibration member and the housing.

10. The apparatus of claim 1, further comprising a demultiplexer configured to separate a same sound signal, applied to the vibration apparatus, into signals having different frequencies and including a filter.

11. The apparatus of claim 1, wherein the vibration apparatus further comprises:

a first cover member at the first electrode portion; and a second cover member at the second electrode portion.

12. The apparatus of claim 11, wherein the vibration apparatus further comprises:

a first adhesive layer between the first cover member and the first electrode portion; and a second adhesive layer between the second cover member and the second electrode portion.

13. The apparatus of claim 1, wherein the vibration portion comprises an inorganic material portion having a piezoelectric characteristic.

14. The apparatus of claim 1, wherein the vibration portion comprises:

a plurality of inorganic material portions having a piezoelectric characteristic; and an organic material portion between the plurality of inorganic material portions.

15. The apparatus of claim 1, wherein the vibration member comprises a metal material, or comprises a single nonmetal material or a composite nonmetal material of one or more of wood, rubber, plastic, glass, fiber, cloth, paper, a mirror, carbon, and leather.

16. The apparatus of claim 1, wherein the vibration member comprises one or more of a display panel including a pixel configured to display an image, a light emitting diode lighting panel, an organic light emitting lighting panel, and an inorganic light emitting lighting panel.

17. The apparatus of claim 1, wherein the vibration member comprises any one or more of a display panel including a pixel configured to display an image, a screen panel on which an image is to be projected from a display apparatus, a lighting panel, a signage panel, a vehicular interior material, a vehicular glass window, a vehicular exterior material, a building ceiling material, a building interior material, a building glass window, an aircraft interior material, an aircraft glass window, metal, wood, rubber, plastic, glass, fiber, cloth, paper, leather, carbon, and a mirror.

18. An apparatus, comprising:

a vibration member;

a housing at a rear surface of the vibration member;

a vibration apparatus configured to vibrate the vibration member; and a curvature variable layer between the vibration member and the vibration apparatus, wherein the vibration member comprises:

at least one flat portion; and at least one concave curved portion or at least one convex curved portion provided adjacent to the at least one flat portion, wherein the vibration member comprises first to fourth regions which do not overlap one another, wherein the second region comprises the at least one flat portion, wherein the first region and the fourth region comprise the at least one convex curved portion, wherein the third region comprises the at least one concave curved portion, wherein the vibration apparatus comprises a vibration device, wherein the vibration device comprises:

a vibration portion;

a first electrode portion at a first surface of the vibration portion; and a second electrode portion at a second surface different from the first surface of the vibration portion, wherein the vibration apparatus vibrates based on an alternating current (AC) vibration driving signal, and wherein the curvature variable layer includes a piezoelectric material and maintains a contraction state or an expansion state based on a variable signal having a direct current (DC) voltage.

19. The apparatus of claim 18, wherein the vibration apparatus comprises:

at least one first vibration device at the second region;

at least one third vibration device at the first region and the fourth region; and at least one second vibration device at the third region.

20. The apparatus of claim 19, wherein:

the at least one first vibration device has a mechanical quality factor of less than 100;

the at least one third vibration device has a mechanical quality factor of more than 400; and the at least one second vibration device has a mechanical quality factor in a range from 100 to 400.

21. An apparatus, comprising:

a vibration member;

a housing at a rear surface of the vibration member;

a vibration apparatus configured to vibrate the vibration member; and a curvature variable layer between the vibration member and the vibration apparatus, wherein the vibration member comprises:

at least one flat portion; and at least one concave curved portion or at least one convex curved portion provided adjacent to the at least one flat portion, wherein the vibration member comprises first to fourth regions which do not overlap one another, wherein the second region comprises the at least one flat portion, wherein the third region comprises the at least one convex curved portion, wherein the first region and the fourth region comprise the at least one concave curved portion, wherein the vibration apparatus comprises a vibration device, wherein the vibration device comprises:

a vibration portion;

a first electrode portion at a first surface of the vibration portion; and a second electrode portion at a second surface different from the first surface of the vibration portion, wherein the vibration apparatus vibrates based on an alternating current (AC) vibration driving signal, and wherein the curvature variable layer includes a piezoelectric material and maintains a contraction state or an expansion state based on a variable signal having a direct current (DC) voltage.

22. The apparatus of claim 21, wherein the vibration apparatus comprises:

at least one first vibration device at the second region;

at least one third vibration device at the third region; and at least one second vibration device at the first region and the fourth region.

23. The apparatus of claim 22, wherein:

the at least one first vibration device has a mechanical quality factor of less than 100;

the at least one third vibration device has a mechanical quality factor of more than 400; and the at least one second vibration device has a mechanical quality factor in a range from 100 to 400.

24. A vehicular apparatus, comprising:

an exterior material;

an interior material covering the exterior material; and one or more vibration generating apparatuses at one or more among the exterior material, the interior material, and a region between the exterior material and the interior material, wherein the one or more vibration generating apparatuses comprise the apparatus of claim 1, and wherein one or more of the interior material and the exterior material is configured to output sound based on vibrations of the one or more vibration generating apparatuses.

25. The vehicular apparatus of claim 24, wherein the interior material comprises one or more of metal, plastic, fiber, leather, wood, cloth, rubber, carbon, a mirror, and paper.

26. The vehicular apparatus of claim 24, wherein:

the interior material comprises one or more of a dashboard, a pillar interior material, a roof interior material, a door interior material, a seat interior material, a handle interior material, a floor interior material, a rear view mirror, an overhead console, a glove box, a sun visor, and a rear package interior material; and the one or more vibration generating apparatuses are configured to vibrate at least one or more of the dashboard, the pillar interior material, the roof interior material, the door interior material, the seat interior material, the handle interior material, the floor interior material, the rear view mirror, the overhead console, the glove box, the sun visor, and the rear package interior material.

27. The vehicular apparatus of claim 24, further comprising:

a glass window; and a transparent vibration generating apparatus at the glass window.

28. The vehicular apparatus of claim 27, wherein:

the glass window comprises at least one or more of a front glass window, a side glass window, a rear glass window, and a roof glass window; and the transparent vibration generating apparatus is configured to vibrate at least one or more of the front glass window, the side glass window, the rear glass window, and the roof glass window.

* * * * *